(12) United States Patent
Jung et al.

(10) Patent No.: US 9,891,809 B2
(45) Date of Patent: Feb. 13, 2018

(54) USER TERMINAL DEVICE AND CONTROLLING METHOD THEREOF

(71) Applicant: SAMSUNG ELECTRONICS CO., LTD., Suwon-si (KR)

(72) Inventors: Jong-woo Jung, Hwaseong-si (KR); In-Sik Myung, Incheon (KR); Taik-heon Rhee, Seoul (KR); Dong-bin Cho, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 340 days.

(21) Appl. No.: 14/245,210

(22) Filed: Apr. 4, 2014

(65) Prior Publication Data

US 2014/0325410 A1 Oct. 30, 2014

(30) Foreign Application Priority Data

Apr. 26, 2013 (KR) .......................... 10-2013-0046991
Aug. 19, 2013 (KR) .......................... 10-2013-0097820

(51) Int. Cl.
*G06F 3/00* (2006.01)
*G06F 3/0488* (2013.01)
*G06F 3/0486* (2013.01)
*G06F 3/0481* (2013.01)

(52) U.S. Cl.
CPC .......... *G06F 3/0488* (2013.01); *G06F 3/0486* (2013.01); *G06F 3/04817* (2013.01); *G06F 3/04883* (2013.01); *G06F 3/04886* (2013.01); *G06F 2203/04803* (2013.01)

(58) Field of Classification Search
CPC ........................................ G06F 3/0481–3/0489
See application file for complete search history.

(56) References Cited

U.S. PATENT DOCUMENTS

| | | | | |
|---|---|---|---|---|
| 5,500,937 A | * | 3/1996 | Thompson-Rohrlich | G06F 3/04883 345/173 |
| 5,777,616 A | * | 7/1998 | Bates | G06F 3/0486 715/837 |
| 5,880,743 A | * | 3/1999 | Moran | G06T 13/80 345/473 |

(Continued)

FOREIGN PATENT DOCUMENTS

EP 1947562 A2 7/2008
KR 10-0672605 B1 1/2007

OTHER PUBLICATIONS

International Search Report for PCT/KR2014/003625 dated Aug. 20, 2014 [PCT/ISA/210].

(Continued)

*Primary Examiner* — Steven B Theriault
(74) *Attorney, Agent, or Firm* — Sughrue Mion, PLLC

(57) ABSTRACT

A user terminal device is provided. The device includes a display configured to display a screen including an object, a detector configured to detect a user drawing input which is input on the object or in an area surrounding the object, a controller configured to, in response to the user drawing input being detected, execute a program corresponding to the object and display, on the display, a screen where the user drawing input is processed as an input of the program. Accordingly, the operations of the user terminal device may be controlled conveniently.

20 Claims, 44 Drawing Sheets

(56) References Cited

U.S. PATENT DOCUMENTS

| | | | | |
|---|---|---|---|---|
| 6,057,845 A * | 5/2000 | Dupouy | G06F 3/04883 | 382/186 |
| 6,459,442 B1 * | 10/2002 | Edwards | G06F 3/04883 | 715/700 |
| 6,469,722 B1 * | 10/2002 | Kinoe | G06F 3/0481 | 715/808 |
| 6,956,562 B1 * | 10/2005 | O'Hara | G06F 3/04883 | 345/173 |
| 7,554,530 B2 | 6/2009 | Mizobuchi et al. | | |
| 7,643,012 B2 | 1/2010 | Kim et al. | | |
| 7,728,818 B2 * | 6/2010 | Yu | G06F 3/04883 | 345/156 |
| 7,904,837 B2 * | 3/2011 | Wakai | G06F 3/04883 | 715/253 |
| 8,169,410 B2 * | 5/2012 | Hashimoto | G06F 3/04883 | 345/1.1 |
| 8,296,681 B2 * | 10/2012 | Nurmi | G06F 3/0482 | 715/810 |
| 8,402,382 B2 | 3/2013 | Agarawala et al. | | |
| 8,423,916 B2 * | 4/2013 | Chihara | G06F 3/04883 | 345/156 |
| 8,478,349 B2 * | 7/2013 | Seo | G06F 3/04883 | 455/556.1 |
| 8,478,777 B2 * | 7/2013 | Li | G06F 3/04883 | 707/769 |
| 8,532,596 B1 * | 9/2013 | Park | G06F 3/0481 | 345/173 |
| 8,552,996 B2 * | 10/2013 | Morita | G06F 3/04883 | 178/18.03 |
| 8,640,046 B1 * | 1/2014 | Jania | | 715/781 |
| 8,656,314 B2 * | 2/2014 | Locker | G06F 3/04883 | 345/173 |
| 8,751,972 B2 * | 6/2014 | Ouyang | G06F 3/0488 | 715/863 |
| 8,775,957 B2 * | 7/2014 | Kim | G06F 1/1626 | 345/619 |
| 8,793,624 B2 * | 7/2014 | Santoro | G06F 3/04883 | 345/156 |
| 8,819,597 B2 * | 8/2014 | Li | G06F 3/0482 | 715/263 |
| 8,854,318 B2 * | 10/2014 | Borovsky | G06F 3/04883 | 345/156 |
| 8,881,269 B2 * | 11/2014 | Fleizach | G06F 3/04883 | 345/175 |
| 8,893,052 B2 * | 11/2014 | Ryu | G06F 3/04883 | 715/700 |
| 8,904,291 B2 * | 12/2014 | Kim | H04M 1/72555 | 715/724 |
| 8,943,092 B2 * | 1/2015 | Dai | G06F 17/30477 | 382/113 |
| 8,954,894 B2 * | 2/2015 | Lorenz | G06F 3/0486 | 345/179 |
| 8,977,319 B2 * | 3/2015 | Hasegawa | G06F 3/04883 | 235/439 |
| 9,021,402 B1 * | 4/2015 | Li | G06F 3/0416 | 715/863 |
| 9,354,811 B2 * | 5/2016 | Chaudhri | G06F 3/04817 | |
| 9,424,578 B2 * | 8/2016 | Melcher | G06F 3/04883 | |
| 9,430,084 B2 * | 8/2016 | Kim | G06F 3/0412 | |
| 9,465,532 B2 * | 10/2016 | Trent, Jr. | G06F 3/04883 | |
| 9,658,768 B2 * | 5/2017 | Hyun | G06F 3/04886 | |
| 2002/0091739 A1 * | 7/2002 | Ferlitsch | G06F 17/24 | 715/273 |
| 2002/0109724 A1 * | 8/2002 | Jaeger | G06F 3/0481 | 715/764 |
| 2002/0199025 A1 * | 12/2002 | Kutay | G06F 8/10 | 709/250 |
| 2003/0014615 A1 * | 1/2003 | Lynggaard | G06F 3/0321 | 712/220 |
| 2003/0093419 A1 * | 5/2003 | Bangalore | G01C 21/3664 | |
| 2003/0123733 A1 * | 7/2003 | Keskar | G06F 3/002 | 382/187 |
| 2003/0179202 A1 * | 9/2003 | Saund | G06F 3/0481 | 345/442 |
| 2004/0119763 A1 * | 6/2004 | Mizobuchi | G06F 3/04883 | 715/863 |
| 2004/0145574 A1 * | 7/2004 | Xin | G06F 3/0488 | 345/173 |
| 2004/0217947 A1 * | 11/2004 | Fitzmaurice | G06F 3/0481 | 345/183 |
| 2004/0263491 A1 * | 12/2004 | Ishigaki | G06F 3/04883 | 345/177 |
| 2005/0022130 A1 * | 1/2005 | Fabritius | G06F 3/038 | 715/739 |
| 2005/0154991 A1 * | 7/2005 | Jaeger | G06F 3/0481 | 715/769 |
| 2005/0237308 A1 * | 10/2005 | Autio | G06F 3/04883 | 345/173 |
| 2005/0270307 A1 * | 12/2005 | Jacques Brouaux | G06F 3/0481 | 345/619 |
| 2007/0003143 A1 * | 1/2007 | Wakai | G06F 3/04883 | 382/187 |
| 2007/0098263 A1 * | 5/2007 | Furukawa | G06F 3/03545 | 382/181 |
| 2007/0180400 A1 * | 8/2007 | Zotov | G06F 3/0481 | 715/788 |
| 2008/0034310 A1 * | 2/2008 | Kodosky | G05B 19/0426 | 715/769 |
| 2008/0104020 A1 * | 5/2008 | Kato | G06K 9/00402 | |
| 2008/0104526 A1 * | 5/2008 | Jaeger | G06F 3/0481 | 715/763 |
| 2008/0174568 A1 * | 7/2008 | Kim | G06F 3/04886 | 345/173 |
| 2008/0240568 A1 * | 10/2008 | Tonouchi | G06K 9/00422 | 382/186 |
| 2009/0021482 A1 * | 1/2009 | Lee | G06F 1/1616 | 345/163 |
| 2009/0037813 A1 * | 2/2009 | Newman | G06F 3/04883 | 715/702 |
| 2009/0193363 A1 * | 7/2009 | Atherton | G06F 3/04817 | 715/835 |
| 2009/0222770 A1 * | 9/2009 | Chang | G06F 3/04883 | 715/863 |
| 2009/0307631 A1 * | 12/2009 | Kim | G06F 3/0416 | 715/830 |
| 2010/0026642 A1 * | 2/2010 | Kim | G06F 3/0416 | 345/173 |
| 2010/0058182 A1 * | 3/2010 | Jung | G06F 3/04883 | 715/702 |
| 2010/0162182 A1 * | 6/2010 | Oh | G06F 3/04883 | 715/863 |
| 2010/0164877 A1 | 7/2010 | Yu et al. | | |
| 2010/0169841 A1 * | 7/2010 | Singh | G06F 17/30967 | 715/863 |
| 2010/0169842 A1 * | 7/2010 | Migos | G06F 3/04883 | 715/863 |
| 2010/0182247 A1 * | 7/2010 | Petschnigg | G06F 1/1647 | 345/173 |
| 2010/0185949 A1 * | 7/2010 | Jaeger | G06F 3/04883 | 715/730 |
| 2010/0262591 A1 * | 10/2010 | Lee | G06F 3/04883 | 707/706 |
| 2010/0262905 A1 * | 10/2010 | Li | G06F 3/0482 | 715/702 |
| 2010/0269040 A1 * | 10/2010 | Lee | G06F 3/04817 | 715/702 |
| 2010/0281435 A1 * | 11/2010 | Bangalore | G06F 3/04883 | 715/863 |
| 2010/0295802 A1 * | 11/2010 | Lee | G06F 1/1626 | 345/173 |
| 2010/0306718 A1 * | 12/2010 | Shim | G06F 3/04883 | 715/863 |
| 2010/0321304 A1 * | 12/2010 | Rofougaran | G06F 3/046 | 345/173 |
| 2010/0321312 A1 * | 12/2010 | Han | G06F 1/1694 | 345/173 |
| 2011/0034208 A1 * | 2/2011 | Gu | G06F 3/04883 | 455/550.1 |

(56) References Cited

U.S. PATENT DOCUMENTS

| | | | |
|---|---|---|---|
| 2011/0041102 A1* | 2/2011 | Kim | G06F 3/04883 715/863 |
| 2011/0066984 A1* | 3/2011 | Li | G06F 3/04883 715/863 |
| 2011/0072373 A1* | 3/2011 | Yuki | G06F 3/04817 715/764 |
| 2011/0080608 A1 | 4/2011 | Do et al. | |
| 2011/0093816 A1* | 4/2011 | Chang | G06F 3/0488 715/835 |
| 2011/0209089 A1* | 8/2011 | Hinckley | G06F 1/1647 715/810 |
| 2011/0225547 A1* | 9/2011 | Fong | G06T 13/00 715/835 |
| 2011/0291964 A1* | 12/2011 | Chambers | G06F 1/1616 345/173 |
| 2011/0295877 A1* | 12/2011 | Ying | G06F 17/30967 707/769 |
| 2012/0044243 A1* | 2/2012 | Kim | G06F 3/04883 345/419 |
| 2012/0046077 A1* | 2/2012 | Kim | H04M 1/72577 455/566 |
| 2012/0129495 A1* | 5/2012 | Chae | G06F 3/04817 455/411 |
| 2012/0151400 A1* | 6/2012 | Hong | G06F 3/04817 715/769 |
| 2012/0179999 A1* | 7/2012 | Nesladek | G06F 3/0488 715/835 |
| 2012/0216152 A1* | 8/2012 | Li | G06F 3/0482 715/863 |
| 2012/0302167 A1* | 11/2012 | Yun | G06F 3/04883 455/41.2 |
| 2013/0082965 A1* | 4/2013 | Wada | G06F 3/04883 345/173 |
| 2013/0103712 A1* | 4/2013 | Li | G06F 3/04883 707/769 |
| 2013/0106742 A1* | 5/2013 | Lee | G06F 3/0484 345/173 |
| 2013/0155099 A1* | 6/2013 | Ha | H04M 1/72522 345/619 |
| 2013/0174069 A1* | 7/2013 | Lee | G06F 3/04883 715/769 |
| 2013/0237288 A1* | 9/2013 | Lee | G06F 3/041 455/566 |
| 2013/0257749 A1* | 10/2013 | Woods | H04N 21/42207 345/173 |
| 2013/0321340 A1* | 12/2013 | Seo | G06F 1/1641 345/174 |
| 2014/0038557 A1* | 2/2014 | Kim | H04W 12/06 455/411 |
| 2014/0165012 A1* | 6/2014 | Shen | G06F 9/4451 715/863 |

OTHER PUBLICATIONS

Written Opinion for PCT/KR2014/003625 dated Aug. 20, 2014 [PCT/ISA/237].

Communication dated Mar. 10, 2017, from the European Patent Office in counterpart European Application No. 14787826.8.

Partial Supplementary European Search Report dated Oct. 31, 2016, by the European Patent Office in counterpart European Application No. 14787826.8.

* cited by examiner

USER TERMINAL DEVICE AND CONTROLLING METHOD THEREOF

CROSS-REFERENCE TO RELATED APPLICATION(S)

This application claims priority from Korean Patent Application Nos. 10-2013-0046991, filed in the Korean Intellectual Property Office on Apr. 26, 2013, and 10-2013-0097820, filed in the Korean Intellectual Property Office on Aug. 19, 2013, the disclosures of which are incorporated herein by reference in their entirety.

BACKGROUND

1. Field

Apparatuses and methods consistent with exemplary embodiments relate to a user terminal device and a controlling method thereof, and more particularly, to a user terminal device which displays a screen including an object and performs a control operation corresponding to a user manipulation regarding the object and a controlling method thereof.

2. Description of the Related Art

With the development of electronic technologies, various types of electronic apparatuses have been developed and distributed. In particular, a lot of portable user terminal devices such as mobile phones, tablet personal computers (PCs), laptop PCs, etc. have been widely used these days.

Such user terminal devices may provide services to users using various applications. A user may execute a desired application by selecting an icon displayed on a home screen or an application icon screen.

Accordingly, there is a need for a user interaction technology which allows a user to use a desired service more conveniently and easily.

SUMMARY

Exemplary embodiments address at least the above problems and/or disadvantages and other disadvantages not described above. Also, exemplary embodiments are not required to overcome the disadvantages described above, and an exemplary embodiment may not overcome any of the problems described above.

One or more exemplary embodiments relates to a user terminal device capable of displaying a screen including an object, detecting a user manipulation regarding the object in various ways, and executing at least one control operation conveniently and quickly and a controlling method thereof.

According to an aspect of an exemplary embodiment, there is a provided a user terminal device including a display configured to display a screen including an object, a detector configured to detect a user drawing input which is input on the object or in an area surrounding the object, and a controller configured to, in response to the user drawing input being detected, execute a program corresponding to the object and display, on the display, a screen where the user drawing input is processed as an input of the program.

Herein, the controller may be further configured to, in response to the user drawing input including text, display, on the display, a screen where the text is processed as an input of the program.

The controller may be further configured to, in response to the object being a search widget, perform a search regarding the recognized text and display, on the display, a result of the search.

The controller may be further configured to, in response to the user drawing input including a symbol, display, on the display, a screen where the symbol is processed as an input of the program.

The controller may be further configured to, in response to the object being an icon matched with a mail program, display, on the display, a mail writing screen to transmit mail to a mail address corresponding to the text.

The controller may be further configured to, in response to the object being an icon matched with a messenger program, display, on the display, messenger contents which are exchanged with another user corresponding to the text.

The user drawing input may be input through a touch-and-drag manipulation using a user's body or a pen.

According to an aspect of another exemplary embodiment, there is provided a user terminal device including a display configured to display a screen including a plurality of objects, a detector configured to detect a user manipulation on the screen, and a controller configured to, in response to a connection line between a first object and a second object from among the plurality of objects being drawn according to the user manipulation, perform a first control operation corresponding to the first object and a second control operation corresponding to the second object in association with each other.

Herein, the controller may be further configured to display a first screen by executing a first program corresponding to the first object, and in response to a user manipulation being performed on the first screen, execute a second program corresponding to the second object and display a second screen which reflects a result according to the user manipulation.

Also, the controller may be further configured to determine a content which is displayed on the first screen according to a type of the second program.

According to an aspect of another exemplary embodiment, there is provided a controlling method of a user terminal device includes displaying a first screen including an object, detecting a user drawing input which is input on the object or in an area surrounding the object, and executing, in response to the user drawing input being detected, a program corresponding to the object and displaying a second screen where the user drawing input is processed as an input of the program.

The displaying the second screen may include, in response to the user drawing input including text, displaying a screen where the text is processed as an input of the program.

The displaying the second screen may include, in response to the object being a search widget, performing a search regarding the text and displaying a result of the search.

The displaying the screen may include, in response to the user drawing input including a symbol, displaying a screen where the symbol is processed as an input of the program.

The displaying the second screen may include, in response to the object being an icon matched with a mail program, displaying a mail writing screen to transmit mail to a mail address corresponding to the text.

The displaying the second screen may include, in response to the object being an icon matched with a messenger program, displaying messenger contents which are exchanged with another user corresponding to the text.

The displaying the second screen may further include, in response to the user drawing input being detected while a predetermined condition is satisfied, displaying the second screen according to the user drawing input, and in response to the user drawing input being detected while the condition is not satisfied, changing the first screen by page unit according to a direction of the user drawing input.

According to an aspect of another exemplary embodiment, there is provided a controlling method of a user terminal device including displaying a screen including a plurality of objects, detecting a user manipulation on the screen, and in response to a connection line between a first object and a second object from among the plurality of objects being drawn according to the user manipulation, performing a first control operation corresponding to the first object and a second control operation corresponding to the second object in association with each other.

Herein, the performing may include displaying a first screen by executing a first program corresponding to the first object, and executing, in response to a separate user manipulation being performed on the first screen, a second program corresponding to the second object and displaying a second screen which a result according to the separate user manipulation on the first screen is reflected.

The performing may further include determining a content which is displayed on the first screen according to a type of the second program.

According to an aspect of another exemplary embodiment, there is provided a user terminal device including a display configured to display a screen including an object, a detector configured to detect a user manipulation on the screen, and a controller configured to, in response to a first area of the object being selected according to the user manipulation, perform a first control operation related to the object, and in response to a second area of the object being selected, perform a second control operation related to the object.

According to an aspect of another exemplary embodiment, there is provided a user terminal device, including a controller configured to, in response to a first user manipulation on a screen displaying a first object and a second object being detected, determine whether the first object and the second object are selected by the first user manipulation, and in response to it being determined that the first object and the second object are selected, execute a first program corresponding to the first object and a second program corresponding to the second object. The first program and the second program are executed separately or in association with each other according to a type of the first control operation and the second control operation.

The controller may be further configured to, in response to the first program and the second program being executed separately, simultaneously display a first screen corresponding to executing the first program and a second screen corresponding to executing the second program.

The controller may be further configured to, in response to the first program and the second program being executed in association with each other, display a first screen corresponding to executing the first program and, in response to a second user manipulation being performed on the first screen, display a second screen corresponding a result of the second user manipulation.

The controller may be further configured to, in response to the first program and the second program being executed in association with each other, display a screen corresponding to executing the first program and the second program simultaneously.

According to an aspect of another exemplary embodiment, there is provided a controlling method of a user terminal device, including detecting a user manipulation on a screen displaying a first object and a second object, determining whether the first object and the second object are selected by the user manipulation, and executing, in response to determining that the first object and the second object are selected by the user manipulation, a first program corresponding to the first object and a program corresponding to the second object. The first program and the second program are performed separately or in association with each other according to a type of the first control operation and the second control operation.

In response to the first program and the second program being executed separately, the executing may include simultaneously displaying a first screen corresponding to executing the first program and a second screen corresponding to executing the second program.

In response to the first program and the second program being executed in association with each other, the executing may include displaying a first screen corresponding to executing the first program, and displaying, in response to a second user manipulation being performed on the first screen, a second screen corresponding a result of the second user manipulation.

In response to the first program and the second program being executed in association with each other, the executing may include displaying a screen corresponding to executing the first program and the second program simultaneously.

According to various exemplary embodiments, a user terminal device may perform at least one control operation promptly according to a user manipulation regarding an object. Thus, a user may conveniently receive a service that he/she wants.

BRIEF DESCRIPTION OF THE DRAWINGS

The above and/or other aspects will become more apparent by describing certain exemplary embodiments with reference to the accompanying drawings, in which.

DETAILED DESCRIPTION OF EXEMPLARY EMBODIMENTS

Figure 1:
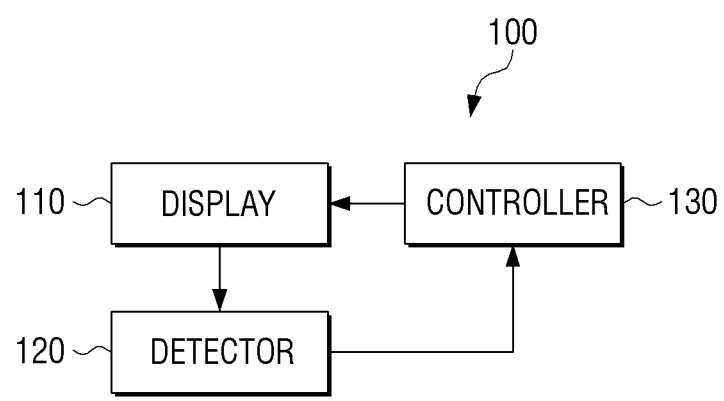
FIG. 1 is a view illustrating a configuration of a user terminal device according to an exemplary embodiment.

Certain exemplary embodiments will now be described in greater detail with reference to the accompanying drawings.

It should be observed that the method steps and system components have been represented by conventional symbols in the figures. In the following description, the same drawing reference numerals are used for the same elements, even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail. Further, in the following description, relational terms such as first and second, and the like, may be used to distinguish one entity from another entity, without necessarily implying any actual relationship or order between such entities.

FIG. 1 is a block diagram provided to explain a configuration of a user terminal device according to various exemplary embodiments. According to FIG. 1, a user terminal device 100 includes a display 110, a detector 120, and a controller 130.

The user terminal device 100 refers to various types of electronic apparatuses which are usable by a user. For example, the user terminal device 100 may be realized as various types of devices such as mobile phones, tablet PCs, laptop PCs, personal digital assistants (PDAs), MP3 players, electronic album devices, televisions (TVs), PCs, kiosks, and so on. In FIG. 1, only certain elements which are involved in the operations according to the various exemplary embodiments are illustrated, and illustrations of the remaining detailed elements are omitted.

The display 110 may display various types of screens such as a home screen, an icon screen, a list screen, an application execution screen, a web browser screen, a content play screen, and so on. The home screen refers to a screen which is displayed after the user terminal device 100 is turned on and preparation for system is completed. The home screen may also refer to a screen from which an application or a widget can be selected. The home screen may also be referred to as a basic screen, an initial screen, a main screen, an unlock screen, etc. The icon screen refers to a screen where icons regarding the applications installed in the display 110 are displayed, and a list screen refers to a screen where information regarding the applications installed in the display 110 is arranged and displayed in the form of list. The application execution screen refers to a screen which is rendered by the execution of an application, and a web browser screen refers to a screen where a web page received from an external web server is displayed by the execution of a web browser. The content play screen refers to a screen where multimedia contents are reproduced and their video frames are displayed. In addition, the display 110 may display various other types of screens.

Various types of objects such as icons, text, images, photos, etc. may be included on the screen which is displayed on the display 110. For example, the home screen may include various objects such as a specific icon selected by a user, various widget information, a folder icon, etc. The detector 120 may detect a user manipulation with respect to the display 110.

A user manipulation may be input through various means such as a user's finger or other body parts, a pen (e.g., a stylus), etc., and depending on the manipulation method, may be classified as a touch manipulation, a hovering manipulation, a gazing manipulation, a motion gesture manipulation, a voice input manipulation, and so on.

The touch manipulation refers to an operation where a user touches a screen using an input means, and the hovering manipulation refers to an operation of approaching an input means close to a screen. The touch manipulation may include a user's drawing input where a user draws a number, text, a symbol, a sign, etc. on the screen. The user's drawing input may be realized as a touch-and-drag manipulation using a user's body part or a pen. Meanwhile, the gazing manipulation refers to an operation where a user gazes part of the screen for a predetermined time. The motion gesture manipulation refers to an operation where a user makes a predetermined motion gesture in front of the user terminal device 100 so that a control operation matching with the motion gesture can be performed. The voice input manipulation refers to an operation where a user utters a voice command so that a control operation matching with the voice command can be performed.

The detector 120 is an element to detect a user manipulation. The detector may be realized in various ways depending on a user's manipulation means and methods. For example, to detect a touch manipulation, the detector 120 may be realized as various types of touch sensors such as capacitance-type, resistive-type, and piezoelectric-type sensors. The capacitive sensor calculates touch coordinates by sensing electricity excited by a user's body when part of the user's body touches the surface of the display 110 by using a dielectric coated on the surface of the display 110. The resistive sensor comprises two electrode plates, and calculates touch coordinates as the upper and lower plates of the touched point contact with each other to sense flowing electric current when a user touches a screen.

Meanwhile, if an input means is a pen including a coil, the detector 120 may include a geomagnetic sensor to sense a magnetic field which is changed by the coil in the pen. Accordingly, in addition to sensing a touch manipulation, an approach manipulation, that is, a hovering, may also be detected. For example, the detector 120 may detect a user's drawing input which is performed in an object included in the screen of the display 110 or in the vicinity of the object. The configuration of the detector 120 will be described in greater detail later.

When a user manipulation is detected, the detector 120 communicates the detection result to the controller 130. For example, if a user touches a certain point on the screen using user's finger or a pen, the detector communicates x, y coordinates of the touched point to the controller 130. When the user moves the touched point, the detector 120 communicates the changed coordinates of the touched point to the controller 130 in real time. When a user manipulation with respect to an object displayed on the display 110 is detected, the controller 130 may perform an appropriate control operation according to the object and the user manipulation. At least one control operation may be matched with each object displayed on the screen as a default or by a user's setting.

The controller 130 may perform a control operation corresponding to an object selected by a user. The control operation refers to executing a specific application of the user terminal device 100 and displaying its execution screen, or performing a predetermined specific function. In addition, when a user's drawing input is performed on an object or in the vicinity of the object, the controller 130 may execute a program corresponding to the object, and display a screen where the user's drawing input is processed as an input of the program on the display 110. Hereinafter, the examples of performing various control operations according to an object and a user manipulation will be described in greater detail.

<Example of Designating Objects in a Lump>

Figure 2:
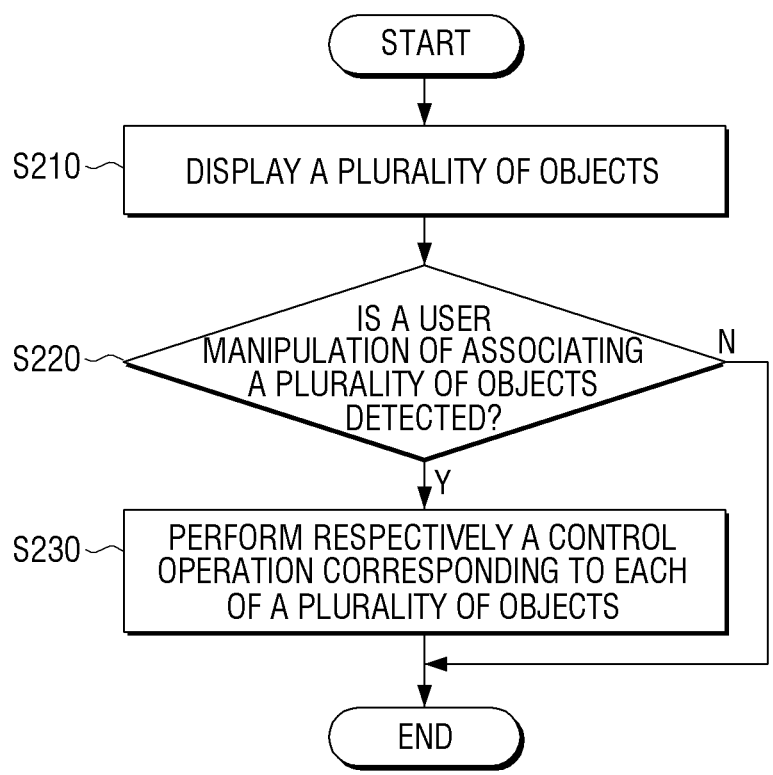
FIG. 2 is a flowchart provided to explain a control method of a user terminal device according to an exemplary embodiment.

FIG. 2 is a flowchart provided to explain a control operation according to an exemplary embodiment. According to FIG. 2, the user terminal device 100 may display a screen including a plurality of objects (S210). Herein, the screen may be realized as various screens such as a home screen, an icon screen, a list screen, an application execution screen, a web browser screen, a content play screen, etc. as described above. For example, the user terminal device 100 may display various icons, widget information, etc. on the home screen. In this state, the user terminal device 100 determines whether a user manipulation of associating a plurality of objects is detected (S220).

The user manipulation of associating a plurality of objects may be performed in various ways. For example, the manipulation may be at least one of drawing a closed curve including a plurality of objects, drawing a connection line between a plurality of objects, performing a multi-touch manipulation of touching each of a plurality of objects, covering an area where a plurality of objects is displayed, and so on. These manipulations are examples of touch manipulations. A voice manipulation may include a user manipulation of uttering the titles of a plurality of objects in a row or a user manipulation of uttering a voice command which is set to associate a plurality of control operations.

In addition, when a specific motion gesture is detected during a motion manipulation, it may be determined that the specific motion gesture is a user manipulation of associating a plurality of objects. When such a user manipulation is detected, the controller 130 may perform a control operation corresponding to each of a plurality of objects which are associated by the user manipulation (S230). The control operation may be performed in various ways.

Hereinafter, the examples of a user manipulation of associating a plurality of objects and the corresponding control operation will be described in greater detail.

Figure 3:
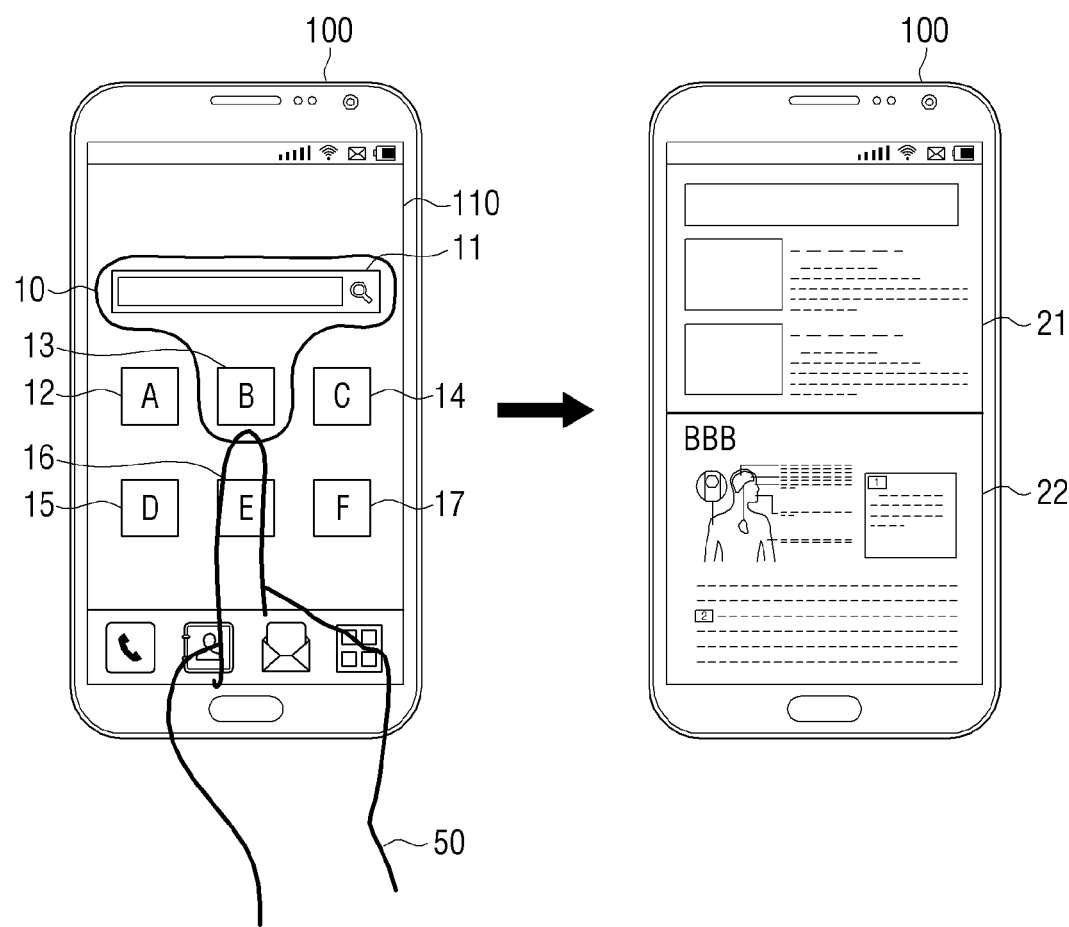
FIGS. 3 to 8 are views provided to explain examples of various user manipulations and related operations.

FIG. 3 is a view illustrating a case where a plurality of objects are selected simultaneously according to a user manipulation of drawing a closed curve. FIG. 3 illustrates an example where a home screen including widget information 11 and various icons 12~17 is displayed. In this state, if a user draws a closed curve 10 on the screen using an input means such as his or her finger 50 or a pen, the detector 120 communicates the touched point to the controller 130. The controller 130 recognizes a drawing trace by connecting touched points successively. Subsequently, the controller 130 renders a graphic line 10 in predetermined color and thickness along the drawing trace on the display 110. The graphic line 10 is displayed in an overlapping manner on the home screen. When there is an overlapping part while the graphic line 10 is being drawn, the controller 130 recognizes its internal area as a closed curve. The controller 130 determines the types of objects displayed within the closed curve.

FIG. 3 illustrates an example where the widget information 11 and the icon B 13 are included in the closed curve consisting of the graphic line 10. In this case, the controller 130 executes a control operation corresponding to the widget information 11 and the icon B 13, respectively, and displays their execution screens 21, 22 in a row. That is, with only one user manipulation, a plurality of applications may be executed and accordingly, a plurality of application execution screens may be displayed.

FIG. 3 illustrates a closed curve where the starting point and the finishing point of a user manipulation are the same. However, even if a user manipulation does not form a closed curve, the same operation as FIG. 3 may be performed as long as the user manipulation can be interpreted as an operation of selecting a plurality of objects simultaneously. For example, if a user's drawing trace forms a curve, but the curve is not closed, the controller 130 checks the entire length of the drawing and the distance between traces. If the distance between traces are small enough in comparison with the entire length of the drawing and there is at least one object displayed inside the circle, the controller 130 may determine that a user draws a closed curve. Accordingly, it may be determined that the object inside the circle is selected. According to another example, a plurality of objects may be associated according to manipulations of drawing various lines other than a closed curve. For example, if a user draws a line which crosses objects A, B, C (12, 13, 14) in turn, the controller 130 may determine that the objects A, B, C (12, 13, 14) are selected, respectively, and may associate the corresponding control operations A, B, C to each object in a parallel manner and perform the operations.

For example, if control operations are performed in a parallel manner, and a straight line or a curve is drawn on a music file icon, a photo icon, and a message service icon, a music file play screen, a photo screen, and a text message screen may be lined up and displayed on the full screen. On the other hand, if control operations are performed in association with each other, a control operation, where a text message screen, where a music file and a photo are attached, is displayed on the screen, may be performed. As described above, a plurality of control operations may be performed separately or in association with each other according to a user manipulation.

FIG. 3 illustrates that when a plurality of objects are grouped or a line connecting a plurality of objects is drawn, a control operation matched with each object is executed, respectively, but there may be other exemplary embodiments. For example, when a plurality of objects are grouped as one group, or a plurality of objects are connected with each other, an editing operation may be performed with respect to the objects, that is, the objects may be moved, copied, or deleted in a lump. Specifically, if one of objects which belong to one group or which are connected with each other is touched and dragged to another location by a user, the other objects which are grouped together or connected each other may also be moved. In another example, a plurality of objects which are grouped together or connected each other may be moved into a single folder. These operations may also be applied to other exemplary embodiments which will be described later.

Figure 4:
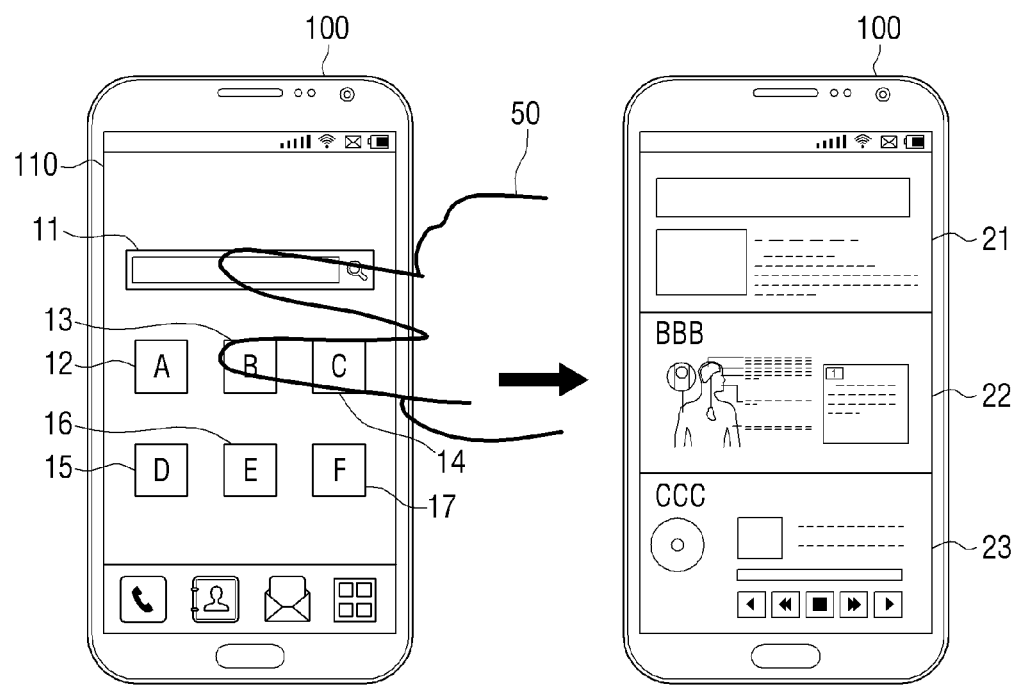

FIG. 4 illustrates a case where a plurality of objects are selected by a covering manipulation of covering an area where the plurality of objects are displayed at once. As illustrated in FIG. 4, when a user covers a plurality of objects 11, 13, 14 using the entire palm 50 or at least one finger, the detector 120 provides the controller 130 with information regarding the covered area. The controller 130 confirms objects displayed in the corresponding area and performs control operations corresponding to the objects, respectively.

FIG. 4 illustrates an example where widget 11 and two icons 13, 14 are covered by a user's hand and accordingly, the execution screens 21, 22, 23 of programs corresponding to the each of the widget 11 and icons 13, 14, respectively, are displayed in order. The detector 120 may detect a covering manipulation using a touch sensor. If a touch area detected by the detector 120 is larger than a predetermined size, the controller 130 may determine that all of the objects displayed in the touched area are selected. Accordingly, as illustrated in FIG. 4, control operations matched with each object are performed in a lump.

Figure 5:
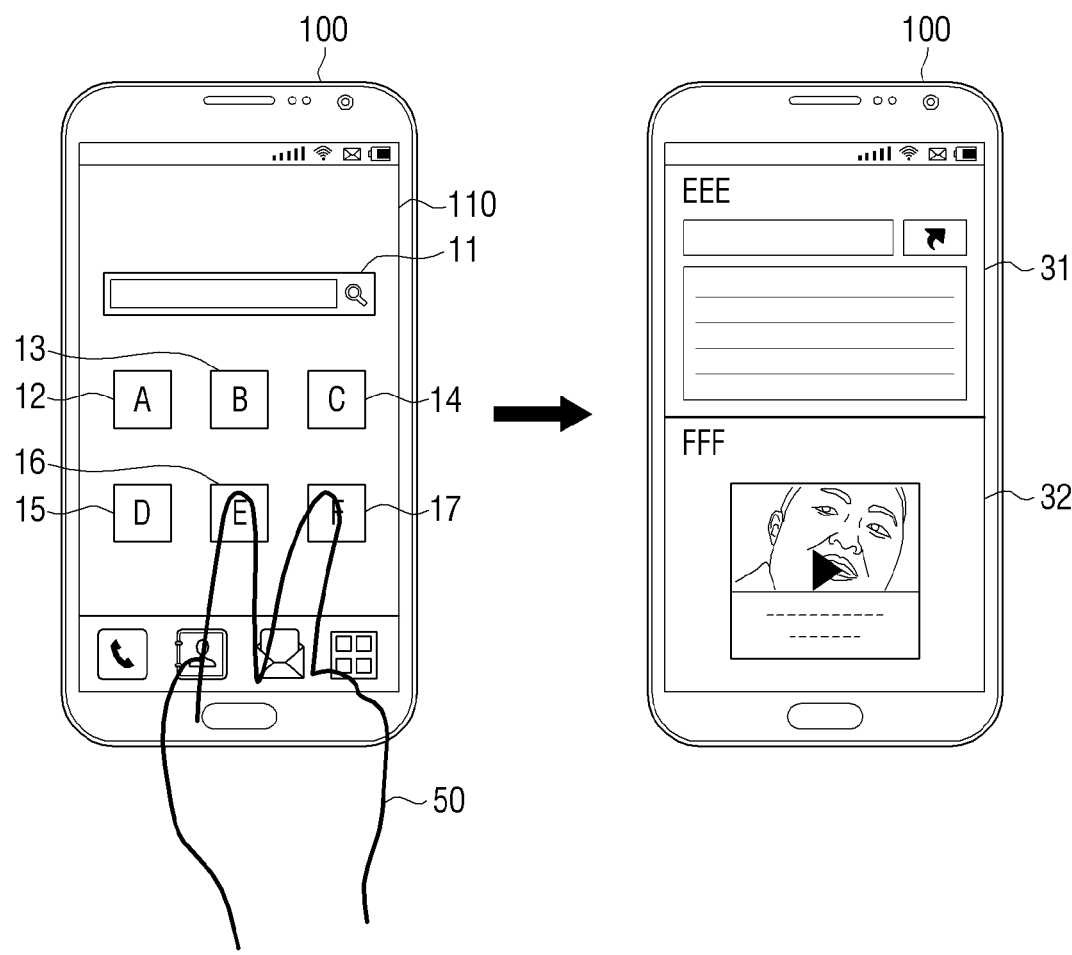

FIG. 5 illustrates a case where a plurality of objects are selected by a multi-touch manipulation of touching the plurality of objects simultaneously. If such a multi-touch manipulation is detected, the detector 120 provides the controller 130 with information regarding the number and location of the touched points. If there are a plurality of touched points and an object is displayed at each of the touched points, the controller 130 determines that the objects are selected simultaneously. FIG. 5 illustrates a case where two objects 16, 17 are selected simultaneously. Accordingly, execution screens 31, 32 of applications corresponding to each of the selected objects 16, 17, respectively, may be displayed in order.

In FIGS. 3 to 5, the length of the display 110 is greater than the width of the display 110, but the length and the width of the display 110 may be realized in various ways depending on the type of the user terminal device 100. In addition, if a plurality of applications are executed, the arrangement order of their execution screens may be realized in various ways depending on the shape and size of the display 110. That is, unlike the examples illustrated in FIGS. 3 to 5, in the case where a user terminal device 100 has a display where the width is greater than the length, each execution screen may be arranged and displayed in a horizontal direction.

In FIGS. 3 to 5, each of the applications corresponding to a plurality of objects is executed and a plurality of execution screens are provided. However, the controller 130 may also associate control operations corresponding to each of a plurality of objects which are selected simultaneously by a user manipulation with each other and perform the control operations.

The association operation may be performed in various ways. For example, if a thumbnail photo and a mail icon are selected simultaneously by a drawing manipulation, a covering manipulation, multi-touch manipulation, etc., the controller 130 may generate a mail writing screen where the thumbnail photo is attached automatically and display the screen on the display 110. Accordingly, the process of the related art of executing a mail program first, and then searching for a photo to be attached may be avoided, and inputting an attachment command is may omitted, and a user may directly perform a desired control operation. Similarly, if a mail icon and a schedule icon are selected together, the controller 130 may directly generate a schedule generating screen where various schedule information recorded in exchanged mails is reflected. Further, if a search program icon and a specific content icon are selected together, the controller 130 may automatically search information regarding the corresponding content and directly display a screen which shows the search result.

Figure 6:
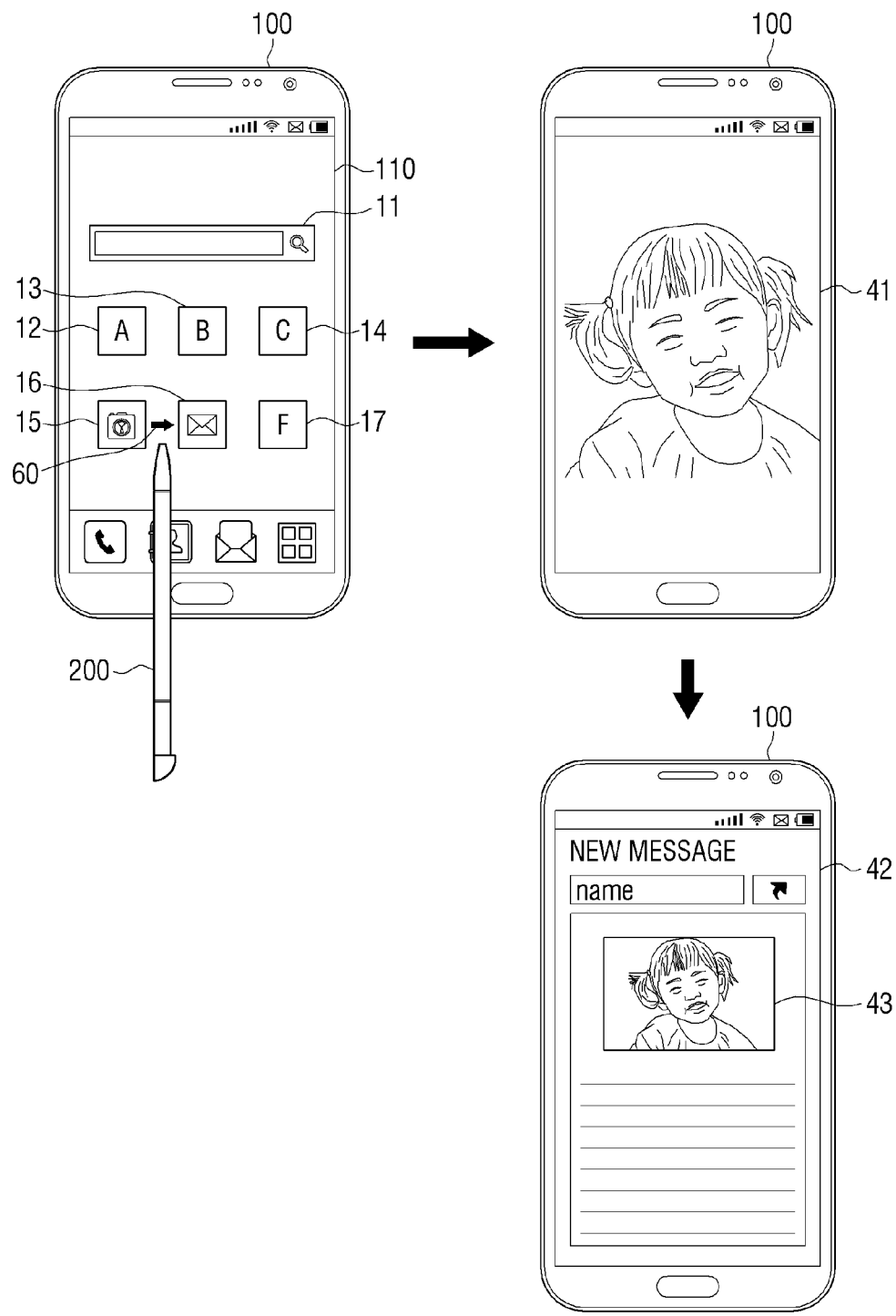

FIG. 6 is a view provided to explain another manipulation method of associating a plurality of objects and a method of performing the association operation thereof. As illustrated in FIG. 6, a user may draw a connection line 60 between a plurality of objects.

If the connection line 60 is drawn between the first and the second objects 15, 16 from among a plurality of objects, thereby connecting two objects 15, 16, the controller 130 of the user terminal device 100 may associate the first control operation corresponding to the first object 15 with the second control operation corresponding to the second object 16, and perform the operations. Specifically, the controller 130 may execute the first program corresponding to the first object 15, and display the first screen 41. A user may input a certain user manipulation with respect to the first screen 41. The controller 130 performs an operation according to the user manipulation and as a result, obtains data of execution result of the first program.

In addition, the controller 130 executes the second program corresponding to the second object 16. The controller 130 provides the second program with the data of execution result which is obtained by the user manipulation with respect to the first program, and displays the second screen which reflects the result. FIG. 6 illustrates an example where the first object 15 is a camera icon, and the second object 16 is a message service icon.

As illustrated in FIG. 6, a user may input a manipulation of drawing the connection line 60 between the camera icon 15 and the message service icon 16 using an input means such as his or her finger 50 or a pen 200. In this case, the controller 130 may execute a camera application, and display a live-view screen 41 first by activating a camera (not shown). In this state, if the user inputs a photographing command, the controller 130 directly displays a text message writing screen 42 where a photographed image 43 is attached automatically.

In FIG. 6, the connection line 60 is illustrated as an arrow, but the shape of the connection line 60 is not necessarily limited thereto. That is, the connection line 60 may be realized in various ways, such as a solid line, a dotted line, a curved line, etc. If the connection line 60 is realized in an arrow shape as illustrated in FIG. 6, the controller 130 may determine the execution order of applications in consideration of the directivity of the arrow. That is, if a predetermined time elapses after a user's drawing is completed, the controller 130 may analyze the trace of the user's drawing and determine the shape. If it is determined that the shape of the drawing has a similarity, which is higher than a certain ratio, with an arrow pattern registered in predetermined database, the controller 130 may determine that an arrow is drawn, and may decide a directivity according to the location of the arrowhead. Therefore, the controller 130 execute applications matched with each object 15, 16 sequentially based on the direction of the arrow and the location of each object 15, 16.

If an arrow is drawn from the camera icon 15 towards the message icon 16 as illustrated in FIG. 6, the controller 130 displays the photographing screen 41 by executing a camera program first. In this state, if a user completes photographing, the controller 130 displays the text message writing screen 42 by executing a mail program. On the other hand, if an arrow is drawn from the message icon 16 towards the camera icon 15, the controller 130 may display the text message writing screen 42 first. In this state, if a writing is completed, the controller 130 displays the photographing screen 41. If photographing is completed through the photographing screen 41, the controller 130 may attach the photographed image automatically and transmit the text message. Unlike an arrow, if the connection line has no directivity, the controller 130 may determine the execution order of applications by recognizing the direction in which a connection line is drawn. That is, if a connection line is drawn from left to right, a control operation corresponding to a left object may be performed first, and if a connection line is drawn from right to left, a control operation corresponding to a right object may be performed first.

Meanwhile, even if the manipulation of drawing a connection line is performed as illustrated in FIG. 6, it may be necessary to perform an associated control operation. That is, depending on exemplary embodiments, even if a connection line is drawn as illustrated in FIG. 6, each application may need to be executed in parallel, and a plurality of execution screens may be displayed simultaneously.

In addition, when a plurality of objects are associated with each other by a connection line, the controller 130 may display each screen in consideration of the type of two programs which are associated with each other. That is, when displaying the first screen which is the execution screen of the former program, the controller 130 may determine the contents to be displayed on the first screen differently by considering the type of the latter program. Herein, the former program refers to the first program corresponding to the first object 15 which is close to a point that is touched first to draw the connection line 60, and the latter program refers to the second program corresponding to the second object 16 which is close to a point that is touched last to draw the connection line 60.

Figure 7:
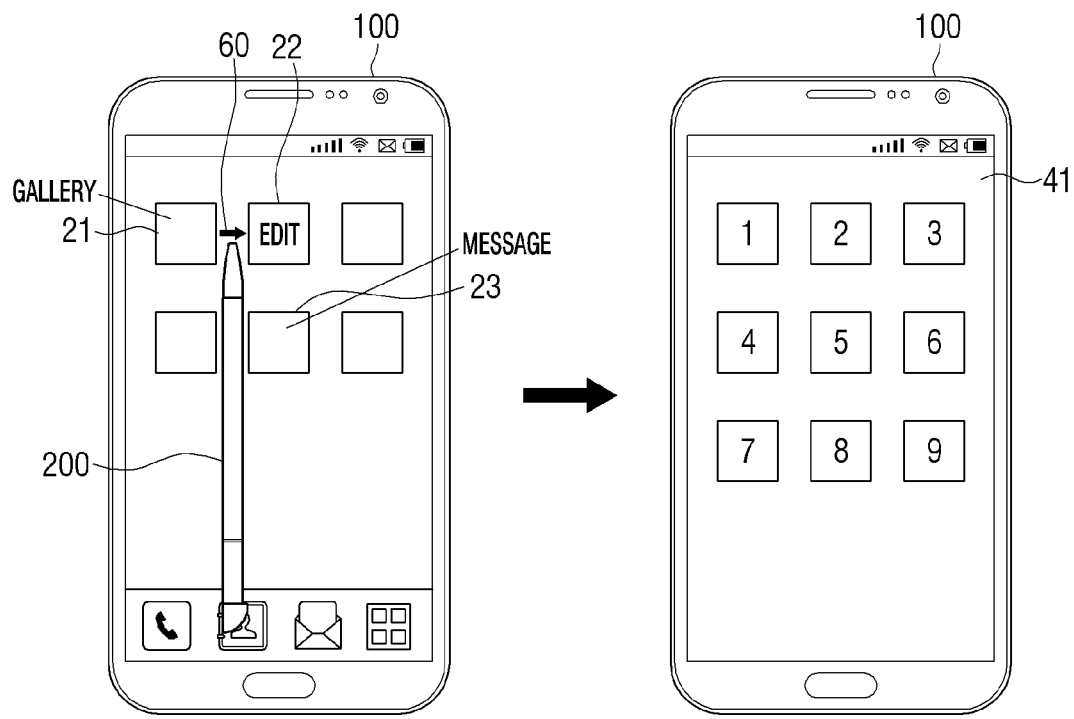
Figure 8:
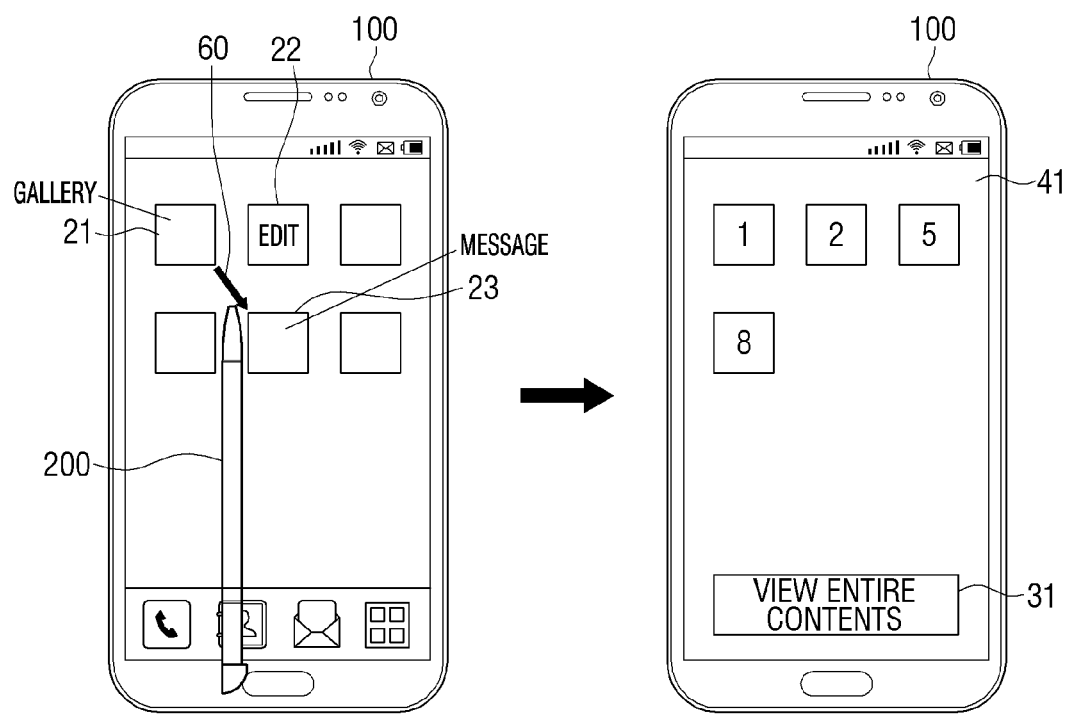

FIGS. 7 and 8 are views provided to explain operations of the user terminal device 100 according to the above exemplary embodiments. FIG. 7 illustrates a state where the connection line 60 is drawn between the first object 21 matched with a gallery program and the second object 22 matched with an editing program. In this case, the controller 130 may display pre-stored photos and video contents 1~9 on the first screen 41. In this state, if a user selects one content, the controller 130 may display an editing screen to edit the selected content.

FIG. 8 illustrates a state where the connection line 60 is drawn between the first object 21 matched with a gallery program and the second object 23 matched with a message service program. In this case, the controller 130 selectively displays only those contents 1, 2, 5, 8 which are set be shared from among the pre-stored contents 1~9 on the first screen 41. In addition, the first screen 41 may also display the menu 31 to view the entire contents.

As such, when a plurality of objects are connected by a connection line, the contents displayed on the execution screen of the former program may be changed depending on the type and characteristics of the latter program.

In addition, the controller 130 may directly display an execution screen of a latter program corresponding to a user manipulation rather than always displaying an initial screen. In the above exemplary embodiments, the method of performing a plurality of control operations according to a user manipulation of associating a plurality of objects is described in detail.

In the above exemplary embodiments, each object is displayed in the shape and size which are designed by the manufacturing company or the application writer of a user terminal device, but objects may be generated as a user of the user terminal device directly draws them. That is, according to another exemplary embodiment, a user may directly generate an object on the home screen and match the object with a desired control operation to configure the home screen.

Hereinafter, for convenience of explanation, a home screen which can be designed directly by a user will be referred to as a User Creative Screen (UCS) and a screen which is designed by the manufacturing company or the application writer of a user terminal device will be referred to as a basic screen. The various exemplary embodiments may be performed not only on the basic screen but also on the user creative screen.

Accordingly to another exemplary embodiment, a user may match a plurality of control operations with one object in advance, and select the object to execute the plurality of control operations at once. In this case, a user may simply select and use a plurality of control operations without associating a plurality of objects each time, which will be explained in greater detail below.

<Example of Matching a Control Operation with an Object>

Figure 9:
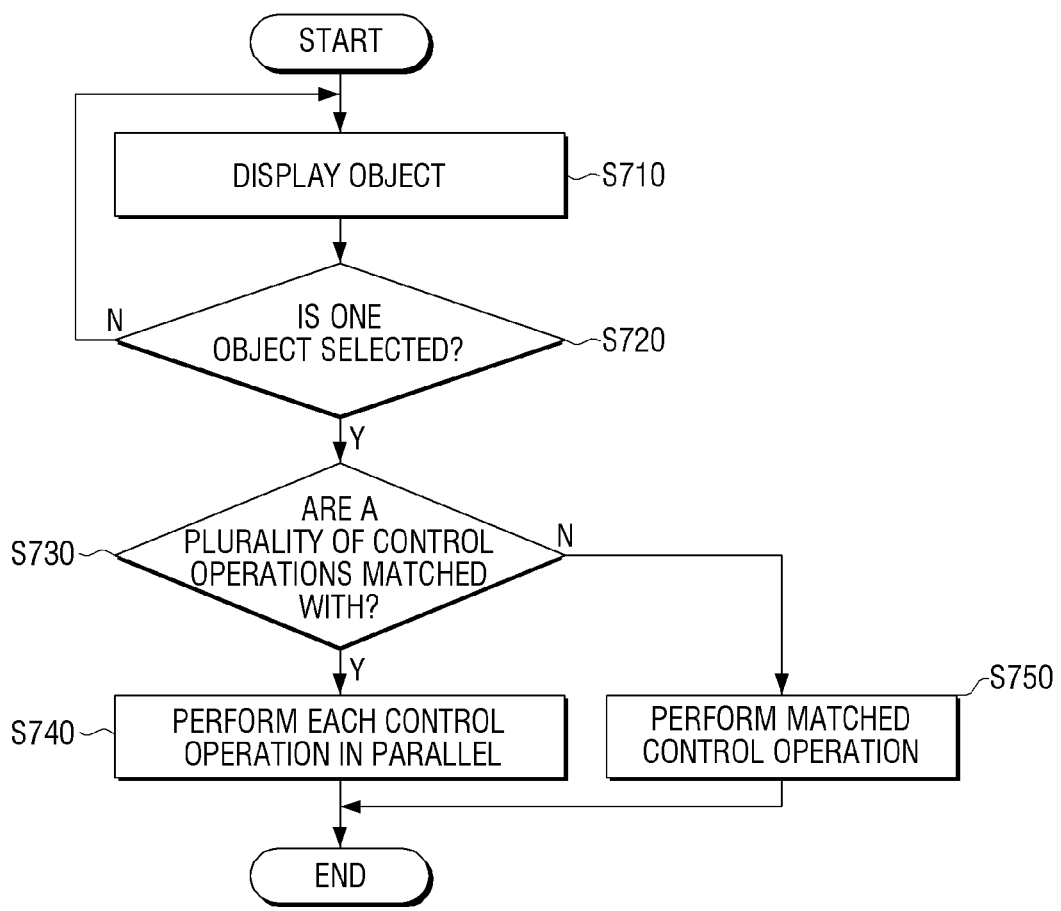
FIG. 9 is a flowchart provided to explain a controlling method of a user terminal device according to another exemplary embodiment.

FIG. 9 is a flowchart provided to explain a method of controlling a user terminal device 100 according to another exemplary embodiment.

According to FIG. 9, a user terminal device displays 100 at least one object (S710). The object is not limited to an icon, and the object may be displayed in various forms such as text, an image, a photo, etc.

In this state, when a user selects one object (S720), the controller 130 of the user terminal device 100 determines whether a plurality of control operations are matched with the selected object (S730). To do so, a storage (not shown) of the user terminal device 100 may store information regarding control operations matched with each object.

If it is determined that a plurality of control operations are matched, the controller 130 performs each control operation in parallel (S740). For example, if a mail application and a diary application are matched with one object and the object is selected, the controller 130 executes the mail application and the diary application respectively, and displays the execution screens of each application simultaneously.

On the other hand, if only one control operation is matched with the selected object, the controller 130 performs the matched control operation (S750).

Figure 10:
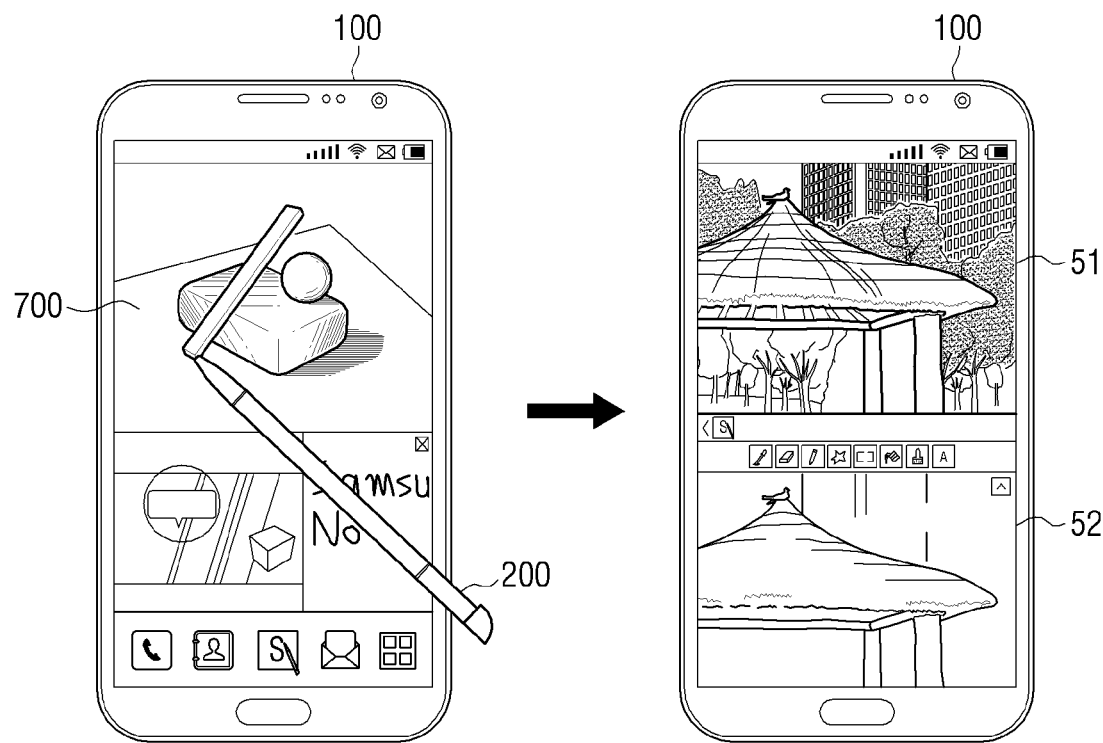
FIGS. 10 to 12 are views provided to explain an operation of a user terminal device according to the exemplary embodiment of FIG. 9.

FIG. 10 is a view provided to explain an operation of a user terminal device 100 according to the controlling method of FIG. 9. According to FIG. 10, the user terminal device 100 displays at least one object 700. In FIG. 10, the object 700 is generated as a user directly draws on the screen using his or her finger or a pen.

In FIG. 10, if it is assumed that a gallery program and a picture board program are matched with the object 700, when the object 700 is selected, the controller 130 displays the execution screens 51, 52 of the gallery program and the picture board program on the screen, respectively. The execution screen 51 of the gallery program may display thumbnail images of various photos stored in the user terminal device 100, and an enlarged photo of one of the various photos. The execution screen 52 of the picture board program may display an area where a user may draw a picture, and a picture may be drawn as the finger of the user or a pen moves.

In FIG. 10, a user may draw a picture on the execution screen 52 of the picture board program while watching the execution screen 51 of the gallery program.

Meanwhile, the number and type of control operations which can be matched with one object may vary. For example, if a video play program rather than the picture board program is matched in FIG. 10, a user may view photos which have been previously photographed on one screen 51 and watch a video on the other screen 52.

Figure 11:
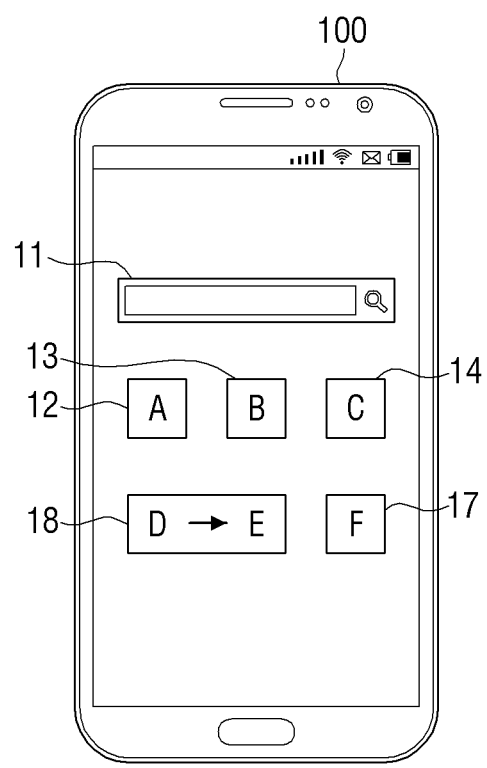

FIG. 11 is a view illustrating another example of an object where a plurality of control operations are matched. According to FIG. 11, an object 18 including icons D, E which are matched with different control operations and an arrow connecting them may be displayed. The shape of the object 18 may be drawn directly by a user, or may be provided by the manufacturer or the application developer of the user terminal device 100. When the object 18 is selected, the controller 130 performs the control operation corresponding to icon D and the control operation corresponding to icon E sequentially.

For example, if icon D is matched with a camera program and icon E is matched with a mail program, when the icon D is selected, the controller 130 executes the camera program first to display the photographing screen. In this state, if a user completes photographing, the controller 130 executes the mail program to execute the mail writing screen.

Figure 12:
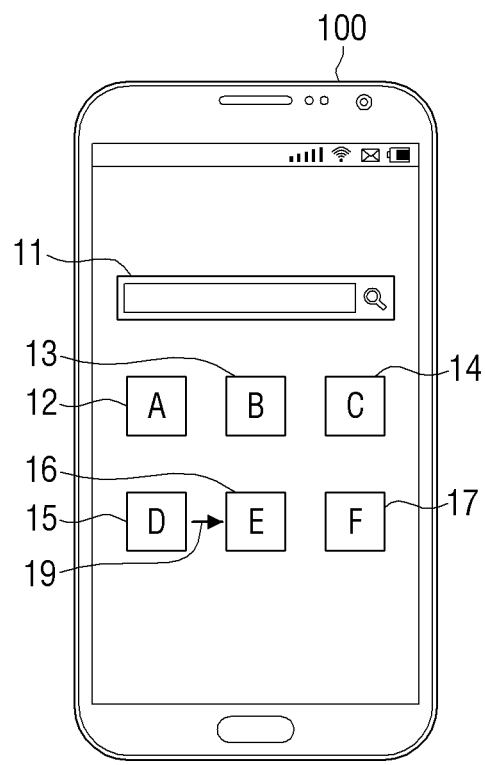

FIG. 12 is a view illustrating another example of an object a plurality of control operations are matched. According to FIG. 12, an additional object 19 which connects the objects may be displayed. When icon D 15 is selected, the controller 130 performs the first control operation corresponding to the selected icon D 15, and when icon E 16 is selected, the controller 130 performs the second control operation corresponding to the selected icon E 16. On the other hand, when the additional object 19 is selected, the first and the second operations are performed sequentially.

In the above exemplary embodiment, when a plurality of control operations are matched with one object and the object is selected, the plurality of control operations are executed simultaneously or sequentially. However, according to another exemplary embodiment, only a part of a plurality of control operations may be performed according to a manipulation pattern of a user.

<Example of Performing a Different Control Operation According to a Manipulation Pattern>

Figure 13:
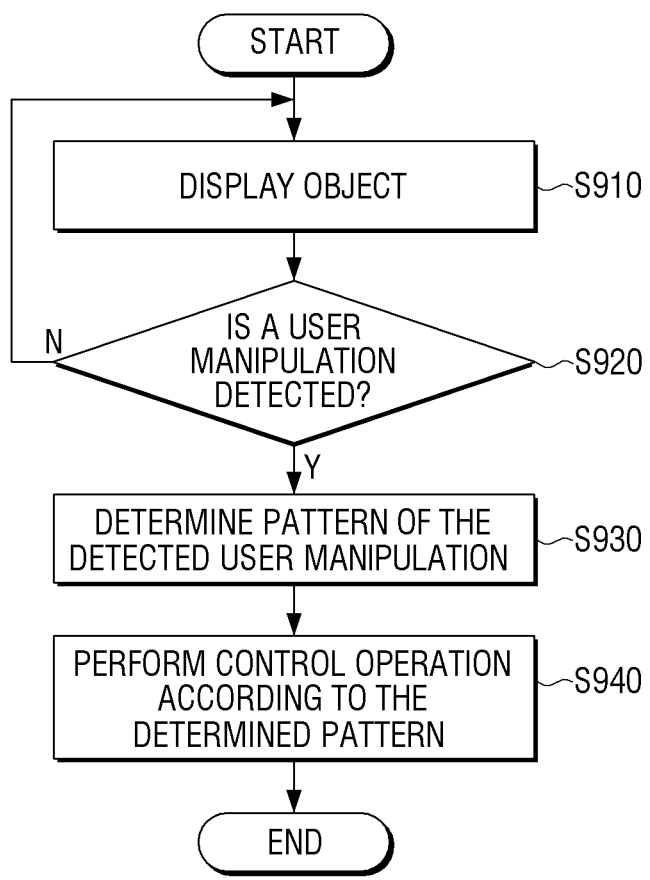
FIG. 13 is a flowchart provided to explain a controlling method of a user terminal device according to another exemplary embodiment.

FIG. 13 is a block diagram illustrating a configuration of a user terminal device 100 according to another exemplary embodiment. According to FIG. 13, when a user manipulation is detected (S920) while an object is displayed (S910), the user terminal device 100 determines its pattern (S930).

That is, according to an exemplary embodiment, the user terminal device 100 may store a plurality of manipulation patterns which are set for one object and control operations matched with the manipulation patterns. The manipulation patterns may be classified according to the direction, intensity, frequency, manipulation means, etc. of a user manipulation.

For example, if the direction of a user manipulation is considered as a standard, the first user manipulation of crossing one object in a horizontal direction and the second user manipulation of crossing one object in a vertical direction may be regarded as two different patterns of manipulations. Accordingly, the first control operation may be matched with the first user manipulation, and the second control operation may be matched with the second user manipulation.

Alternatively, if the intensity of a user manipulation is considered as a standard, the first control operation may be matched with a user manipulation of which intensity, pressure, or touched size is greater than a threshold value, and the second control operation may be matched with a user manipulation of which intensity, pressure, or touched size is lower than a threshold value.

In addition, if the frequency of a user manipulation is considered as a standard, the first control operation may be matched with a single tap, and the second control operation may be matched with a double tap.

In addition, if the manipulation means is considered as a standard, the first control operation may be matched with a touch manipulation of using a finger, and the second control operation may be matched with a touch manipulation using a pen.

Alternatively, with respect to the first user manipulation of crossing an object in a horizontal direction, a vertical direction, or a diagonal direction, the first control operation of executing an application corresponding to the object a plurality of times and displaying a plurality of execution screens in order may be matched. On the other hand, with respect to the second user manipulation (that is, a simple touch, etc.) of not crossing the corresponding object, the second control operation of executing an application corresponding to the object only once and displaying one execution screen on the display 110 may be matched.

When the pattern of a user manipulation is confirmed, the controller 130 of the user terminal device 100 performs a control operation according to the confirmed pattern based on pre-stored matching information (S940). Subsequently, even if the same object is selected, a different program may be executed or a different function may be performed according to the selection method. In addition, even if only one user manipulation is performed with respect to an object, a plurality of execution screens may be displayed.

Figure 14:
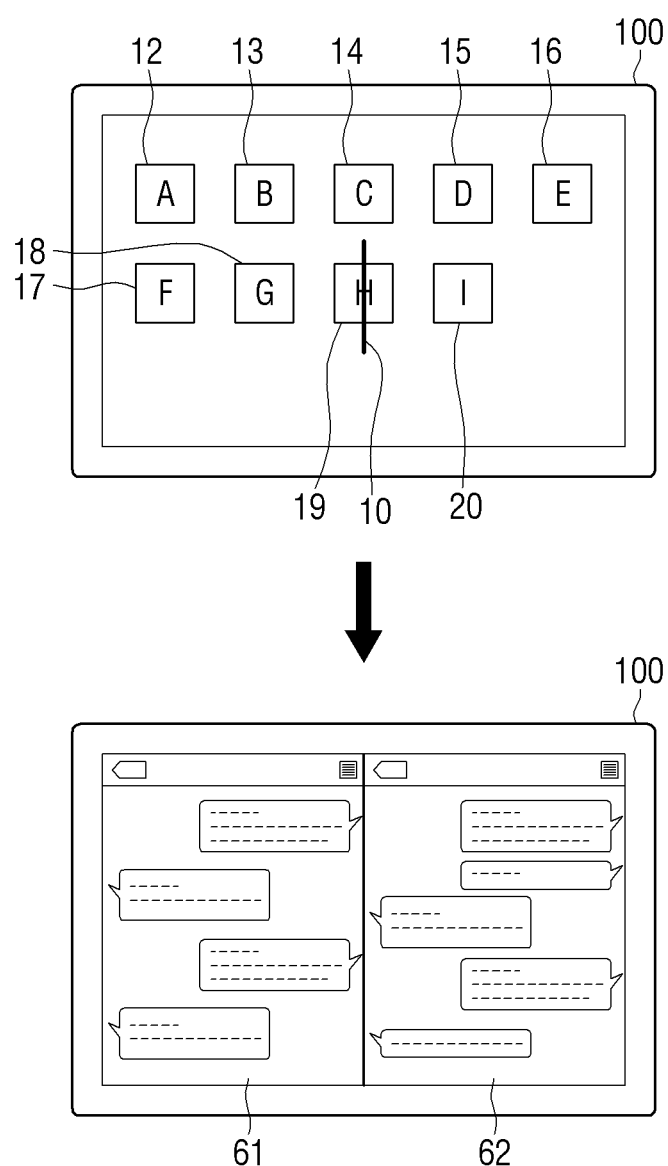
FIGS. 14 to 15 are views provided to explain an operation of a user terminal device according to an exemplary embodiment of FIG. 13.
Figure 15:
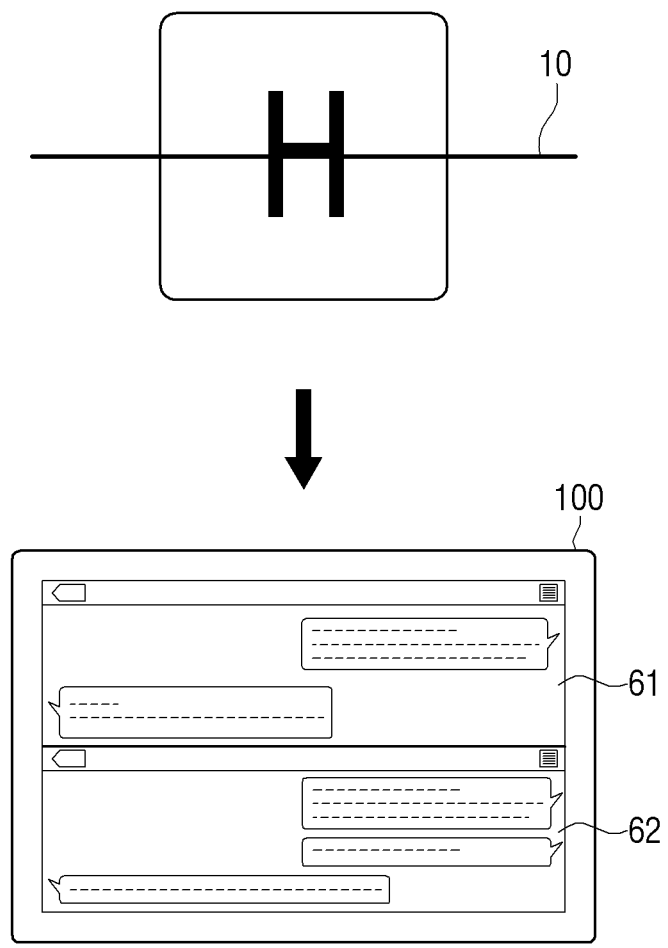

FIGS. 14 and 15 are views illustrating an example of a detailed operation of a user terminal device 100 according to an exemplary embodiment. In the above drawings, various exemplary embodiments are described based on the user terminal device 100 where the length of the display 110 is greater than the width of the display 110, but in FIGS. 14 and 15, the user terminal device 100 where the width of the display is greater than the length, such as a tablet PC, notebook PC, etc. will be described. However, exemplary embodiments are not limited to the above types of devices, and a user terminal device 100 may be realized in various forms.

According to FIG. 14, the user terminal device 100 may display a plurality of objects 12~20. In this state, if a user performs a user manipulation of crossing one object 19 in a vertical direction, the controller 130 executes an application corresponding to the object 19 twice and displays two execution screens 61, 62. In this case, the arrangement order of the execution screens 61, 62 may be determined according to the direction of the user manipulation. That is, if a user performs a user manipulation of crossing one object 19 in a vertical direction as illustrated in FIG. 14, the execution screens 61, 62 are arranged in left and right sides, respectively, with reference to the screen.

FIG. 15 illustrates a case where a user crosses one object 19 in a horizontal direction. In this case, the controller 130 arranges two execution screens 61, 62 in upper and low sides, respectively, with reference to the screen.

Meanwhile, when an object is selected, the controller 130 may display two of the same execution screens 61, 62, or may display the two different execution screens 61, 62 according to a predetermined standard. For example, as illustrated in FIGS. 14 and 15, if a user manipulation is performed with respect to the object 19 where a message service icon is matched, the controller 130 may execute the message service icon, display a message exchange history on one execution screen 61 and the last messages exchanged on the other execution screen 62.

In FIGS. 14 and 15, a message service icon is shown as an example, but programs other than a message service icon may be matched as well.

Meanwhile, a user manipulation may be classified according to a manipulation location. Hereinafter, the example of performing a different control operation according to the location of a user manipulation will be described.

<Example of Performing a Different Control Operation According to a Manipulation Location>

Figure 16:
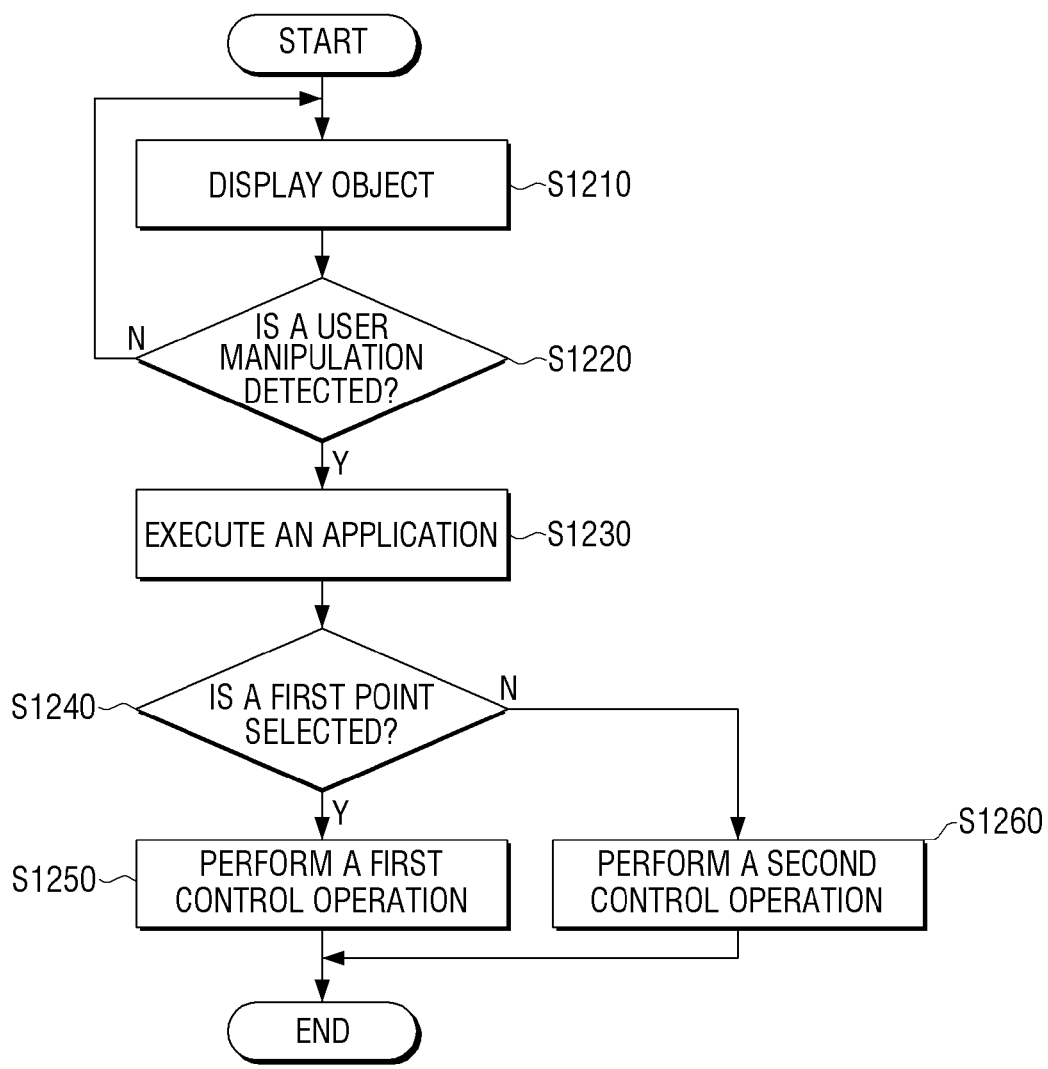
FIG. 16 is a flowchart provided to explain a controlling method of a user terminal device according to another exemplary embodiment.

FIG. 16 is a flowchart provided to explain an example of performing a different control operation according to a manipulation location in one object.

According to FIG. 16, if a user manipulation is detected (S1220) while an object is displayed (S1210), a user terminal device 100 executes an application corresponding to the object (S1230). Accordingly, if it is determined that the first point in the object is selected (S1240), the first control operation corresponding to the point is performed (S1250). On the other hand, if it is determined that another point, that is, not the first point, is selected, the second control operation is performed (S1260). In FIG. 16, one object is divided into two points and two different control operations are matched with each point. However, there may be more than two points depending on exemplary embodiments.

Figure 17:
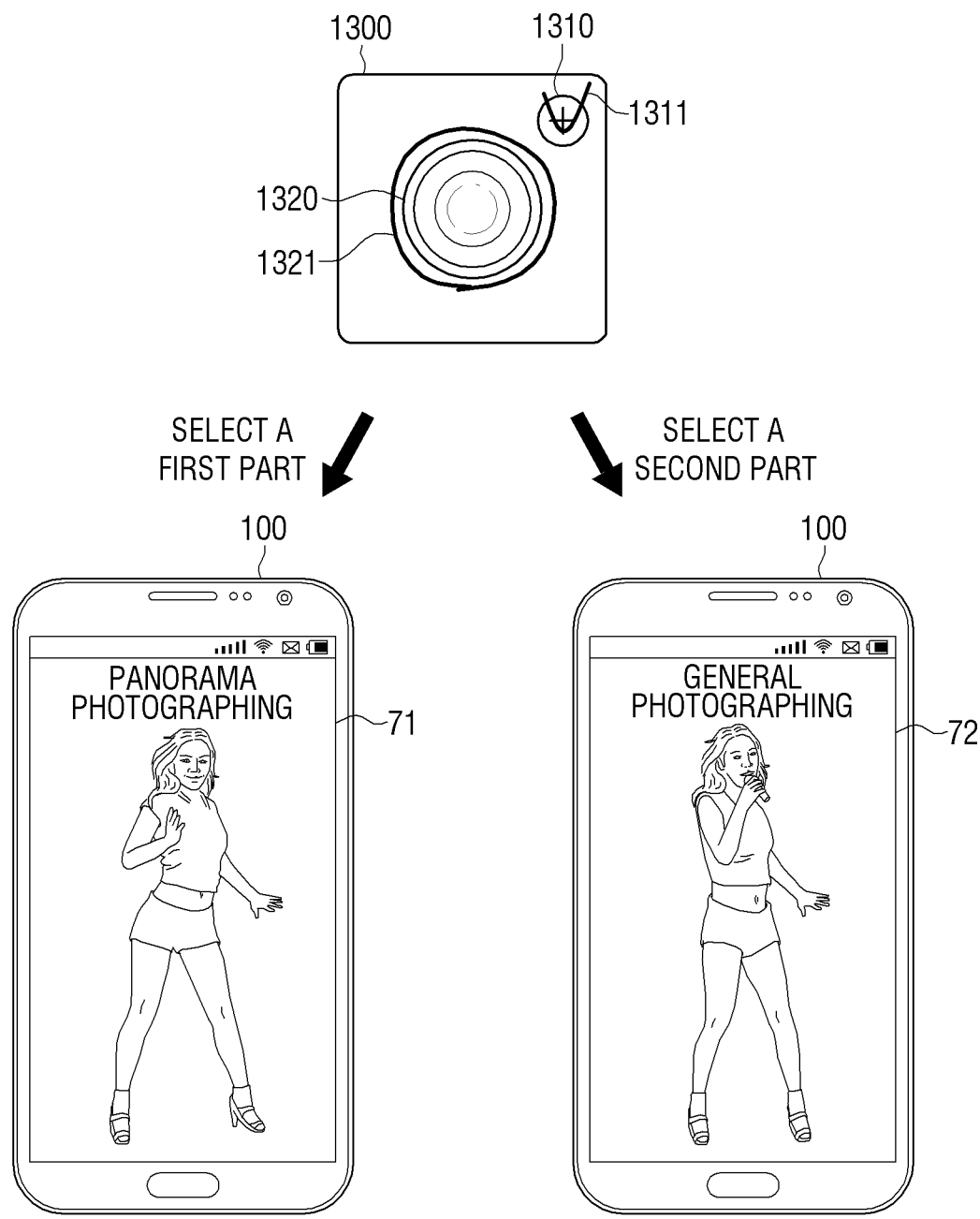
FIGS. 17 to 21 are views provided to explain examples of various operations of a user terminal device according to the exemplary embodiment of FIG. 16.

FIG. 17 illustrates a state in which an object where a camera application is matched is displayed. In FIG. 17, an object 1300 is divided into a plurality of parts 1310, 1320. For convenience of explanation, (+) area 1310 displayed on the upper right of the object 1300 is referred to as the first part, and the remaining area is referred to as the second part.

As a user touches the first part 1310 and the second part 1320 separately, the user may execute a desired detailed function directly. That is, if the first part 1310 is touched by a user manipulation 1311 in FIG. 17, the controller 130 executes the camera application and operates in a panorama photographing mode immediately. Accordingly, a screen 71 for panorama photographing is displayed.

On the other hand, if the second part 1320 is touched by a user manipulation 1321, the controller 130 executes the camera application, and a screen 72 according to a general photographing mode is displayed.

According to an exemplary embodiment, a user may select a desired control operation directly on the screen where the object 1300 is displayed without executing an application, searching a menu one by one, and setting a detailed option, which causes inconvenience.

In particular, if a user uses a pen as an input means, it is possible to input a fine touch as the end part of the pen is sharper than a finger. Accordingly, even though the size of the object 1300 is not big enough, a user may touch a detailed point easily using a pen, thereby executing a desired function immediately.

Figure 18:
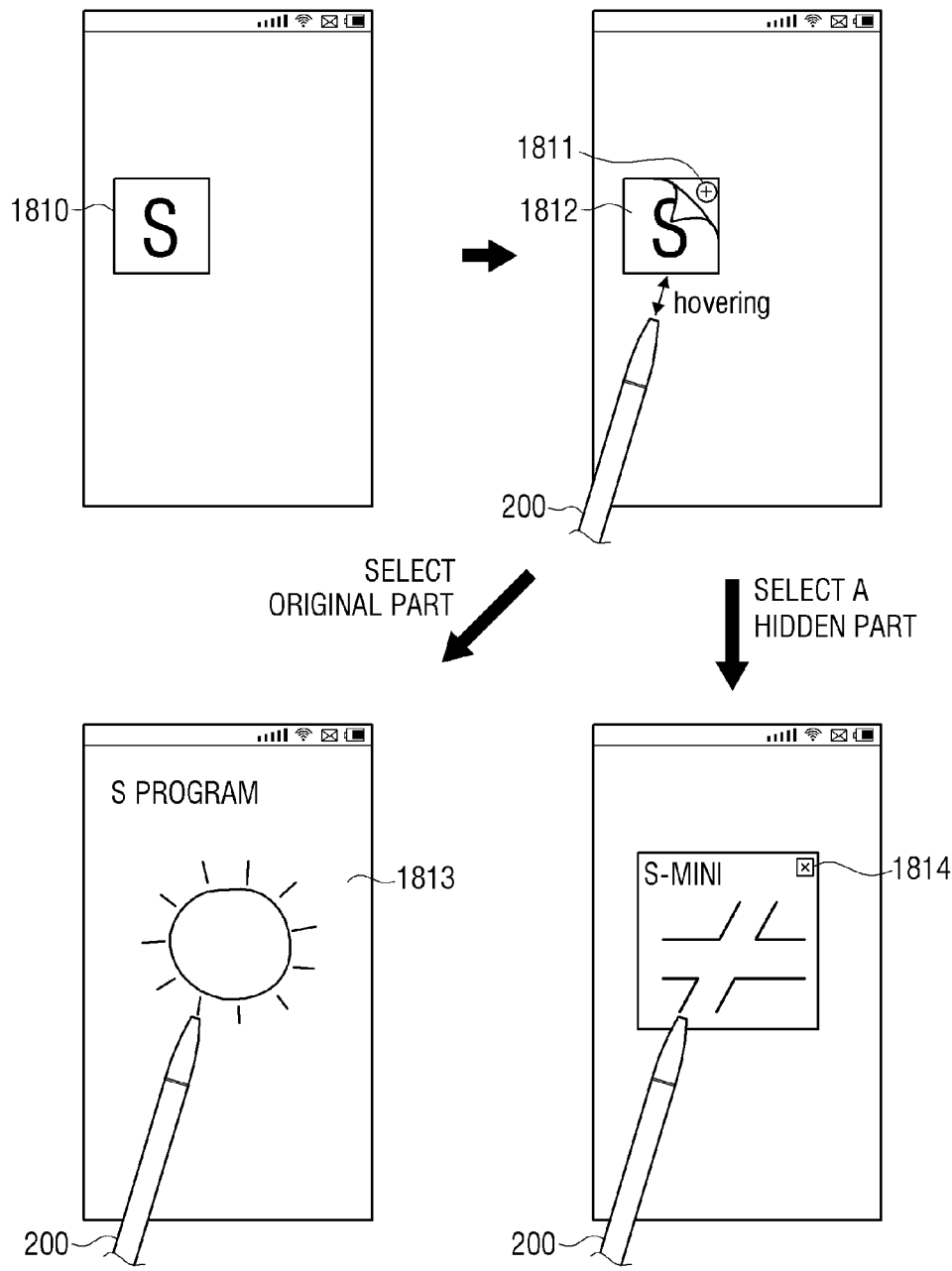

FIG. 18 is a view provided to explain another example of performing a different control operation according to a location of manipulation in one object. According to FIG. 18, a user may perform a hovering manipulation of approaching the pen 200 to an object 1810 displayed on the screen. When the hovering manipulation is detected, the controller 130 displays a graphic effect of peeling off one layer of the surface of the object 1810 to expose a hidden part 1811 of the object 1810. Accordingly, one object 1810 may be divided into the hidden part 1811 and an original part 1812. In this state, the controller 130 performs a different control operation according to a part touched by the user.

If the original part 1812 is selected in FIG. 18, the controller 130 displays a main execution screen 1813 of the corresponding object 1810, and if the hidden part 1811 is selected, the controller 130 displays a simple pop-up screen 1814 related to the corresponding object 1810. However, such a control operation is only an example, and various control operations may be performed according to the type of programs.

In FIG. 17, it is explained that one object is divided into two parts, fixedly and in FIG. 18, one object is divided into two parts flexibly according to a hovering manipulation. However, according to another exemplary embodiment, shape of object may change depending on change in circumstances of the user terminal device 100, or an additional object may be added to one side of the object.

Figure 19:
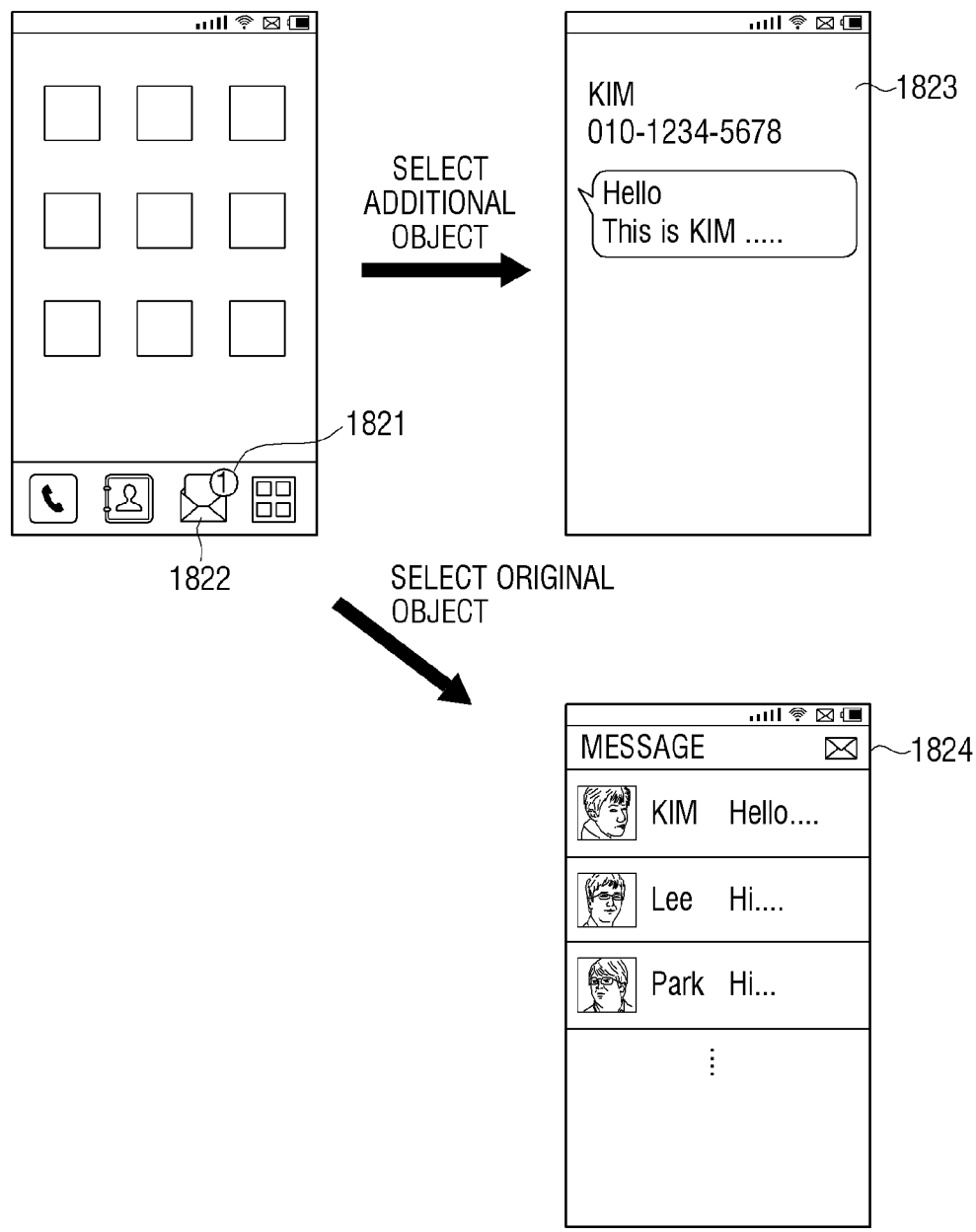
Figure 20:
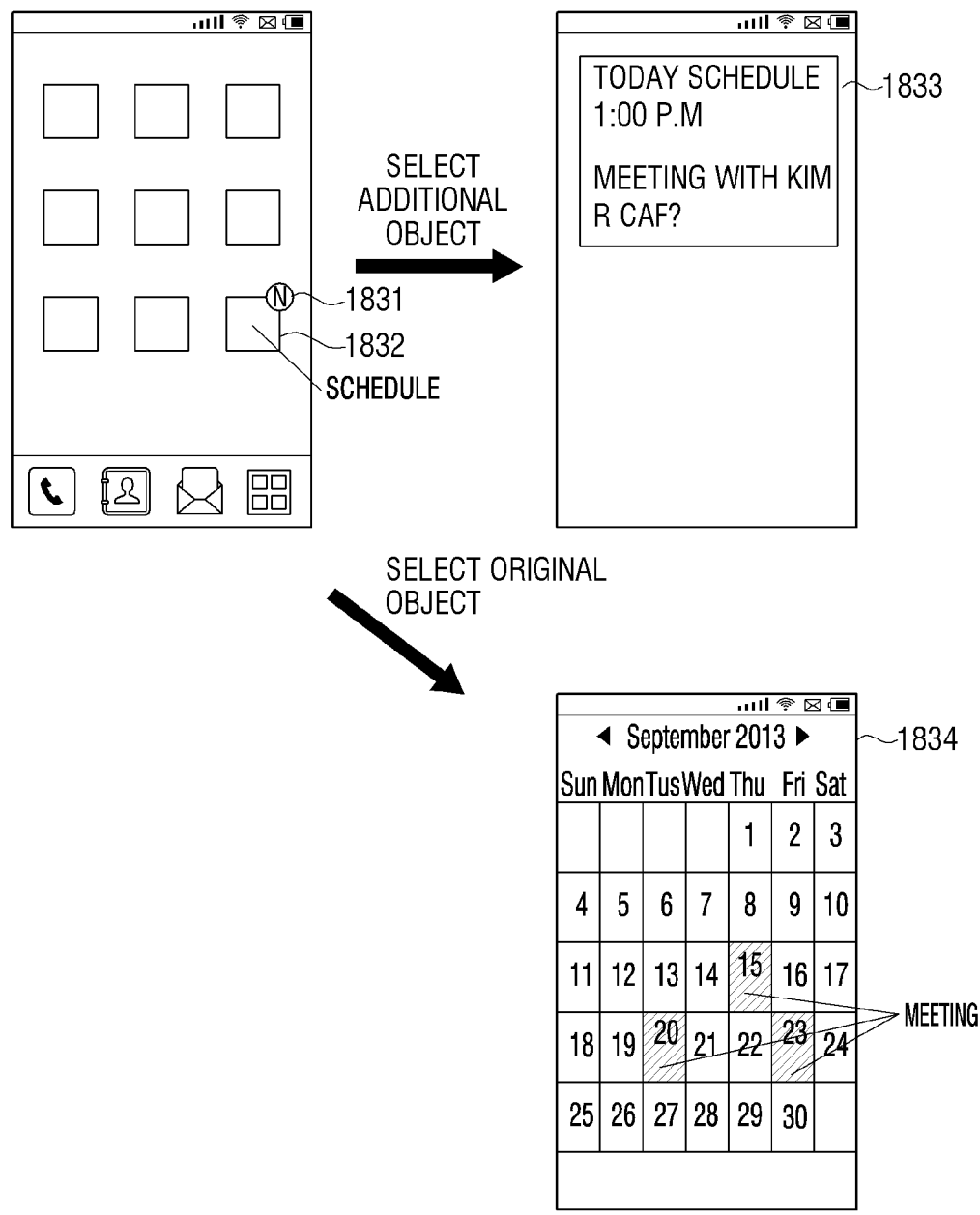

FIGS. 19 and 20 are views provided to explain examples where an additional object is added.

FIG. 19 illustrates a state in which an object 1822 where a message service program is matched is displayed. In this state, if a new text message is received but not opened, the controller 130 displays an additional object 1821 on one side of the object 1822. The additional object 1821 may be displayed as the number of new text messages, or other texts, symbols, images, etc. A user may select the original object 1822 or the additional object 1821 using various input means. The controller 130 performs a different control operation according to the part selected by the user.

For example, if a user selects the additional object 1821, the controller 130 displays a message screen 1823 for opening a new text message immediately. On the other hand, if a user selects the original object 1822, the controller 130 displays an execution screen 1824 of a message service program. In FIG. 19, the message service program is taken as an example, but the same exemplary embodiment can be applied to a messenger program or a mail program.

FIG. 20 illustrates a state in which an object where a certain program is matched is displayed. A user may register his or her schedule information any time. If it is determined that a user's registered schedule is approaching, the controller 130 displays the additional object 1831 to inform the advent of the new schedule on one side of the object 1832. The user may select the additional object 1831 or the original object 1832.

If the user selects the additional object 1831, the controller 130 displays a screen 1833 to inform the content of the new schedule. On the other hand, if the user selects the original object 1832, the controller 130 displays an execution screen 1834 of a program corresponding to the original object 1832.

As such, a different control operation may be performed according to a user's selection point even with respect to one object.

Meanwhile, the programs of the exemplary embodiments of FIGS. 17 to 20 are merely exemplary, and the same exemplary embodiments may be applied to other types of programs. Specifically, any one of exemplary embodiments in FIGS. 17 to 20 may be realized in various programs such as a content play program, a news program, a game program, an address-book program, a telephone program, a web browser program and so on.

For example, suppose that an object, where a content play program is matched in the exemplary embodiment of FIG. 17, is divided into a plurality of parts. In this case, if the first part from among the plurality of parts is selected, the controller 130 may display a play screen of the previously-played content, and if the second part which is different from the first part is selected, the controller 130 may display a list of playable contents.

Alternatively, suppose that the exemplary embodiment of FIG. 18 or FIG. 19 is applied to a news program. In this case, when there is a breaking news, the controller 130 may display an additional object on one side of the object where the news program is matched to inform a user of the breaking news. If a user selects the additional object, the controller 130 may display a news screen which displays the breaking news. On the other hand, if the original object is selected, the controller 130 may display a main screen of the news program.

As described above, even with respect to an object where one program is matched, various execution screens may be selectively provided according to a user manipulation regarding the object.

Meanwhile, in FIGS. 17 to 20, different execution screens are displayed according to the selection point of an object, but other types of control operations, e.g., other than displaying an execution screen, may also be performed.

Figure 21:
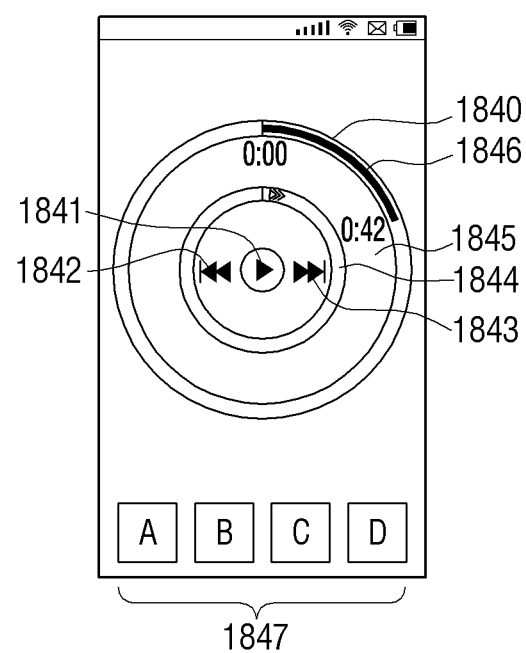

FIG. 21 is a view provided to explain another exemplary embodiment of performing various control operations according to a selection point of an object.

According to FIG. 21, the controller 130 may display a screen including a circular object 1840 and various icons 1847. The circular object 1840 may include various detailed objects 1841~1846. A user may perform various control operations by manipulating each of the detailed objects 1841~1846. FIG. 21 illustrates a case where a widget to play a music content is realized as the circular object 1840. The circular object 1840 may include various buttons 1841, 1842, 1843 which are selectable by a touch, a volume menu 1844 which is adjustable through a touch-and-drag, a play state adjustment menu 1845, a play state display area 1846, etc.

If a user selects various buttons 1841, 1842, 1843, the controller 130 may perform operations such as content play, fast forward, rewind, etc. depending on the type of selected button. Alternatively, if a user touches an area where the volume menu 1844 is displayed using the pen 200 and drags it in a clockwise or counterclockwise direction, the controller 130 may increase or decrease volume level according to the dragging direction.

If a user touches an area where the play state adjustment menu 1845 is displayed using the pen 200 and drags it in a clockwise or counterclockwise direction, the controller 130 may move a play point forward or backward according to the dragging direction. The play state display menu 1846 may be realized as a bar graph on the outermost side of the circular object 1840. If a user adjusts the play state display menu 1845, the controller 130 may change the length of the bar graph displayed on the play state display area 1846 according to the adjustment state.

If a circular object is provided as illustrated in FIG. 21, a user may perform various interaction operations by making a gesture of drawing a circle around the border of the circle.

The area where the play state adjustment menu 1845 is displayed in the circular object 1840 of FIG. 21 may be displayed in the form of disk where music contents are recorded. That is, a user may perform a deejay operation of grapping and scratching the disk using the pen 200.

In FIG. 21, a circular object is taken as an example, but other types of various objects which can be easily manipulated by the pen 200 may be provided, and the controller 130 may perform various control operations according to a selection point of the object.

Meanwhile, a user may perform a user manipulation not only to select an object but also to input specific information. In this case, the controller 130 may execute a desired function directly by combining the area where the user manipulation is performed or the type of object displayed in the surrounding area with the content of the user manipulation. Herein after, the exemplary embodiment of performing a control operation which reflects a user input will be described.

<Example of Performing a Control Operation which Reflects a User Input>

Figure 22:
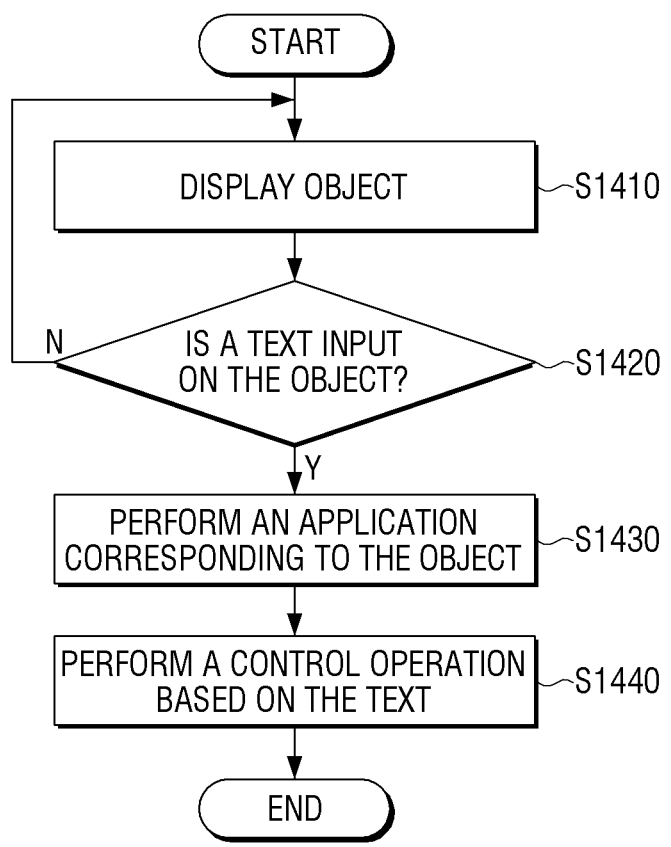
FIG. 22 is a flowchart provided to explain a controlling method of a user terminal device according to another exemplary embodiment.

FIG. 22 is a view provided to explain a method of controlling a user terminal device 100 according to another exemplary embodiment. According to FIG. 22, a user terminal device displays 100 various objects such as a widget and an icon (S1410). In this state, a user may write text or draw a symbol on the object or in the surrounding area using an input means. That is, a user may input various information through a user drawing input. The user terminal device 100 may perform a different control operation based on the type of the object where the user drawing input is performed and the content of the user input.

The user drawing input may include an input to specify an object and an input of program corresponding to the object. Specifically, if a user drawing input is performed, the controller 130 determines that an object displayed at a point where the user drawing input starts is selected, and analyzes the trace of the entire user drawing input. If it is determined that the analyzed trace is a specific text or symbol, the controller 130 provides the determined text or symbol as an input regarding a program corresponding to the object. Accordingly, the program configures a program execution result screen according to the text or symbol, and the controller 130 displays the execution result screen through the display 110.

That is, if a user drawing input is detected on an object or in the surrounding area, the controller 130 may execute a program corresponding to the object, and processing the user drawing input as an input to the corresponding program and display the screen on the display 110.

FIG. 22 illustrates a case where a text is input.

When it is detected that a text is input (S1420), a user terminal device 100 executes an application corresponding to the object where the text is input (S1430). Subsequently, a control operation is performed based on the text input by a user (S1440). Specifically, the controller 130 provides the text input by the user as an input regarding the executed application, and displays the execution result screen.

Figure 23:
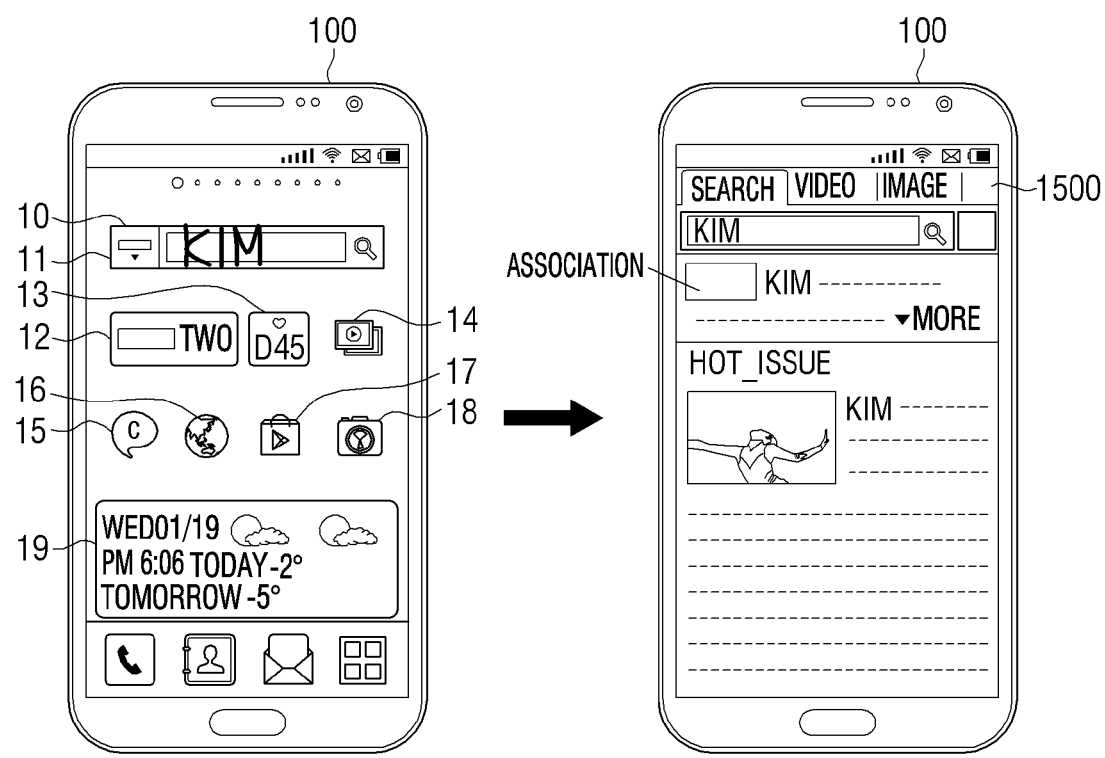
FIGS. 23 to 27 are views provided to explain examples of various operations of a user terminal device according to the exemplary embodiment of FIG. 22.

FIG. 23 is a view provided to explain an operation of a user terminal device 100 according to an exemplary embodiment. FIG. 23 illustrates a state where various objects 11~19 including a widget, an icon, etc. are displayed. A user may perform a certain user manipulation with respect to the objects.

The detector 120 detects such user manipulations and communicates them to the controller 130.

The controller 130 performs a control operation corresponding to the contents of user manipulations and the type of the corresponding objects. For example, if a text is drawn in an area corresponding to an object, that is, if a text is drawn on an object or in the surrounding area by a pen manipulation, the controller 130 executes a program corresponding to the object and display an execution screen corresponding to the text on the display 110 immediately.

FIG. 23 illustrates a case where a user draws a certain text, for example, "KIM" on a search widget 11. In this case, the controller 130 executes a program corresponding to the search widget 11 and inputs "KIM" as a search word to perform the search. Subsequently, the controller 130 displays the search result screen 1400. As a result, various search results which include the search word, "KIM" on the search result screen 1400.

In the related art, when the search widget 11 is selected, an initial execution screen of the application is displayed first and then, a user has to input a search word on a search window of the initial execution screen to perform the search. However, according to an exemplary embodiment, a user may input a search word on the home screen and check the search result immediately, so the user may use a service more quickly and conveniently.

FIG. 23 illustrates a case where a text drawing is performed on the search window, but even if a text drawing is performed within a certain distance with reference to the search window, a search service based on the corresponding text may be provided. Meanwhile, a search service is taken as an example in FIG. 23, but the exemplary embodiment may be applied to other various programs.

Figure 24:
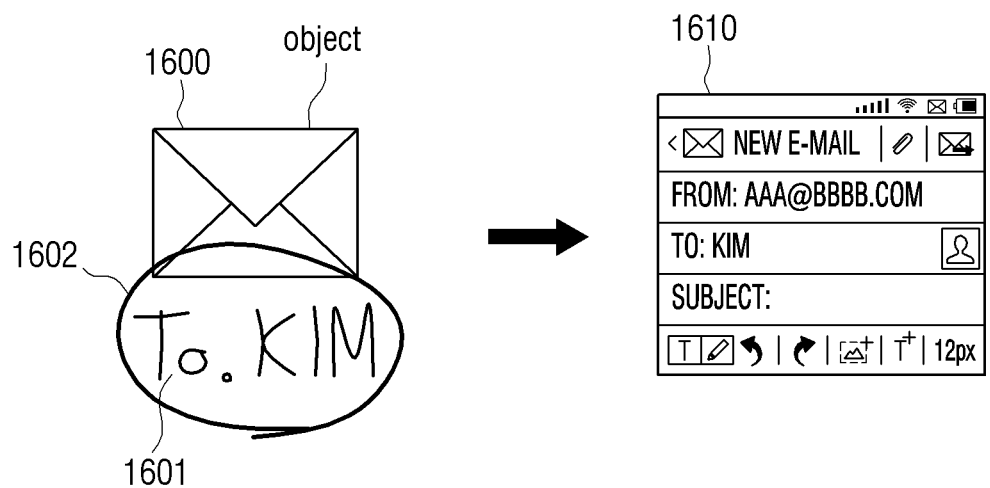

FIG. 24 illustrates a case where a user writes a text 1601, "To KIM", on one side of the object 1600 where a mail program is matched using a finger or a pen, and draws a circle 1602 around the text. In this case, the controller 130 executes the mail program and parses the contents drawn by the user.

The controller 130 separates a command and a search word from the parsed contents. In FIG. 24, "To" belongs to a command. The controller 130 makes comparison to find out whether there is a word corresponding to the parsed word exists in a pre-stored command library file, and if it exists, recognizes the word as a command. The controller 130 configures a screen corresponding to the command.

In FIG. 24, the controller 130 determines that the command, "To", is a command to write and transmit a mail, and displays a mail writing screen 1610 corresponding to the command. FIG. 24 illustrates that a circle 1602 is drawn after the text-writing, but the circle 1602 may be omitted. That is, the controller 130 may disregard the circle 1602 and recognize only the remaining area as a text. Alternatively, if a closed curve such as the circle 1602 is recognized, the controller 130 may determine that the text-writing is completed and parse only the text within the closed curve. In addition, in the example of FIG. 24, the controller 130 determines the text, "KIM", as a search word.

Accordingly, the controller 130 search a mail address corresponding to the search word in pre-stored contact information. To do so, information regarding commands corresponding to functions provided by each application may be stored a storage (not shown) in advance. When a mail address corresponding to a search word input by a user is found, the controller 130 directly writes down the mail address in a receiver information area in the mail writing screen.

Accordingly, the mail writing screen 1610 including the mail address of a counterpart input by a user may be directly displayed. Therefore, the user may send a mail directly to a desired counterpart without going through the complicated process of selecting various menus or search process.

If a text is input on an icon where a messenger program, rather than a mail program, is matched or in the surrounding area, the controller 130 may execute the messenger service program and display a messenger screen for displaying contents of messengers which are exchanged with another corresponding to the text on the display 110.

Figure 25:
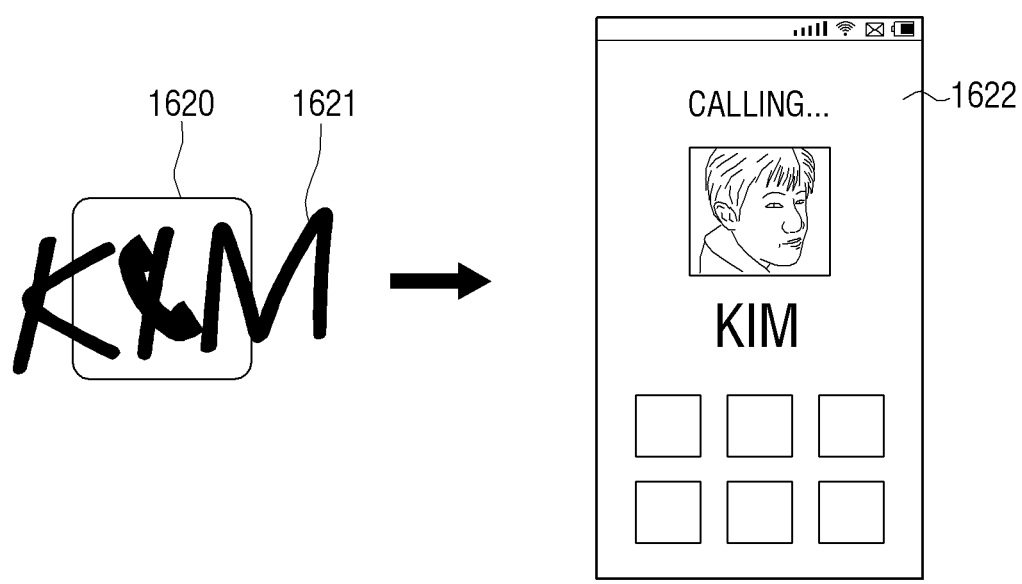

FIG. 25 illustrates a case where a text drawing is performed on an object where a telephone program is matched. According to FIG. 25, if a user draws a text 1621, "KIM", on an object 1620 where a telephone program is matched, the controller 130 automatically searches a telephone number corresponding to "KIM" in an address book. If the telephone number is found, the controller 130 automatically makes a call to the telephone number. Accordingly, a telephone call connection screen 1622 is displayed.

Meanwhile, in the case where a user directly touches an object such as a widget and an icon and changes a setting value of a program corresponding to the object, the shape of the object may be changed according to the changed value.

Figure 26:
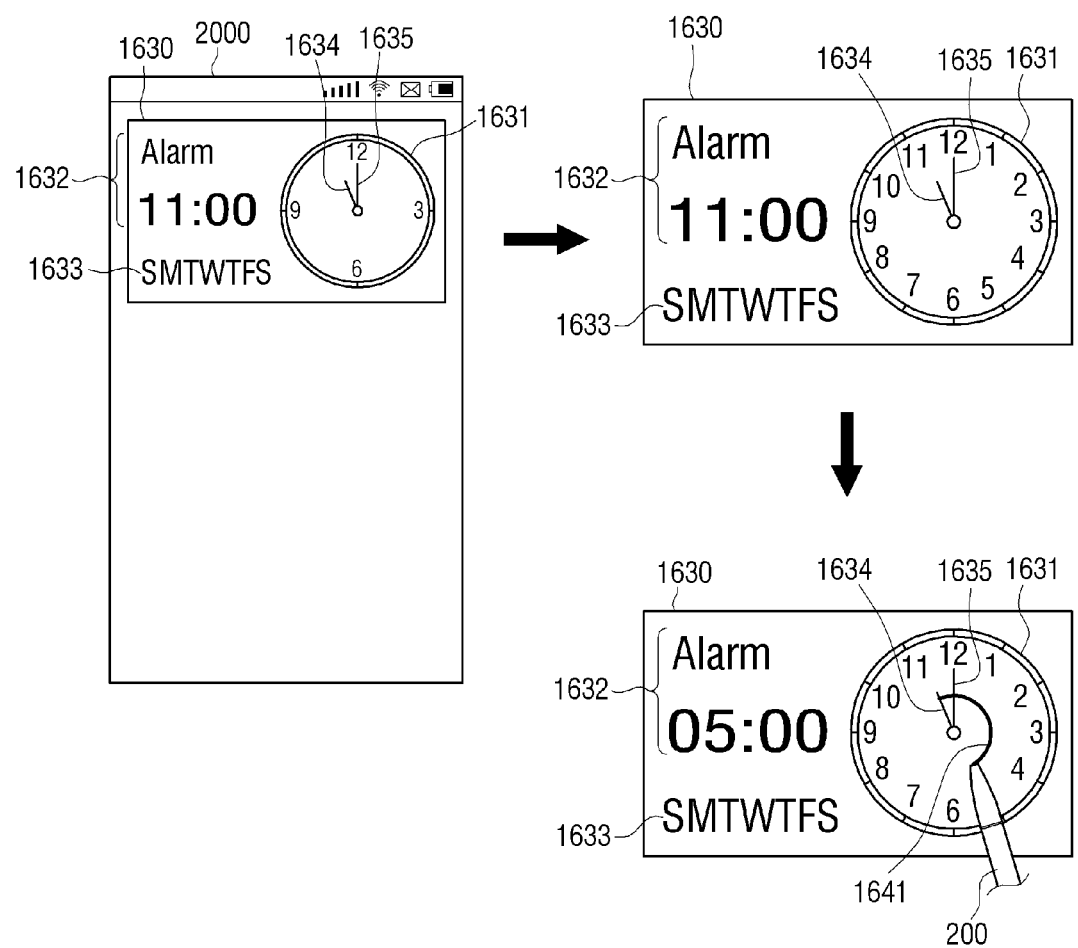

FIG. 26 is a view provided to explain an example of changing a widget according to a user manipulation. According to FIG. 26, the display 110 displays a screen 2000 including a widget 1630.

FIG. 26 illustrates that the widget 1630 is an alarm widget which includes an analog clock 1631 with an hour hand 1634 and a minute hand 1635. The alarm widget 1630 may also display a digital clock 1632, date information 1633, etc.

The controller 130 sets an alarm according to a user manipulation on the alarm widget 1630, and changes the display contents of the widget according to the set alarm. Specifically, the controller 130 may display only a part of numbers (i.e., 12, 3, 6, 9) indicating the time on the analog clock 1631 of the widget 1630, and if there is a pen hovering, may display all the numbers (1~12) indicating the time on the analog clock. In addition, a user may touch each of the hour hand 1634 and the minute hand 1635 and drag them 1641 to a desired location.

If a pen manipulation for moving at least one of the hour hand 1634 and the minute hand 1635 is input on the analog clock 1631, the controller 130 sets an alarm to the time which is changed by the pen manipulation. Subsequently, at least one of the hour hand and the minute hand may be moved to the time where the alarm is set. In FIG. 26, the hour hand 1634 is moved from 11 to 5, and the minute hand 1635 remains at 12. Accordingly, the alarm is set to 5 o'clock. If the time set for alarm is changed, the time displayed not only on the analog clock 1631 but also on the digital clock 1632 is changed automatically.

Meanwhile, a user may touch and select a date where he or she wishes to set an alarm in the date information 1633 using the pen 200. The selected date may be displayed in a different color from other dates. In addition, although not illustrated in FIG. 26, an area for selecting the morning and the afternoon, an area for selecting on/off of alarm, an area for selecting a bell sound, etc. may also be included in the widget 1630. As described above, the pen 200 allows a user to perform a finer touch in comparison with a finger, so the widget 1630 of FIG. 26 may be displayed in a small size when the pen 200 is used.

Figure 27:
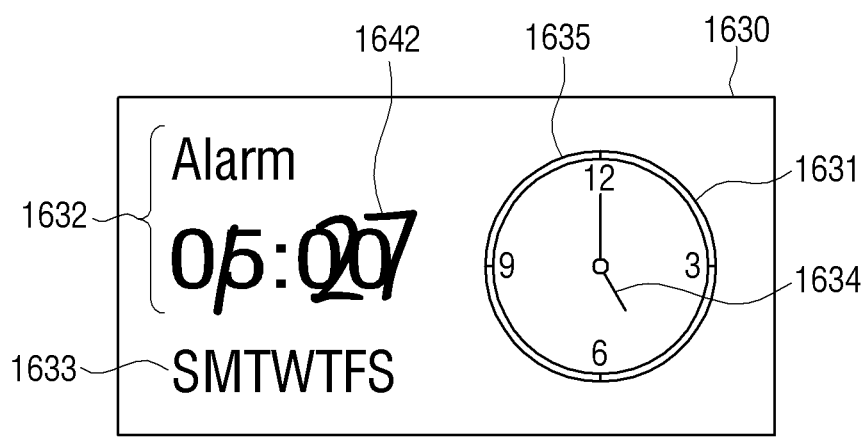

FIG. 27 is a view provided to explain another method of setting an alarm in the alarm widget 1630. According to FIG. 27, a user may write time information 1642 directly on the digital clock 1632 using the pen 200. FIG. 27 illustrates that "1" is written in an hour area, and "27" is written in a minute area. The controller 130 recognizes the writing, and sets an alarm time automatically according to the recognition result. Subsequently, the controller 130 changes the display contents of the digital clock 1632 and the analog clock 1630 according to the set alarm time.

As described above, a different control operation is performed according to a location of pen manipulation not only on an icon but also on a widget, and an input using a pen may also be directly reflected on the widget program. In addition, various control operations may be performed according to the type of program and the contents of a user's writing.

FIGS. 23 and 24 illustrate a case where a user inputs a certain text, but a text or drawing pattern may be set different for each mode provided by the corresponding application, and an operation may be performed according to the user manipulation of drawing such a text or drawing pattern.

For example, in the case of a camera program, there may be various photographing modes such as general mode, best mode, face recognition mode, panorama mode, smile shot mode, video photographing mode, etc. The storage 140 may store a text or drawing pattern corresponding to each photographing mode. For example, alphabet "B" may set for the best mode, a circle for the face recognition mode, a wave shape for the panorama mode, alphabet "S" for the smile shot mode, and alphabet "M" for the video photographing mode.

Accordingly, if a user's drawing is detected on an object where a camera program is matched or in the surrounding area, the controller 130 executes the camera program and directly displays a screen according to a photographing mode matched with the drawing manipulation. For example, if it is detected that alphabet M is drawn, a screen for making a video content is displayed directly. On the other hand, if there is a simple touch on the corresponding object, the controller 130 may display a basic screen of the camera program.

In the related art, a user executes the camera program, selects a menu on an initial screen, checks a list of selectable photographing modes, and then, displays a desired photographing mode from the list. However, according to the exemplary embodiment, a desired depth of screen may be directly displayed on the home screen, so user convenience may be improved significantly. In another example, the similar operation may be performed in an object where a note program for allowing a user to take various kinds of notes using a pen is matched. The note program displays various types of papers where a user take notes freely. For example, papers with various layouts such as a note paper with spaces just like a general note, an idea paper for writing down various ideas, a letter paper in the form of letter, a card paper in the form of card, etc. may be provided.

Each paper may be matched with a different text or drawing pattern and stored in the storage 140. For example, the note paper may be matched with a general touch manipulation, alphabet "I" with the idea paper, alphabet "M" with the letter paper, alphabet "C" with the card paper, etc. The controller 130 may display the shape of paper corresponding to a user's drawing pattern immediately based on such matching information.

As illustrated in FIGS. 14 and 15, a specific drawing pattern such as a horizontal line or a vertical line may be matched with a control operation to display a plurality of execution screens of a program, regardless of the operation mode or function of the corresponding program. In addition, various control operations may be matched with a user's drawing pattern. For example, a user may draw a predetermined symbol, text, etc. on an object to edit the object or an application matched with the object.

For example, if a user draws "X" on one object, the controller 130 may delete the object. Depending on an exemplary embodiment, an application matched with the object may also be deleted. In addition, if a user draws "C" on one object, the controller 130 may copy the object.

Further, a user may draw "P" to perform a paste operation, and may draw "S" to perform a cut operation. The example of display contents and the corresponding operations may be realized in various ways. In addition, in the case of a diary object, if a user writes a specific date on the diary object, the controller 130 may execute the diary program and open the diary of the corresponding date. In addition, in the case of a music object, if a user writes a song title, singer name, album name, etc. on the music object, the controller 130 may search a music content corresponding to the writing of the user from pre-stored contents or an external server and play the music content immediately.

As such, according to various exemplary embodiments, a user may select a desired control operation using various manipulation methods on the screen where objects are displayed. Accordingly, user convenience in executing and using various programs may be improved significantly.

The above exemplary embodiments may be realized and applied to a device individually, but they may also be combined together and applied. That is, a plurality of objects may be grouped in one user terminal device 100 and a plurality of control operations may be performed simultaneously. Alternatively, a plurality of control operations may be matched with one of the objects, and various control operations may be performed selectively according to the direction or location of the user manipulation of selecting the object, the contents input by the user, etc. The user manipulation may be realized in various ways such as touch, voice, motion, etc. as described above.

When a user terminal device 100 is controlled by a touch manipulation, the detector 120 may be realized in the form of touch screen. In this case, a touch means is not limited to a body part such as a finger, and various types of pens may be used. Hereinafter, examples of detailed configurations of a user terminal device 100 which can be controlled using a user's finger or a pen will be described in greater detail.

<Example of a Detailed Configuration of a User Terminal Device which can be Manipulated>

Figure 28:
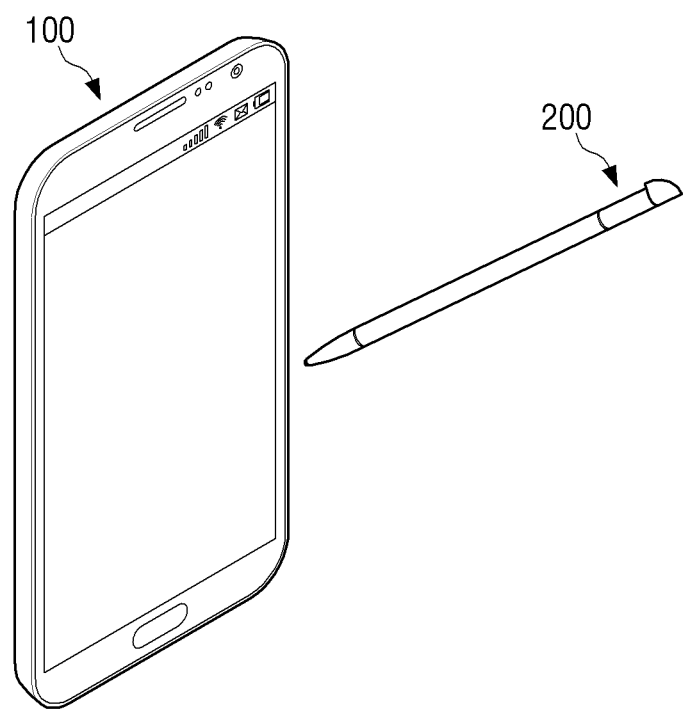
FIG. 28 is a view illustrating an external configuration of a user terminal device with a pen.

FIG. 28 is a view illustrating a configuration of a user terminal device 100 which can be manipulated using a pen. The pen 200 may be realized simply as a touch pen, or as a stylus pen, digitizer pen, etc. In this case, a resonant circuit may be formed inside the pen 200. When the pen 200 approaches the user terminal device 100 or touches the user terminal device 100, an induction magnetic field is generated by a magnetic signal transmitted from a loop coil built inside the user terminal device 100. The detector 120 formed in the user terminal device 100 detects an induction magnetic field so as to detect the location of an approaching pen or a touched location.

Figure 29:
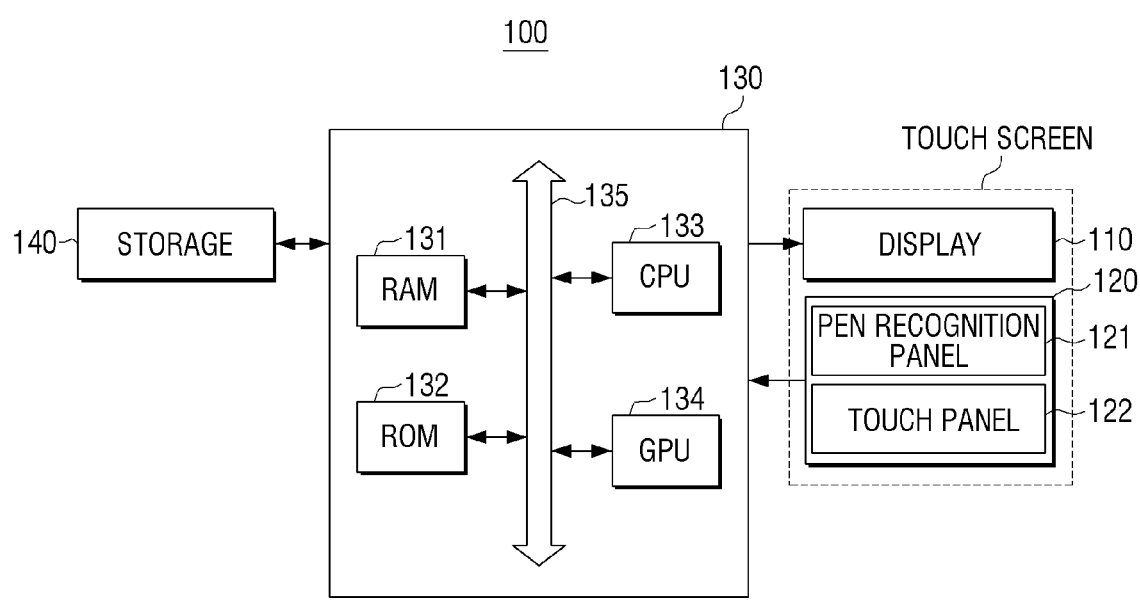
FIG. 29 is a view illustrating an example of a detailed configuration of a user terminal device.

FIG. 29 illustrates an example of a detailed configuration of the user terminal device 100 which can detect whether a manipulation is input by the pen 200 or not. According to FIG. 29, the user terminal device 100 includes the display 110, the detector 120, the controller 130, and the storage 140.

The display 110 displays various screens as described above. The display 110 may be realized in various forms such as Liquid Crystal Display (LCD), Organic Light Emitting Diodes (OLED) display, Plasma Display Panel (PDP), etc. The display 110 may also include a driving circuit, a backlight unit, etc. which can be realized in the form such as a-Si thin-film-transistor (TFT), Low Temperature Poly Silicon (LTPS) TFT, Organic TFT (OTFT), etc.

The display 110 and the detector 120 may be realized as one touch screen. The detector 120 may include a pen recognition panel 121 and a touch panel 122. The pen recognition panel 121 detects an approach input or a touch input of the pen 200, and outputs an event signal according to the detection result. The pen recognition panel 121 may be realized in an Electron Magnetic Resonance (EMR) method, and a touch or an approach input may be detected according to the change in the intensity of magnetic field by an approach or a touch of the pen 200.

Specifically, the pen recognition panel 121 may include an electronic induction coil sensor (not shown) and an electronic signal processing circuit (not shown). The electronic induction coil sensor is configured to have a grid structure where a plurality of loop coils are crossed with each other. The electronic signal processing circuit provides an AC signal to each loop coil of the electronic induction coil sensor sequentially, and transmits a signal output from each loop coil to the controller 130. When there is the pen 200 including a resonant circuit in the vicinity of a loop coil of the pen recognition panel 121, the magnetic field transmitted from the corresponding loop coil generates an electric current based the mutual electromagnetic induction in the resonant circuit of the pen 200. Based on the electric current, an inductive magnetic field is generated from a coil constituting the resonant circuit of the pen, and the pen recognition panel 121 detects the inductive magnetic field from a loop coil which is in the state of receiving a signal so as to detect an approach location or a touch location of the pen.

In the above exemplary embodiment, a pen is taken as an example of input means, but any object capable of generating an electric current based on electromagnetic induction can be used as an input means. The pen recognition panel 121 is disposed at a lower side of the display 110, and may be activated according to a specific event or as a default.

The touch panel 122 is an element to detect a physical touch input through a user's body part or other objects. For example, the touch panel 122 may be realized in the form of touch film, touch sheet, touch pad, etc. When a touch is detected, the touch panel 122 outputs a touch event value corresponding to the touched point. As described above, the touch panel 122 may include various types of touch sensors such as capacitance-type sensor, resistive-type sensor, etc. For example, when the touch panel 122 is realized as a capacitance-type sensor, the touch panel 122 coat the both sides of glasses with a thin metal conductive material (such as Indium Tin Oxide (ITO) layer) so that an electric current may flow on the surface of the glasses, and the touch panel 122 is coated and configured as a dielectric substance which may store an electric charge. When the surface of the touch panel 122 is touched, a certain amount of electric charge is moved to the touched location by static electricity, and the touch panel 122 detects the touched location by recognizing the change in the amount of electric current as a result of the movement of the electric charge and traces a touch event.

Herein, the touch event which occurs in the touch panel 122 may be generated mainly by a human finger, but may be generated by any other objects such as conductive materials which may cause the variation of the amount of electric current. FIG. 29 illustrates that the pen recognition panel 121 and the touch panel 122 are provided as a separate panel, but the two panels may be realized as one panel. As described in FIG. 29, a user may manipulate the user terminal device 100 using the user's finger or other body parts, or using the pen 200.

For convenience of explanation, a manipulation using the pen 200 is referred to as a pen manipulation, and the other manipulations are referred to as general manipulations. According to the configuration of FIG. 29, the detector 130 may recognize a pen manipulation and a general manipulation distinctively.

In addition, in order to prevent any conflict between a control operation according to an interaction based on a general manipulation and a control operation according to an interaction based on a pen manipulation, the controller 130 may process the two interactions distinctively. Specifically, if a pen manipulation is detected when predetermined conditions are satisfied, a control operation corresponding to the contents drawn by a pen manipulation and an object displayed on the area where the pen manipulation occurs may be performed. On the other hand, if a pen manipulation is detected when predetermined conditions are not satisfied, the controller 130 may regard the pen manipulation as a general manipulation. That is, even though a pen manipulation is performed, a general operation which is different from the above-described control operations may be performed if predetermined conditions are not satisfied.

For example, if a line is drawn between two objects while predetermined conditions are not satisfied, the controller 130 may not execute control operations of the two objects in association with each other and instead, may change or scroll the home screen in left, right, up, or down direction by page unit according to the direction of the pen manipulation. Alternatively, the controller 130 may just draw a graphic line according to the pen manipulation without performing any particular control operation.

Such conditions may be set in various ways. For example, one condition may be performing a drawing by a pen manipulation while a specific menu displayed on the screen or buttons (volume button, home button, pen button, hidden key, etc.) on the main body of the user terminal device 100 are pressed by a finger. Even if a plurality of objects are specified by a pen manipulation while the corresponding menu or button is not pressed, the controller 130 may simply draw a line corresponding to the pen manipulation without performing any specific operation. On the other hand, if a plurality of objects are specified by a pen manipulation while the corresponding menu or button is pressed, the controller 130 recognizes the plurality of objects which are associated by the pen manipulation, and performs a plurality of control operations corresponding to each object.

Otherwise, one of the conditions may be a state in which the pen 200 is separated from the main body. In this case, after the pen 200 is detached, if a user drags the screen using the pen 200, the controller 130 may draws a line corresponding to the drawing trace. On the other hand, if a user drags the screen using a finger while the pen is detached, the screen may be changed or scrolled by page unit.

In addition, various conditions may be set. The conditions may be set as a default by the manufacturer of the user terminal device 100 and stored in the storage 140, but may also be arbitrarily set by a user while the user uses the device.

Meanwhile, albeit not illustrated in FIG. 29, the user terminal device 100 may further include a driver (not shown) to drive the display 110, a frame buffer (not shown), etc. The frame buffer is an element to store an image frame to be displayed on the panel of the display 110, temporarily, and the driver is an element to convert an image frame stored in the frame buffer to an image source signal and provide it to the display 110 so that the display 110 may display the image frame.

The controller 130 controls overall operations of a user terminal device 100 using various programs and data stored in the storage 140. The controller 130 includes an RAM 131, an ROM 132, CPU 133, a graphic processing unit (GPU) 134, and a bus 135. The RAM 131, the ROM 132, the CPU 133, and the GPU 134 may be connected to each other through the bus 135. The CPU 133 access the storage 140, and performs booting using an operating system (OS) stored in the storage 140. In addition, the CPU 133 performs various operations using various programs, contents, data, etc. stored in the storage 140.

The ROM 132 stores a set of commands for system booting. If a turn-on command is input and power is supplied, the CPU 133 copies an OS stored in the storage 140 onto the RAM 131 according to a command stored in the ROM 132 and boots a system by executing the OS. If the booting is completed, the CPU 133 copies various application programs stored in the storage 140 onto the RAM 131 and performs the various operations by executing the application programs copied in the RAM 131.

If the booting of the user terminal device 100 is completed, the GPU 134 displays a home screen. Specifically, the GPU 134 may generate a home screen including various objects such as an icon, an image, text, etc. using a computing unit (not shown) and a rendering unit (not shown). The computing unit computes property values such as coordinates, a shape, a size, and a color of each object to be displayed according to the layout of the screen. The rendering unit generates a screen with various layouts including objects based on the property values computed by the computing unit. The screen generated by the rendering unit is provided to the display 110 and displayed in an display area.

Figure 30:
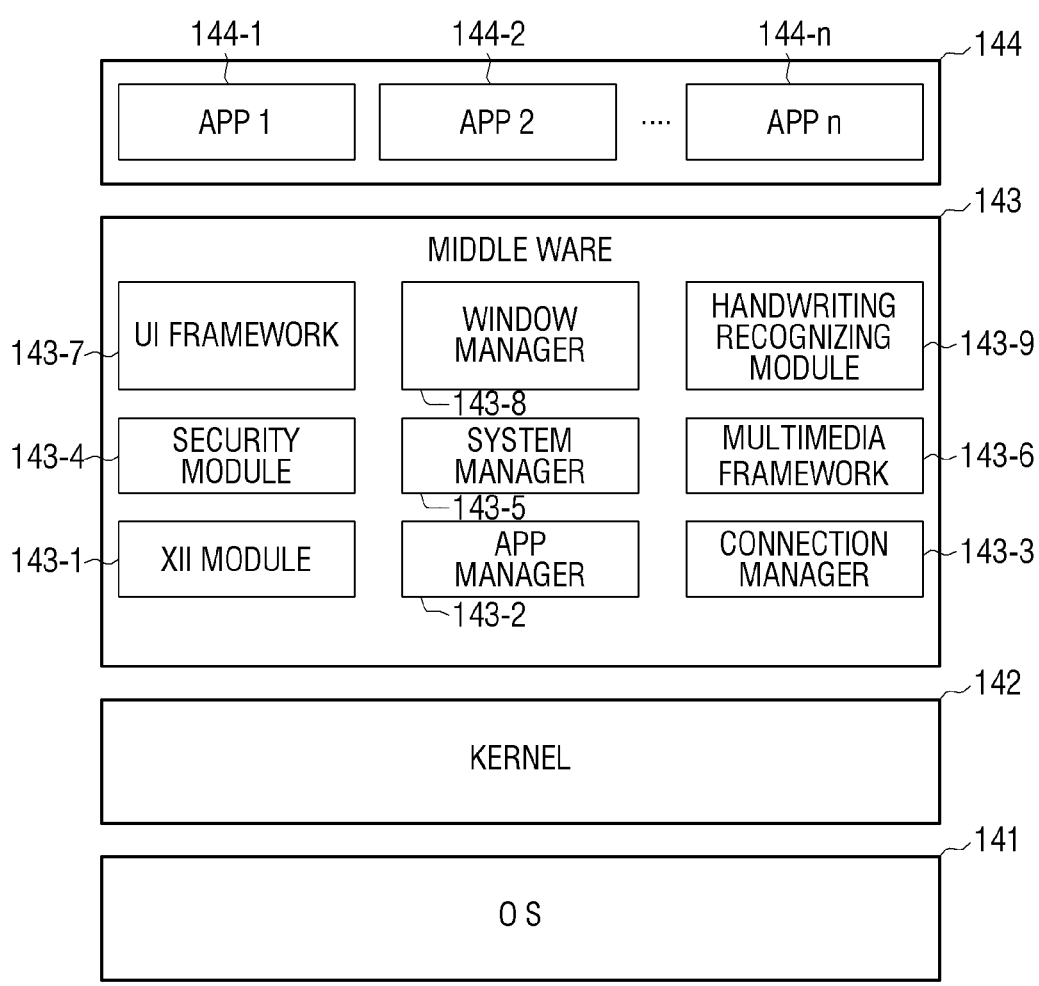
FIG. 30 is a view illustrating an example of software structure used by a user terminal device.

FIG. 30 is a view illustrating an example of software structure used by the user terminal device 100.

The software of FIG. 30 may be stored in the storage 140, but is not limited thereto. The software may be stored in various types of storage means used in the user terminal device 100.

According to FIG. 30, the user terminal device 100 includes an operating system (OS) 141, a kernel 142, middleware 143, and an application 144. The OS 141 controls and manages overall operations of hardware. That is, the OS 141 is a layer which performs basic functions of hardware management, memory, and security, etc. The kernel 142 functions as a path to transmit various signals detected by the detector 120, etc. to the middleware 143. The middleware 143 includes various software modules to control the operations of the user terminal device 100.

According to FIG. 30, the middleware 143 includes an X11 module 143-1, an APP manager 143-2, a connection manager 143-3, a security module 143-4, a system manager 143-5, a multimedia framework 143-6, a UI framework 143-7, a window manager 143-8, and a handwriting recognizing module 143-9. The X11 module 143-1 is a module which receives various event signals from various hardware in the user terminal device 100.

Herein, the event may be set in various ways, such as an event where a user manipulation is detected, an event where a system alarm occurs, an event where a specific program is executed or terminated, etc. The APP manager 143-2 is a module to manage the execution state of various applications which are installed in the storage 140. When an event where an application execution command is input is detected from the X11 module 143-2, the APP manager 143-2 calls and executes an application corresponding to the event.

The connection manager 143-3 is a module to support wired or wireless connection to a network. The connection manager 143-3 may include various specific modules such as a DNET module, UPnP module, etc. The security module 143-4 is a module to support certification, permission, secure storage, etc. with respect to hardware. The system manager 143-5 monitors status of each element of the user terminal device 100 and provides the result to other modules. For example, when a battery is running short, when an error occurs, or when communication disconnection occurs, the system manager 143-5 may output an alarm message or an alarm sound by providing the monitoring result to the UI framework 143-7. The multimedia framework 143-6 is a module which is used to reproduce multimedia contents stored in the user terminal device 100 or which is used to reproduce multimedia contents provided from an external source. The multimedia framework 143-6 may include a player module, a camcorder module, a sound processing module, etc. Accordingly, an operation of reproducing various multimedia content, thereby generating and reproducing screens and sounds, may be performed. The UI framework 143-7 is a module to provide various UIs. The UI framework 143-7 may include an image composite module to configure various objects, a coordinates composite module to calculate the coordinates where an object is to be displayed, a rendering module to render the configured object on the calculated coordinates, a two-dimensional/three-dimensional (2D/3D) UI toolkit to provide a tool for configuring a UI in 2D or 3D form, etc. The window manager 143-8 may detect a touch event by a user's body part or pen or other input events. When such an event is detected, the window manager 143-8 transmits an event signal to the UI framework 142-7 so that an operation corresponding to the event is performed.

The handwriting recognizing module 143-9 is a module to parse and recognize a trace that a user draws on the surface of the display 110. The handwriting recognizing module 143-9 receives coordinates values of points touched from the pen recognition panel 121 and stores the coordinates values of the touched points as a stroke. In addition, the handwriting recognizing module 143-9 may generate a stroke array using the stroke. Subsequently, the handwriting recognizing module 143-9 may recognize a handwriting by comparing a pre-stored handwriting library with the generated stroke array. The recognized handwriting is provided to the application manager 143-22, and the application manager 143-2 provides the handwriting to an application corresponding to the object where the user's handwriting occurs. Accordingly, as described above, the application may perform a control operation based on the recognized handwriting.

Meanwhile, if a user touches or draws on the surface of the display 110 using various input means such as the user's finger or pen, the UI framework 143-7 may draw various graphic lines according to the user's manipulation. Specifically, if a user draws a picture on the screen using the pen 200, the controller 130 draws a graphic line on each point where the pen 200 passes through according to the execution of the UI framework 143-7. The thickness of the line may vary according to the pressure of the pen 200 on the screen or the size of the screen touched by the pen 200. The color and shape of the line may also vary according to a user setting. The application module 144 includes applications 144-1~144-n to support various functions. For example, the application module 144 may include program modules to provide various services such as a navigation program module, a game module, an electronic book module, a calendar module, an alarm management module, etc. These applications may be set as default, or may be installed and used by a user temporarily.

The software structure illustrated in FIG. 30 is only an example and thus, part of the configuration may be omitted or changed, or new configuration may be added, if necessary. For example, the storage 140 may further include various programs including messaging modules such as a sensing module to analyze sensed signals in various sensors, a messenger program, Short Message Service (SMS) & Multimedia Message Service (MMS) programs, an e-mail program, etc., a call info aggregator program module, a VoIP module, a web browser module, etc.

Meanwhile, as described above, a user terminal device 100 may be realized as various types of apparatuses such as a mobile phone, a tablet PC, a laptop PC, a PDA, an MP3 player, an electronic album device, a TV, a PC, a kiosk, and so on. Herein, when a user terminal device 100 is realized as an apparatus with various functions including a communication function, a content play function, such as a mobile phone, a tablet PC, etc., the user terminal device 100 may further include elements to perform such functions.

Figure 31:
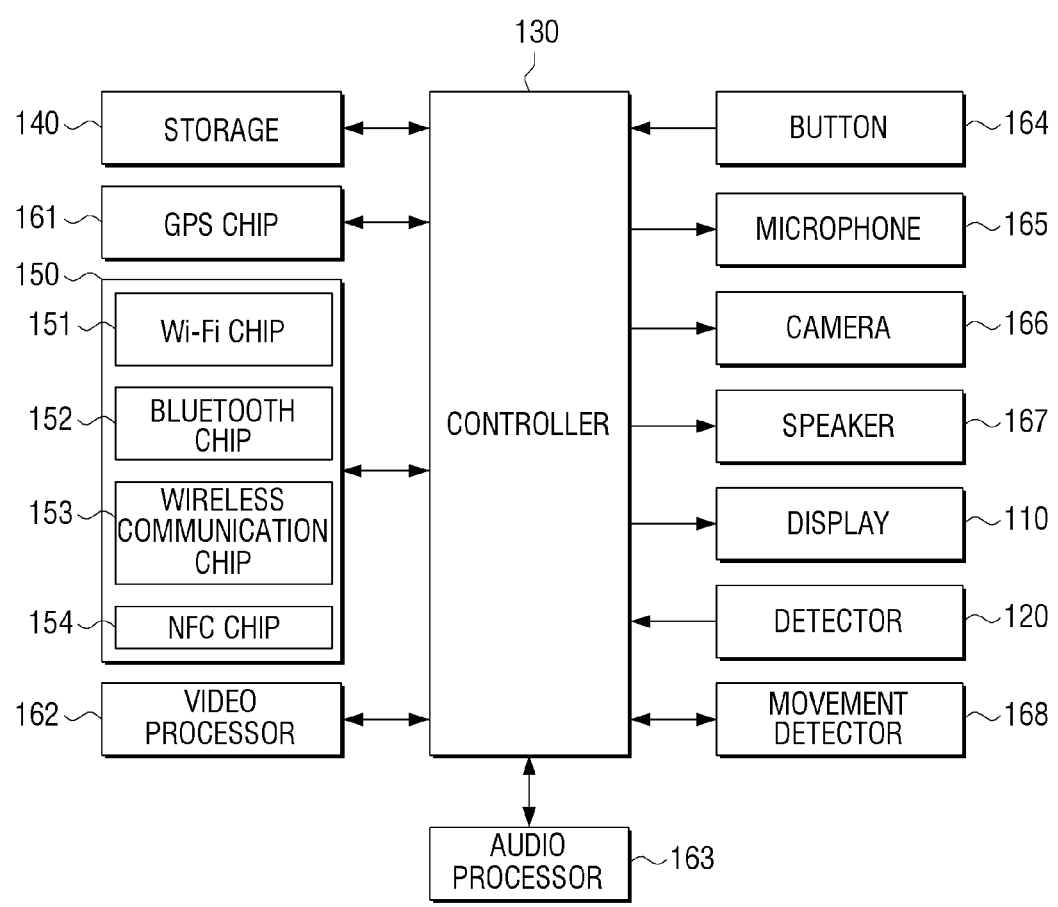
FIG. 31 is a view provided to explain an example of a detailed configuration of a user terminal device.

FIG. 31 is a view illustrating a more detailed example of a user terminal device 100 including various elements.

According to FIG. 31, the user terminal device 100 may include the display 110, the detector 120, the controller 130, the storage 140, a communicator 150, a Global Positioning System (GPS) chip 161, a video processor 162, an audio processor 163, a button 164, a microphone 165, a camera 166, a speaker 167 and a movement detector 168.

The display 110 and the detector 120 may be realized as a touch screen as described above, and may display various screens and detect a user manipulation on the screen. The controller 130 controls overall operations of the user terminal device 100 using various programs and data stored in the storage 140. As the display 110, the detector 120 and the controller 130 have already been described in the above various exemplary embodiments, further description will not be provided.

The communicator 150 is an element to perform communication with various types of external apparatuses according to various types of communication methods. The communicator 150 includes a WiFi chip 151, a Bluetooth chip 152, a wireless communication chip 153, and an Near Field Communication (NFC) chip 154. The WiFi chip 151 and the Bluetooth chip 152 may perform communication according to a WiFi™ method and a Bluetooth™ method, respectively. When the WiFi chip 151 or the Bluetooth chip 152 is used, various connection information such as SSID, session key, etc. is received/transmitted in advance so that various information can be received/transmitted using the same.

The wireless communication chip 153 refers to a chip which performs communication according to various communication standards such as IEEE, Zigbee, 3rd Generation (4G), 3rd Generation Partnership Project (3GPP), Long Term Evolution (LTE), and so on. The NFC chip refers to a chip which operates according to an NFC method by using 13.56 MHz from among various RF-ID frequency bands such as 135 kHz, 13.56 MHz, 433 MHz, 860~960 MHz, 2.45 GHz, and so on.

The controller 130 performs communication with various external apparatuses using the communicator 150. For example, the controller 130 may download an application, install the application in the storage 140, and display an object corresponding to the application. In this case, the corresponding application may be matched with a previously-used object. The GPS chip 161 is an element to receive a GPS signal from a GPS satellite and calculate the current location of the user terminal device 100.

When a navigation program is used or when the current location of a user is required, the controller 130 may calculate the location of the user using the GPS chip 161. The video processor 162 is an element to process contents received through the communicator 150 or video contents included in the contents which are stored in the storage 140.

The video processor 162 may perform various image processing with respect to video data, such as decoding, scaling, noise filtering, frame rate conversion, resolution conversion, etc. The audio processor 163 is an element to process contents received through the communicator 150 or audio data included in the contents stored in the storage 140. The audio processor 163 may perform various processing with respect to audio data, such as decoding, amplification, noise filtering, etc. When a play program regarding a multimedia content is executed, the controller 130 may reproduce the corresponding content by driving the video processor 162 and the audio processor 163.

The display 110 may display an image frame which is generated by the video processor 162.

The speaker 167 outputs audio data which is generated by the audio processor 163.

The button 164 may be a button which may be embodied as various types of buttons such as a mechanical button, a touch pad, a wheel, etc. formed on a certain area of the user terminal device 100, for example, a front part, a side part, or a rear part of the external portion of the main body of the user terminal device 100.

The microphone 165 is an element to receive a user voice or other sounds, and convert the same to audio data.

The controller 130 may use a user voice input through the microphone 165 during a phone call, or convert the user voice to audio data and store the same in the storage 140. The camera 166 is an element to photograph a still image or a video according to a user control.

The camera 166 may be realized as a plurality of cameras such as a front camera and a rear camera. When the camera 166 and the microphone 165 are provided, the controller 130 may perform a control operation according to user voice input through the microphone 165 or a user motion recognized by the camera 166.

That is, the user terminal device 100 may operate in a motion control mode or a voice control mode. When the user terminal device 100 operates in a motion control mode, the controller 130 photographs a user by activating the camera 166, traces a change in the user motion, and perform a corresponding control operation.

When the user terminal device 100 operates in a voice control mode, the controller 130 may operate in a voice recognition mode where a user voice input through the microphone 165 is analyzed and a control operation is performed according to the analyzed user voice. In the user terminal device 100 which supports a motion control mode or a voice control mode, a voice recognition technology or a motion recognition technology may be used in various exemplary embodiments. For example, if a user makes a motion of drawing a circle which includes a plurality of objects, or if a user utters a plurality of objects, control operations corresponding each of the plurality of objects may be performed.

The motion control technology or the voice control technology may also be applied in other exemplary embodiments. The movement detector 168 is an element to detect the motion of the main body of the user terminal device 100.

That is, the user terminal device 100 may rotate or tilt in various directions. The movement detector 168 may detect motion properties such as rotation direction, angle, tilt, etc. by using at least one of various sensors including a geomagnetic sensor, a gyro sensor, an acceleration sensor, etc.

In addition, albeit not illustrated in FIG. 31, the user terminal device 100 may further include a USB port to be connected with a USB connector, various external input ports to be connected with various external terminals such as a headset, a mouse, and a Digital Multimedia Broadcasting (DMB) chip to receive and process a DMB signal depending on exemplary embodiments.

The above various exemplary embodiments may be realized by a user terminal device 100 in various forms as described above. Meanwhile, the objects of the above-described various exemplary embodiments may be various types of objects which are displayed on various types of screens such as a home screen, an icon screen, a list screen, an application execution screen, a web browser screen, a content play screen, etc.

In particular, the home screen may be a basic screen in a fixed form or a user creative screen.

When the home screen is configured as a user creative screen, a user may draw an object on the home screen arbitrarily and match at least one control operation to the object.

Hereinafter, the method of configuring a user creative screen and its form will be described in greater detail.

<Example of Configuring a User Creative Screen>

Figure 32:
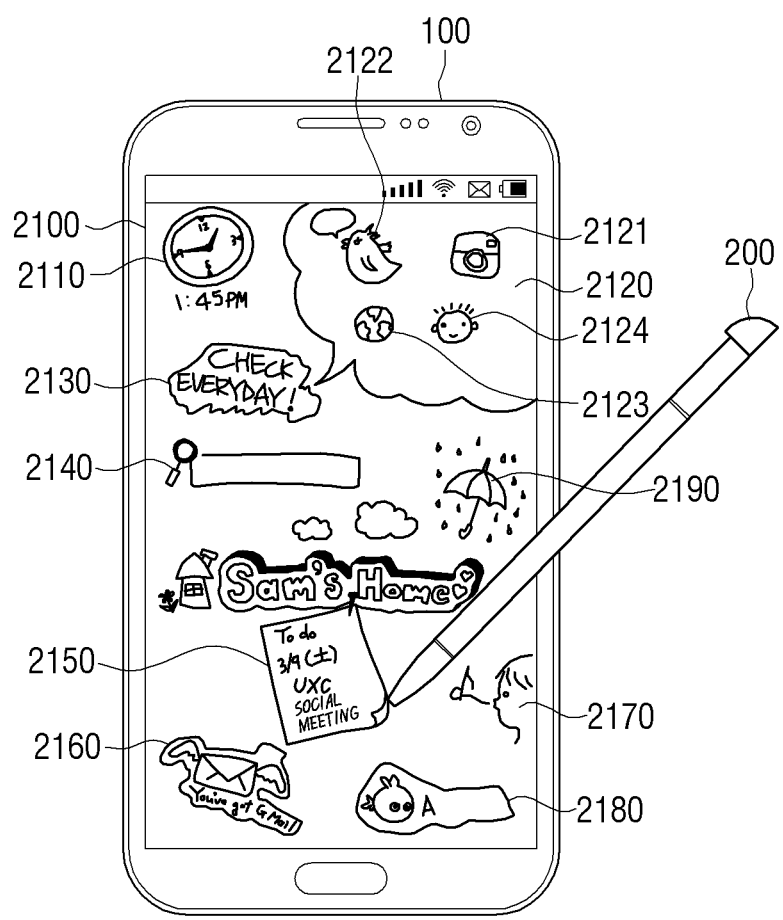
FIG. 32 is a view illustrating an example of a configuration of a user creative screen which is generated by a user.

FIG. 32 is a view illustrating an example of a configuration of a user creative screen which is generated directly by a user. According to FIG. 32, various objects 2110~2190 may be displayed on a home screen 2100 of the user terminal device 100. Each of the objects 2110~2190 is generated as the user draws it on the home screen 2100. Accordingly, the display attributes each of the objects 2110~2190 such as shape, location, color, etc. may be provided, not in a fixed form, but in various ways according to users. In this case, some of the objects 2120 may be drawn to include a plurality of objects 2121~2124. In addition, a user may match an object which he or she draws with a desired control operation.

When a user matches a control operation to each object, the controller 130 stores the matching information in the storage 140 or in other storage means. Subsequently, when a displayed object is selected, the controller 130 may perform a control operation matched with the object based on the matching information.

As illustrated in FIG. 32, an object 2120 may be configured to include a plurality of objects 2121~2124. In this case, even if a user selects only the corresponding object 2120, a plurality of control operation matched with each of the objects 2121~2124 may be performed. In addition, it is not necessary to match a control operation to all of the objects, and some of the objects may be used only for visual satisfaction.

Figure 33:
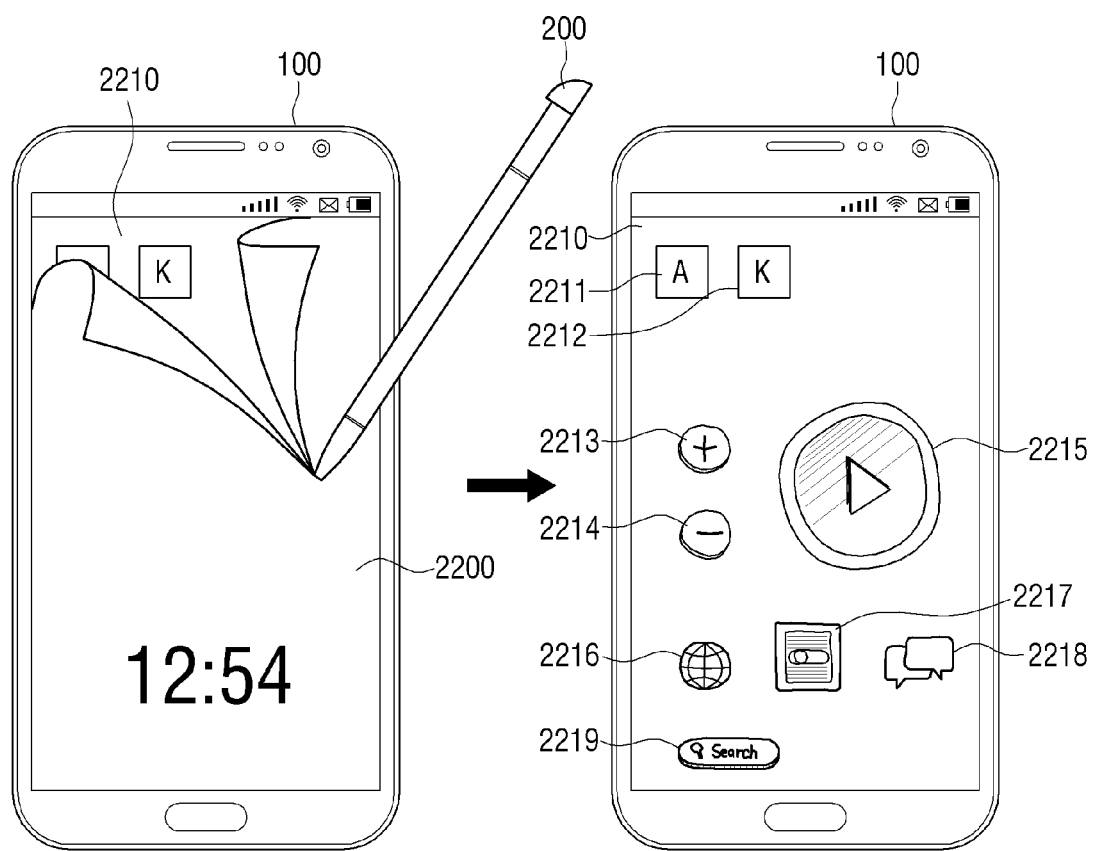
FIG. 33 is a view illustrating another example of a configuration of a user creative screen which is generated by a user.

FIG. 33 is a view illustrating another example of a user creative screen. As illustrated in FIG. 33, the user terminal device 100 may display the home screen 2210 when an unlock operation is performed when the user terminal device 100 is in a lock state. If the user terminal device 100 is an apparatus which can be controlled by a pen and an unlock operation is performed using a pen, a graphic effect which is specific to a pen may be displayed. That is, as illustrated in FIG. 33, when a user takes a gesture of dividing a lock screen 220 with a pen, the controller 130 displays the home screen 2210 while providing a graphic effect of tearing the lock screen 2200 as if a paper is torn apart.

A plurality of objects 2211~2219 which are produced previously by a user may be disposed on the home screen 2210. A user may delete or change existing objects which are provided as a default by drawing them using his or her finger or a pen, or may add new objects.

In addition, a user may arbitrarily select a control operation which is matched with each object so as to link an application, a specific image, a specific function, a bookmark, etc. with each object. Accordingly, the user may realize a home screen which may represent the user's individual personality.

FIGS. 32 and 33 illustrate a case where a home screen is configured as a user creative screen, but a home screen is not limited thereto. An object which is drawn directly by a user on various UI screens such as an application icon screen, a lock screen, etc. may also be displayed. Meanwhile, a user may arbitrarily select properties given to the pen 200 using an authoring tool.

Figure 34:
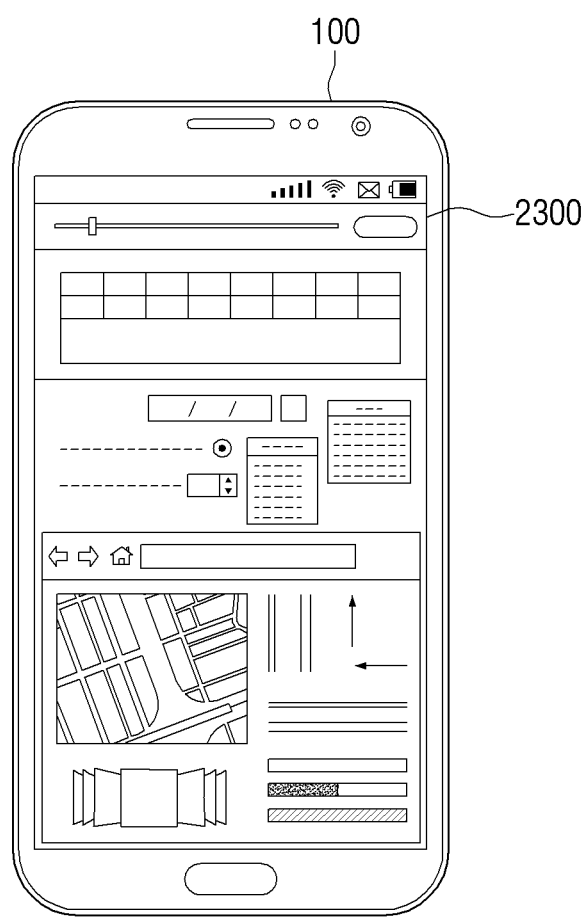
FIG. 34 is a view illustrating an example of an authoring tool screen to configure a user creative screen.

FIG. 34 illustrates an example of a screen authoring tool. When an authoring tool menu (not shown) is selected while the home screen 2210 is displayed, the controller 130 may display an authoring tool screen 2300 as illustrated in FIG. 34. According to FIG. 34, various tools to select the color of line, the shape of object, the number of items to be generated, a special symbol, etc. may be displayed on the authoring tool screen 2300. When a user arbitrarily selects these tools, completes settings, and manipulates a screen using an input means, an object may be drawn according to the set display properties. Accordingly, the user may display more objects in more various ways.

Meanwhile, a home screen may be configured as a background screen and an object. The background screen and the object may be disposed in different layers and displayed to be overlapped with each other. Herein, the object refers to various graphic images which are displayed on the home screen, such as an icon, a widget, etc. A user may directly draw the background screen itself or an object displayed on the background screen so as to generate his or her unique home screen.

Figure 35:
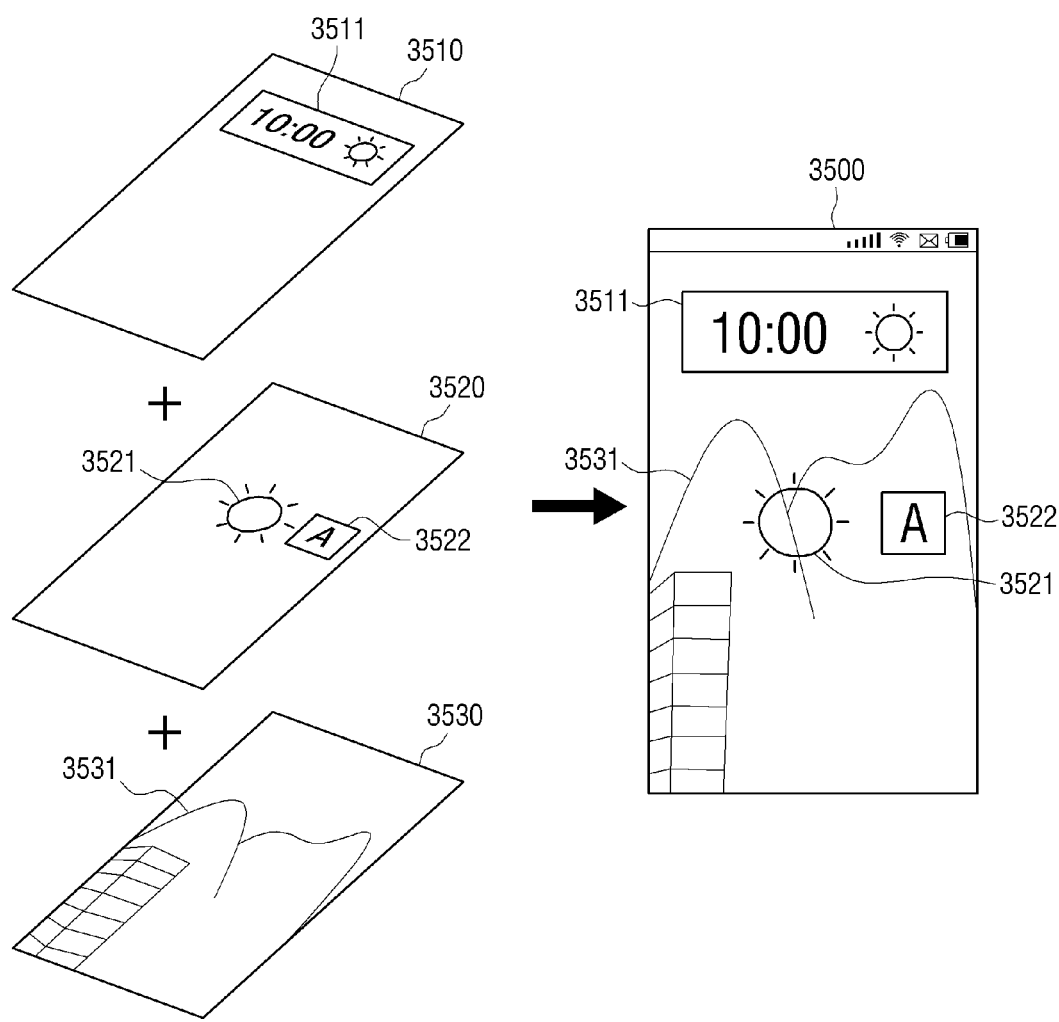
FIGS. 35 to 37 are views provided to explain a method of configuring a user creative screen according to various exemplary embodiments.
Figure 36:
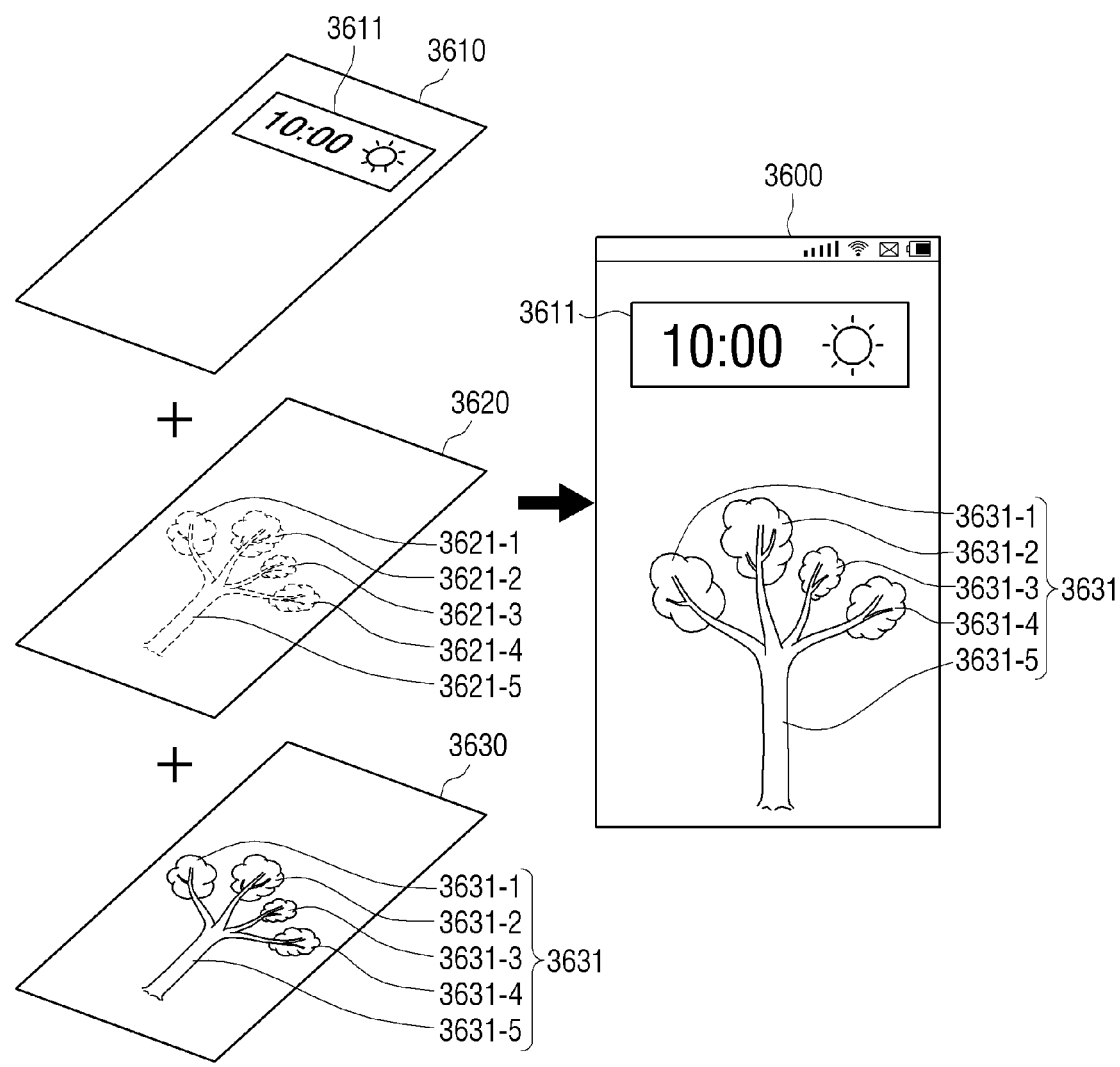
Figure 37:
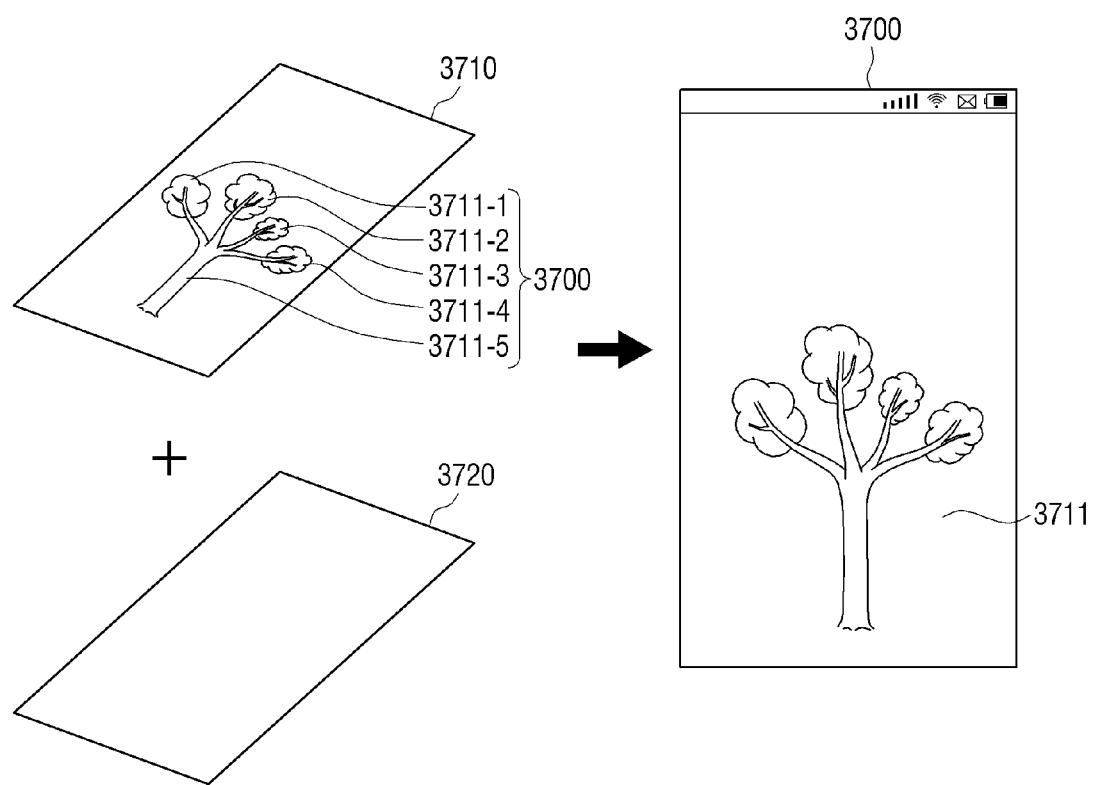

FIGS. 35 to 37 are views provided to explain various exemplary embodiments of displaying a home screen using a plurality of layers. According to FIG. 35, the display 110 displays a single home screen 3500 composed the first to the third layers 3510, 3520, 3530. An image to be displayed on each layer 3510, 3520, 3530 is stored a graphic buffer (not shown) corresponding to each layer 3510, 3520, 3530 and provided to the display 110.

In FIG. 35, a widget 3511 is displayed on the first layer 3510, and icons 3521, 3522 are displayed on the second layer 3520. The controller 130 detects a boundary of each object displayed on the first layer 3510 and the second layer 3520 and confirms the location of the object. Accordingly, as a touch coordinates value is detected from a touch sensor included in the detector 120, the touch coordinates value and the location of each object are compared, and it is determined whether an object is selected or not. A background screen 3531 is displayed on the third layer 3530.

A user may directly draw each object or a background screen displayed on the first to the third layers 3510, 3520, 3530. The GPU 134 of the controller 130 applies the size, location, shape, thickness, etc. of the trace which is drawn on the screen by a user by pixel unit, and renders each object and the background screen on the corresponding layer. Accordingly, the object and the background screen may be used according to the user's intention. The display 110 displays each layer 3510, 3520, 3530 to be overlapped with each other sequentially. Accordingly, the user may recognize a single home screen consisting of a background screen 3530 and objects 3511, 3521, 3522.

In FIG. 35, the objects 3511, 3521, 3522 may be directly drawn on the first or second layer 3510, 3520 while the background screen 3530 is displayed. Otherwise, the objects 3511, 3521, 3522 may be drawn in a separate program execution screen, and then, moved to the background screen 3530.

Further, only three layers are illustrated in FIG. 35, but the number of layers is not limited thereto, and the disposition of the layers is also not limited to the order of FIG. 35. For example, the widget 3511 may be displayed on the second layer, and the icons 3521, 3522 may be displayed on the first layer. Also, the widget or the icons may be dispersed and displayed on a plurality of layers, respectively. Meanwhile, according to another exemplary embodiment, a user may draw a single background screen, divide the background screen into a plurality of areas, and activate the areas just like objects.

FIG. 36 is a view provided to explain the method of configuring a home screen according to another exemplary embodiment. According to FIG. 36, the display 110 displays a single home screen 3600 by overlapping the first to third layers 3610, 3620, 3630. The widget 3611 or other icons (not shown) from among each of the layers 3610, 3620, 3630 may be displayed, and a background screen 3631 may be displayed on the third layer 3630. The second layer 3620 may be realized as a transparent layer for user interaction. A user may draw a background screen 3631 on the third layer 3630, divide some of the entire area of the background screen 3631 into a plurality of areas, and set the areas as independent chunk areas 3631-1~3631-5. The chunk areas may be set manually by a user's selection, or may be set automatically by the user terminal device 100.

In case where the chunk areas are set manually, when a user draws one background screen 3631, the controller 130 stores the background screen 3631 in the storage 140. Subsequently, when the user performs a manipulation of distinguishing each area by touching and dragging the area using an input means such as a finger and a pen, the controller 130 may display a graphic line according to the manipulation on the second layer 3620.

When such a manipulation is completed, the controller 130 recognizes a plurality of areas which are specified by a user trace drawn on the second layer 3620 as a plurality of transparent objects 3621-1~3621-5, respectively. The controller 130 stores a pixel coordinates value of each of the plurality of transparent objects 3621-1~3621-5. In addition, the controller 130 also matches a control operation with each of the plurality of transparent objects 3621-1~3621-5 and store the matching information. Subsequently, when various user manipulations such as touch, hovering, etc. are detected, the controller 130 confirms a transparent object having a pixel coordinates value corresponding to the point where the manipulations are detected, and performs a control operation corresponding to the confirmed transparent object.

Meanwhile, in case where the chunks are set automatically, the controller 130 analyzes the characteristics of a user manipulation, and divides the background screen 3631 into a plurality of areas. Specifically, the controller 130 may divide the screen according to various standards such as unit of closed curve, stroke, the number of strokes, the order of drawing, etc.

The unit of closed curve refers to recognizing a portion constituting a closed curve in one object as an independent chunk, and the unit of stroke means recognizing a portion which is drawn from when the pen 200 starts touching a home screen until when the pen 200 finishes touching the home screen as one chunk. The unit of the number of strokes refers to recognizing a portion which is drawn whenever there is a stroke until the number of stores reaches a predetermined number of times as an independent chunk, and the unit of the order of drawing refers to distinguishing a portion which is drawn first with reference to a predetermined time unit and a portion which is drawn later and recognizing each portion as an independent chunk. In addition, the controller 130 may divide objects according to various standards.

When distinction between chunks is made, the controller 130 assumes that there are virtual transparent objects 3621-1~3621-5 corresponding to each chunk, and stores a pixel coordinates value of the objects 3621-1~3621-5. In addition, the controller 130 stores information regarding a control operation matched with each of the objects 3621-1~3621-5. Accordingly, when a user selects one of the plurality of areas 3631-1~3631-5 displayed on the background screen 3611 on the home screen 3600, the controller 130 performs a control operation matched with the selected area.

According to an exemplary embodiment of FIG. 36, a user may draw a home screen in a desired size and shape without any limit in the size of an object, and may match a control operation with a desired area within the home screen.

For example, a user may match a desired control operation even with a basis area where there is no sign or object within the background screen 3631. That is, a user may set even a basis area which cannot be recognized by a third party as a transparent object and use the area.

In the exemplary embodiment of FIG. 36, the number of layers and the order of disposition may also vary as described above.

Meanwhile, FIGS. 35 and 36 describes an exemplary embodiment where a user draws the background screen of the home screen directly, but according to another exemplary embodiment, a user may overlap a widget screen which the user draws directly with the front of the existing home screen as if the user changes the home screen itself.

FIG. 37 is a view provided to explain a method for configuring a home screen according to the above exemplary embodiment. According to FIG. 37, a widget screen 3711 is displayed on the uppermost layer 3710. A user may draw the widget screen 3711 directly as he or she wants. The widget screen 3711 is displayed on another lower layer 3720 in an overlapping manner. Accordingly, the user may use the widget screen 3711 as if it is the home screen 3700.

As described in FIG. 36, the widget screen 3711 of FIG. 37 is also divided into a plurality of chunk areas 3711-1~3711-5, and each chunk area 3711-1~3711-5 may be used as if it is an object. In addition, another transparent layer may further added on top of the first layer 3710 where the widget screen 3711 is displayed. The method of distinguishing chunks has already described above with reference to FIG. 36 and thus, further description will not be provided.

The controller 130 may display the existing home screen on one 3720 of sub layers of the first layer 3710. The controller 130 may change the display order of the layer 3720 where the existing home screen is displayed and the layer 3710 where the widget screen is displayed according to a user manipulation, and directly provide the existing home screen to a user. That is, according to an exemplary embodiment, the user terminal device 100 may provide a user creative screen using a widget program without changing the existing home screen. Meanwhile, as described above, at least one control operation may be matched with each of the various objects (including transparent objects) included in the home screen. A user may draw the home screen directly or an object on the home screen, and select a control operation to be matched with.

FIGS. 38 to 42 describe various methods of generating an object to be matched with a control operation in greater detail.

Figure 38:
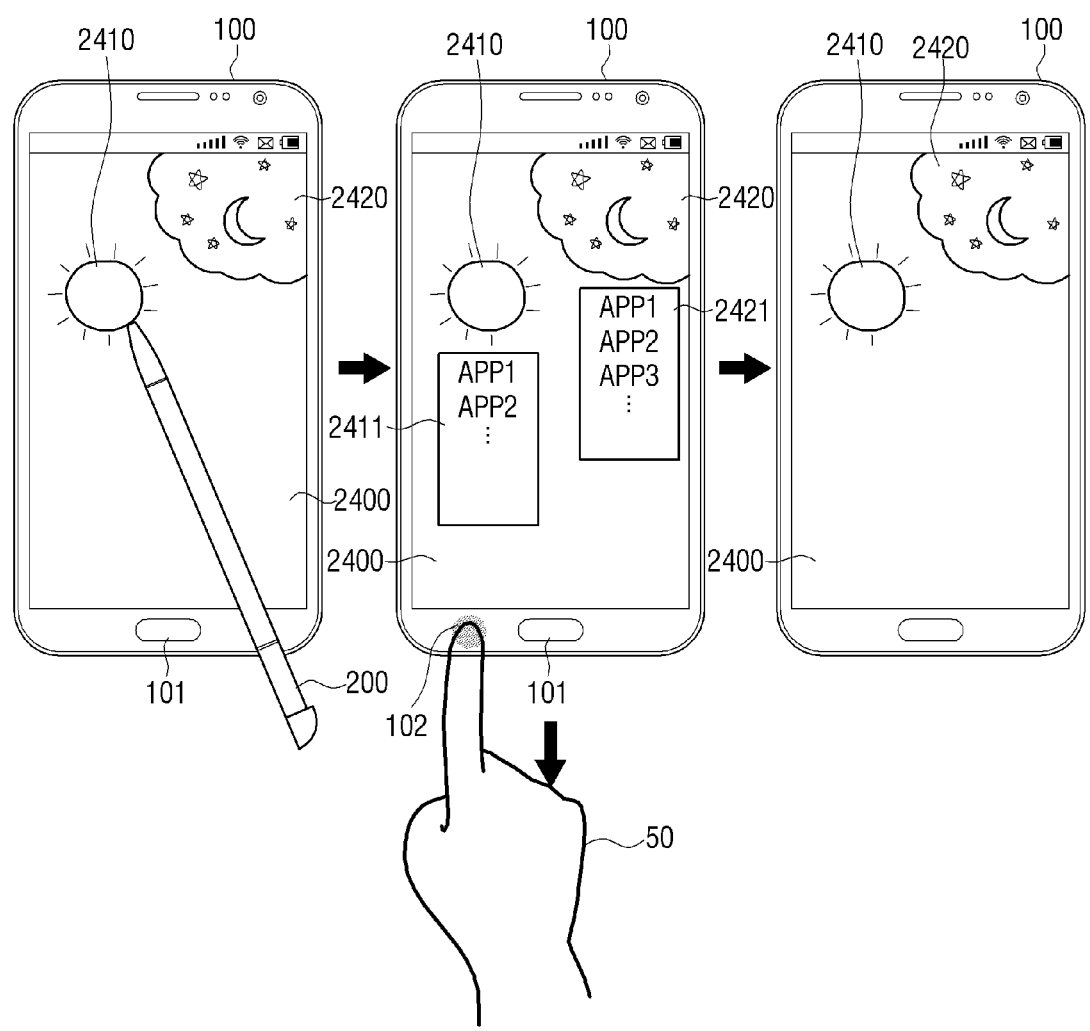
FIGS. 38 to 42 are views provided to explain examples of various methods of generating a user creative screen.

FIG. 38 is a view illustrating an example of a home screen generating method. According to FIG. 38, a user may draw various objects 2410, 2420 using the pen 200 on the screen 2400 as if the home screen 2400 is a canvas.

After drawing the objects 2410, 2420, the user may select a control operation to be matched with the objects. When a user command to match a control operation is input, the controller 130 displays a list of applications installed in the user terminal device 100 for each of the objects 2410, 2420. In FIG. 38, the user terminal device 100 includes a home button 101 and a hidden button 102 at a bezel portion, and when the hidden button 102 is selected, each application list 2411, 2421 is illustrated, but a user command may be input in various ways.

The user may select an application to be matched with each object on the application lists 2411, 2421. When the selection is completed, the controller 130 may match information regarding the corresponding object with information regarding the selected application and store the matching information in the storage 140 or other storage means. Accordingly, a user creative screen may be generated.

Figure 39:
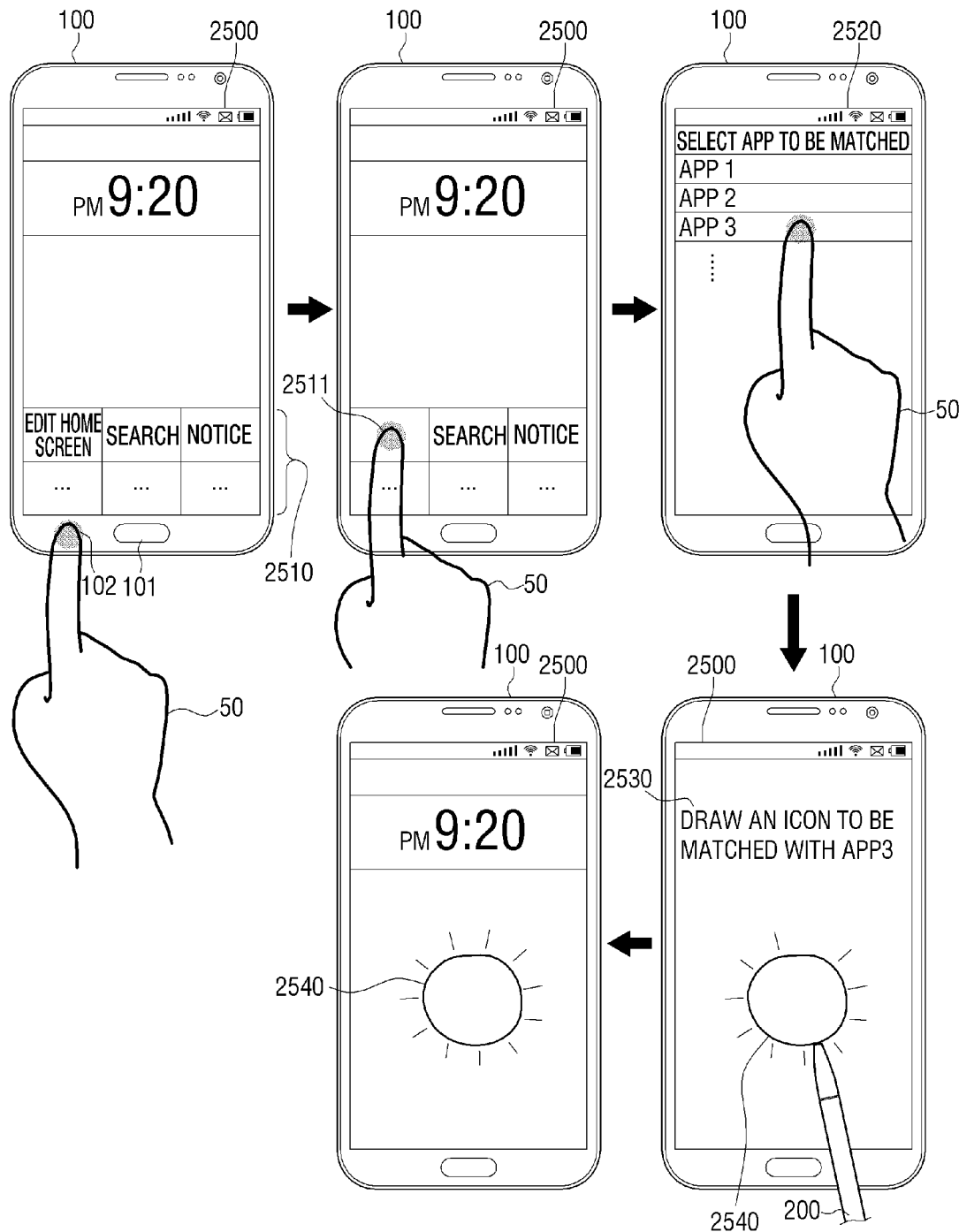

FIG. 39 is a view provided to explain another example of a user creative screen generating method. According to FIG. 39, when a user selects the hidden key 102 while a home screen 2500 is displayed, the controller 130 displays various menus 2510 on one side of the home screen. The menus may include a menu 2511 to generate an object directly.

When the user selects the menu 2511, the controller 130 may display information regarding various applications installed in the user terminal device 100 in the form of list 2520. When the user selects one application in this state, the home screen 2500 where the user can draw an object is displayed. In this case, a guide message 2530 which leads the user to draw an object may be displayed.

The user may draw an object 2540 on the home screen 2500 with reference to the guide message 2530. When the object is drawn, the controller 130 matches the object 2540 with an application which is previously selected by the user, and displays the object 2540 on the final home screen 2500. The controller 130 may determine whether object-drawing is completed in various ways. For example, if a predetermined time elapses after the user inputs the last stroke to draw the object, the controller 130 may determine that object-drawing is completed. Alternatively, if a specific confirmation button is pressed after an object is drawn, the controller 130 may determine that object-drawing is completed. Afterwards, unless deleted or edited, the object 2540 is displayed on the home screen 2500 in a fixed manner.

Meanwhile, if an application is selected first, a user may generate an object by using a reference object which is matched with the application.

Figure 40:
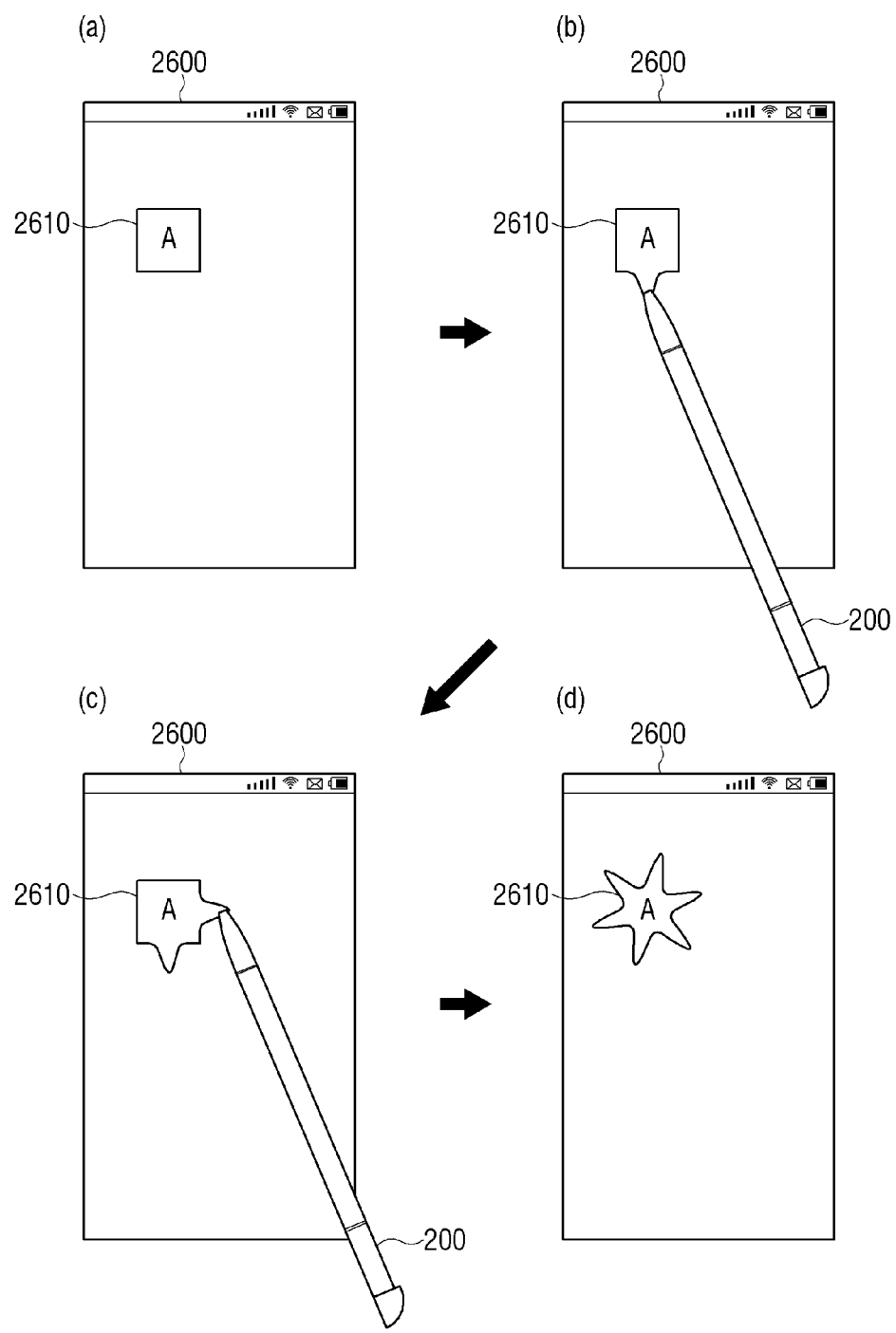

FIG. 40 is a view provided to explain a method of generating an object by editing a reference object. As illustrated in FIG. 40, when a user selects an application first, a reference object 2610 corresponding to the selected application is displayed first (a) of FIG. 40.

The user may edit the reference object 2610 using the pen 200 ((b) and (c) of FIG. 40). That is, as illustrated in FIG. 40, the user may generate an object 2610 in the shape of star by touching each edge of the reference object 2610 and stretches it in various directions using the pen 200 ((d) of FIG. 40).

FIG. 40 illustrates only the case of changing the shape, but the user may also generate a whole new object by changing the size, color, attached text, etc. of the reference object 2610. In this case, an authoring tool may be used as illustrated in FIG. 34.

Figure 41:
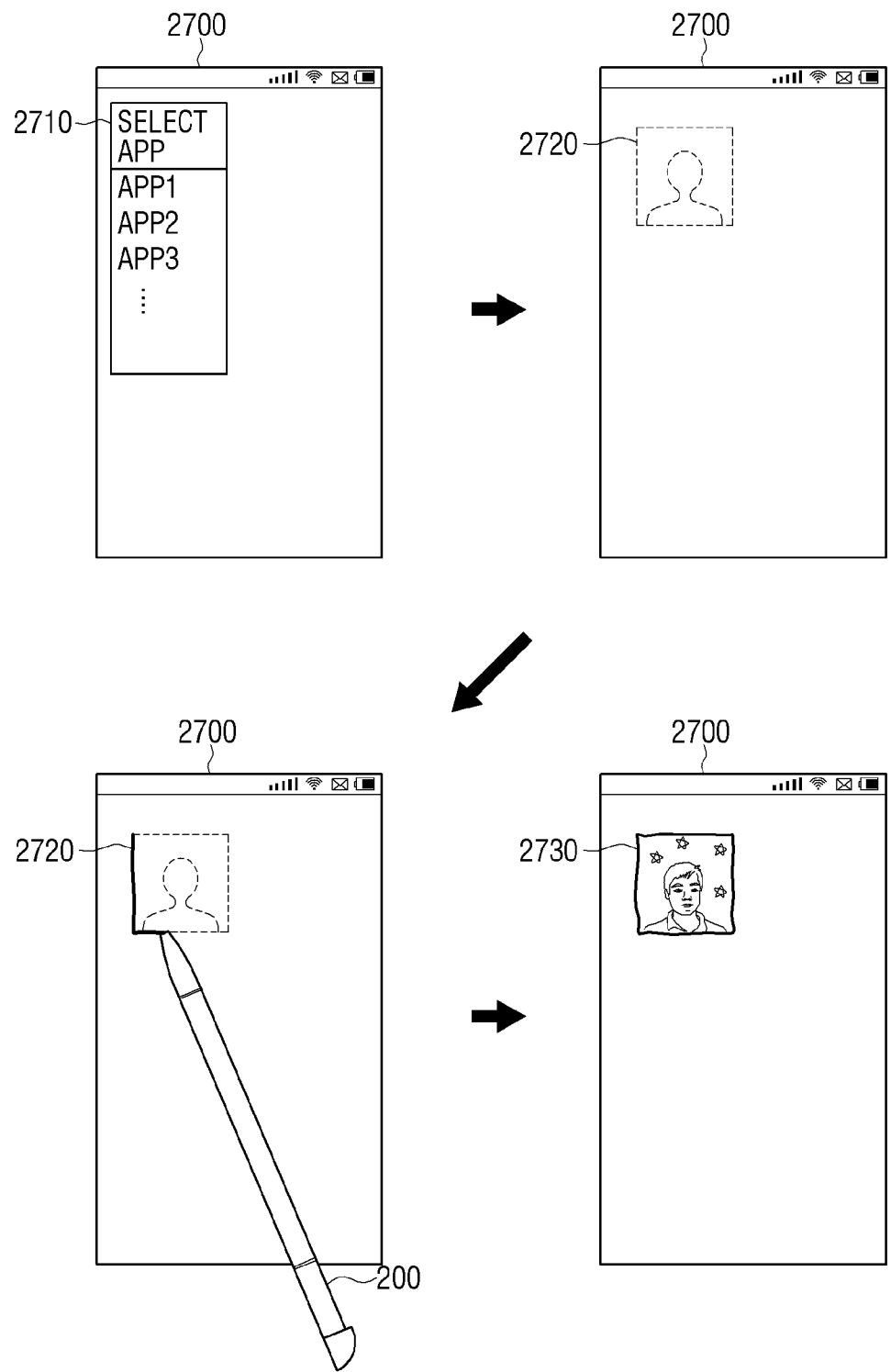

FIG. 41 illustrates an exemplary embodiment where a guide image is displayed so that a user may draw an object more easily.

According to FIG. 41, when a user selects an object generating menu, the controller 130 displays an application list 2710 on the home screen 2700. The user may select an application which he or she wants to match with an object to be drawn first on the application list 2710. In this case, the application list 2710 disappears, and a reference object 2720 corresponding to the selected application is displayed on the home screen in the form of watermark. The reference object 2720 may be displayed in a dotted form so that the user may draw it easily following the dots. The user may draw the object 2730 following the line of the object 2720. In this case, it is not necessary that the user draws the object exactly the same as the reference object 2720. Finally, when the object 2730 is completed, the controller 130 matches an application which he or she has selected with the completed object 2730.

Meanwhile, even though the user does not select a control operation by himself, the user terminal device 100 may recognize an object drawn by the user and recommend an object that is suitable for the object.

Figure 42:
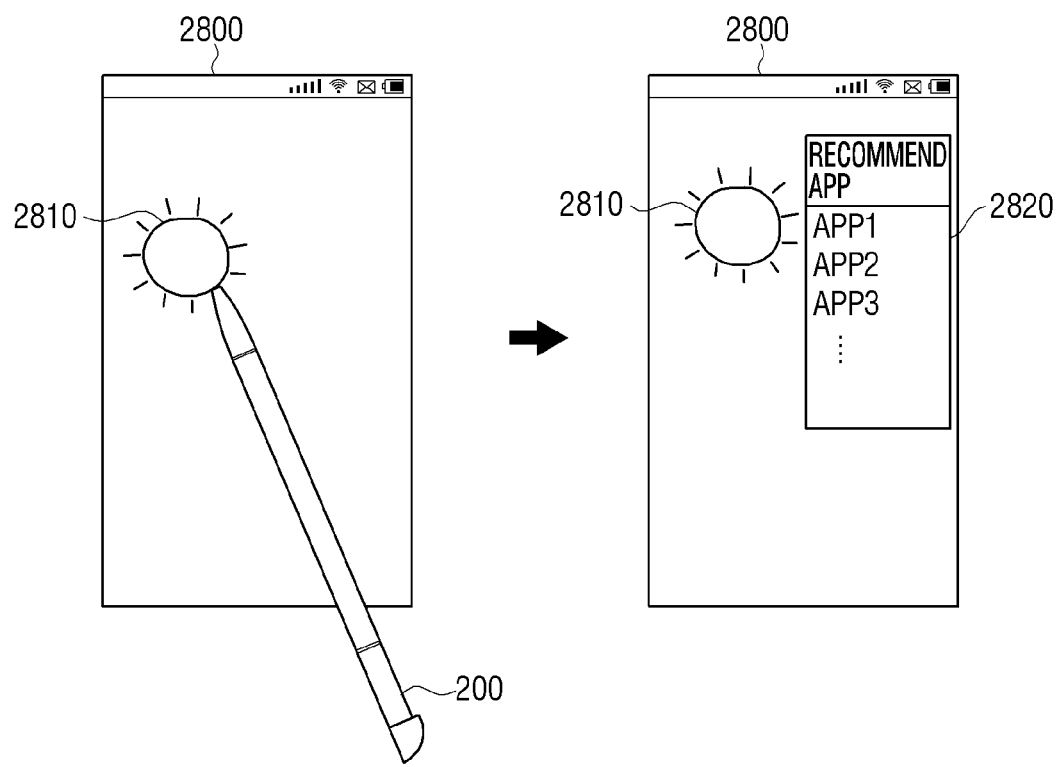

FIG. 42 is a view provided to explain the method of recommending an application corresponding to an object. According to FIG. 42, when a user draws an object 2810 on a home screen 2800, the controller 130 recognizes the characteristics of the object 2810. Specifically, the controller 130 may recognize the shape of the drawn object 2810 using the above-described handwriting recognizing module 143-9.

The controller 130 may compare the icons or application titles of each application which is pre-installed with the recognized shape, and search an application which has a similarity that is higher than a predetermined value. For example, if a user draws an object in the shape of bird, the controller 130 may search an application which has a bird shape as a basic icon.

In addition, the controller 130 may search an application which provides a service related to a recognized shape. For example, if a draws an object in the shape of sun as illustrated in FIG. 42, the controller 130 may search an application related to weather.

The controller 130 may recommend applications to a user. That is, the controller 130 may display at least one list 2820 of applications on one side of the object 2810. If a user selects one application from the list 2820, the selected application may be matched with an object.

As described above, a user may configure a user creative screen in various ways. Since the user draws an object and configures a user creative screen in person, the user may easily remember which object is located in which area of the user creative screen. That is, even though many small objects are displayed on a single page, the user may intuitively know the location of each object. Accordingly, the user terminal device 100 may display many small objects on a single page without configuring the page of a home screen as a plurality of pages. In this case, the user may magnify the small objects on the single page through a zoom-in or zoom-out manipulation.

Figure 43:
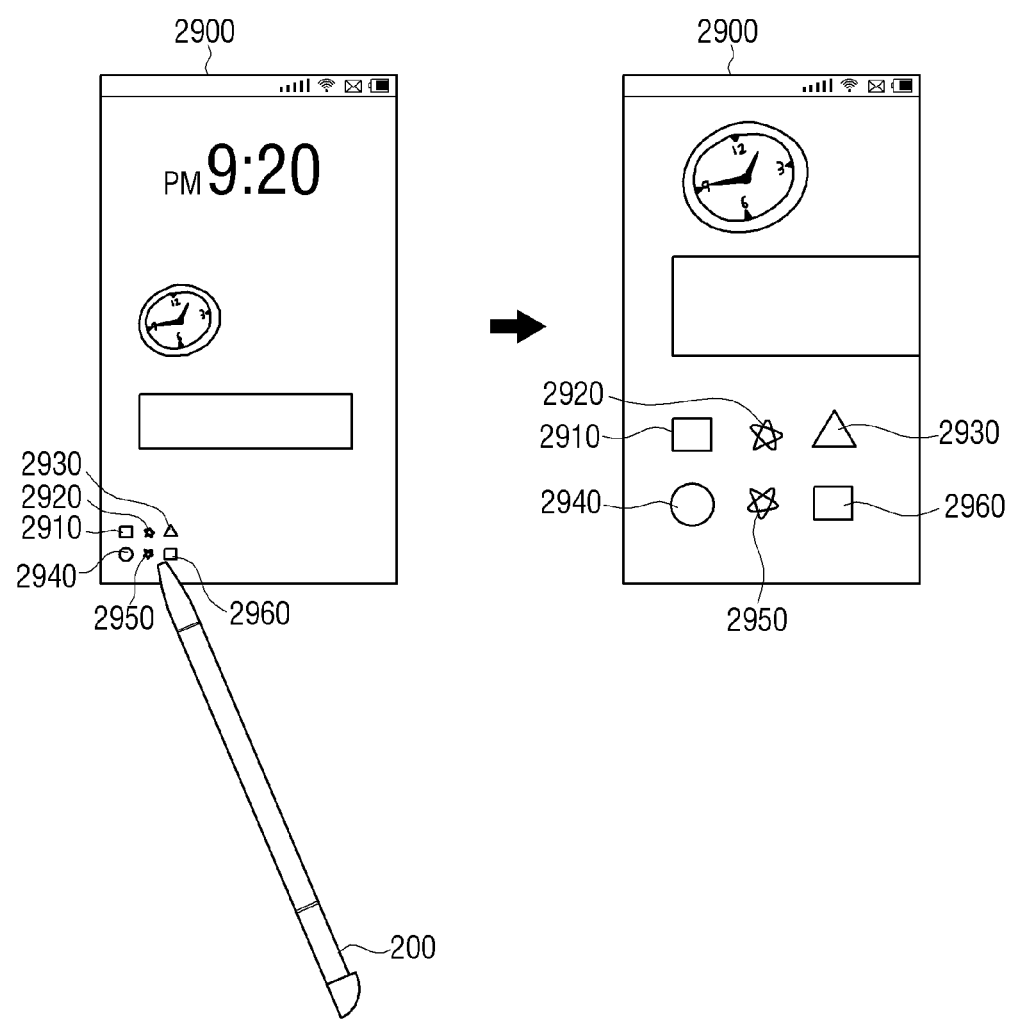
FIGS. 43 to 44 are views provided to explain various methods of utilizing a user creative screen.

FIG. 43 is a view provided to explain the method of performing a zoom-in or zoom-out manipulation with respect to a user creative screen. According to FIG. 43, various objects are displayed on the user creative screen 2900. Some of the objects 2910~2960 may be displayed in such a small size that a user may not discern their shape easily. In this state, the user may perform a zoom-in operation by tapping the part where the reduced objects 2910~2960 are displayed or touching the screen with a plurality of fingers and widening the touched screen. In this case, the whole home screen 2900 is magnified, and the reduced objects 2910~2960 are enlarged and displayed. The user may select one of the enlarged objects and executed a matched control operation.

Meanwhile, if the user taps a black area where no objects are displayed, or performs the manipulation of touching the screen with a plurality of fingers and narrowing the touched screen, the controller 130 performs a zoom-out operation. Accordingly, the size of the screen goes back to its original state, and each of the objects is displayed in the reduced size. Thus, a large number of objects may be displayed on a single screen without adding pages.

In addition, the user terminal device 100 may realize a user creative screen in the form of roll screen. That is, the user terminal device 100 may touch and drag the screen in one direction while the user creative screen is displayed so that the screen may be scrolled gradually along the dragging direction.

Figure 44:
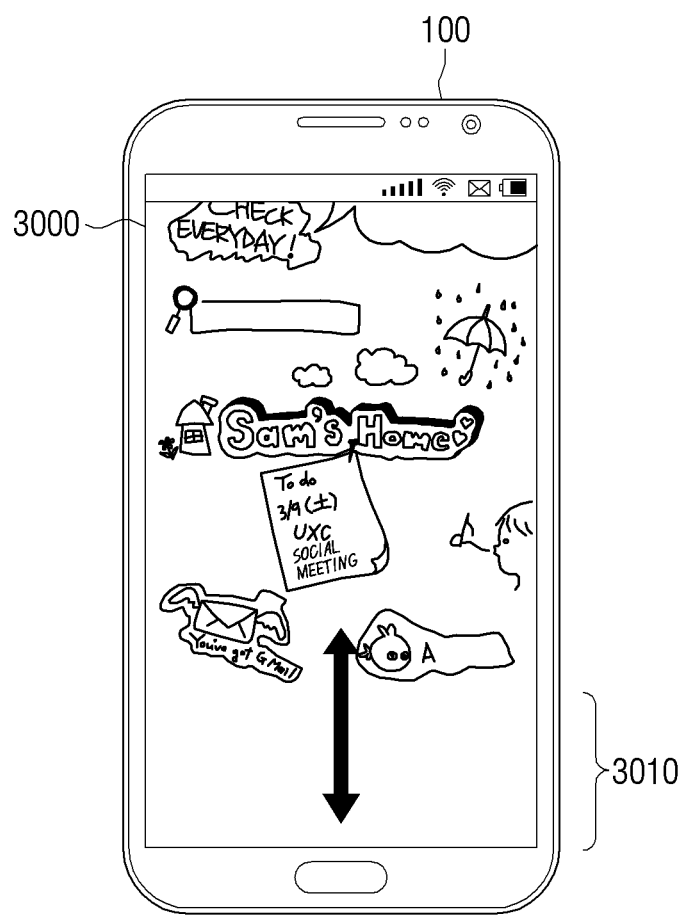

FIG. 44 is a view provided to explain an exemplary embodiment where a home screen is changed using a scroll method. According to FIG. 44, the controller 130 displays a home screen 3000 including various objects. In this state, when a user touches the screen using a finger or a pen and scrolls the screen in an arrow direction, the screen moves and an empty space 3010 newly appears. The user may utilize the empty space 3010 by drawing a new object in the empty space 3010 and matching a control operation. FIG. 44 illustrates a case where the home screen is scrolled continuously in an up-down direction, but the direction of scrolling is not limited thereto and may be realized in various directions.

When there is scrolling, the controller 130 may provide a graphic effect of waving the home screen by the scrolling, or may also provide other additional feedbacks such as sound, vibration, light, etc.

As described above, the user terminal device 100 may provide a home screen including objects which are generated directly by a user, that is, a user creative screen. The shape, size, color, etc. of the objects on the user creative screen may be realized in various ways. In particular, a user may easily set the location of the objects.

Accordingly, a user may conveniently dispose frequently-used objects, select a plurality of objects simultaneously when necessary, and execute a control operation corresponding to each object simultaneously. The method of selecting objects simultaneously may be at least one of the manipulation of drawing a closed curve including a plurality of objects, the manipulation of drawing a connection line between a plurality of objects, the multi-touch manipulation of touching each of a plurality of objects, and the manipulation of covering an area where a plurality of objects are displayed as described above.

In addition, when a user generates an object, the user may select a plurality of control operations which are to be matched with the object, or may set different control operations according to the user's selection pattern regarding the object such as a selected direction or a selected point. Thus, a control method according to the above-described various exemplary embodiments may be realized on the user creative screen.

As described above, according to various exemplary embodiments, a user may easily select one or a plurality of control operations simultaneously by selecting objects.

The method of controlling a user terminal device or the method of generating a user creative screen according to the above-described various exemplary embodiments may be coded as software and stored in a non-transitory readable medium. Such a non-transitory readable medium may be mounted and used in various apparatuses.

Specifically, a program code to perform a controlling method including the steps of displaying a home screen, and when a user manipulation of associating a plurality of objects included in the home screen is detected, performing a control operation corresponding to each of the plurality of objects may be stored in a non-transitory readable medium and provided therein.

The non-transitory recordable medium refers to a medium which may store data semi-permanently and which may be readable by an apparatus. Specifically, the above-mentioned various applications or programs may be stored in a non-transitory recordable medium such as a CD, a DVD, a hard disk, a Blu-ray disk, a USB, a memory card, and a ROM and provided therein.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the inventive concept, as defined by the appended claims, and many alternatives, modifications, and variations will be apparent to those skilled in the art.

What is claimed is:

1. A user terminal device, comprising:
a display configured to display a first screen including an icon;
a touch sensor configured to detect a user drawing input which is input on the icon or in an area surrounding the icon; and
a controller configured to, in response to the user drawing input being detected, execute an application corresponding to the icon, process the user drawing input as an input of the application, perform a function corresponding to the user drawing input from among functions provided by the application, and display, on the display, a second screen where the function is performed,
wherein the controller performs the function corresponding to the user drawing input from among the functions provided by the application in response to the user drawing input being detected while a predetermined condition is satisfied, and performs a function provided on the first screen according to the user drawing input in response to the user drawing input being detected while the predetermined condition is not satisfied,
wherein the function provided by the first screen is different from the function corresponding to the user drawing input from among the functions provided by the application.

2. The user terminal device as claimed in claim 1, wherein the controller is further configured to, in response to the user drawing input comprising text, display, on the display, the second screen where the text is processed as an input of the application.

3. The user terminal device as claimed in claim 2, wherein the controller is further configured to, in response to the icon comprising a search widget, perform a search regarding the text and display, on the display, a result of the search.

4. The user terminal device as claimed in claim 1, wherein the controller is further configured to, in response to the user drawing input comprising a symbol, display, on the display, the second screen where the symbol is processed as an input of the application.

5. The user terminal device as claimed in claim 2, wherein the controller is further configured to, in response to the icon being an icon matched with a mail application, display, on the display, a mail writing screen to transmit mail to a mail address corresponding to the text.

6. The user terminal device as claimed in claim 2, wherein the controller is further configured to, in response to the icon being an icon matched with a messenger application, display, on the display, messenger contents which are exchanged with another user corresponding to the text.

7. The user terminal device as claimed in claim 1, wherein the user drawing input is input through a touch-and-drag manipulation using a user's body or a pen.

8. A user terminal device, comprising:
a display configured to display a screen including a plurality of icons;
a touch sensor configured to detect a user manipulation on the screen; and
a controller configured to, in response to a connection line between a first icon and a second icon from among the plurality of icons being drawn according to the user manipulation, execute a first application corresponding to the first icon and a second application corresponding to the second icon in association with each other,
wherein the controller performs a predetermined first function provided by the first application according to the association, and performs a predetermined second function provided by the second application based on a performance result of the predetermined first function.

9. The user terminal device as claimed in claim 8, wherein the controller is further configured to display a first screen by executing the first application corresponding to the first icon, and in response to a user manipulation being performed on the first screen, execute the second application corresponding to the second icon and display a second screen which reflects a result according to the user manipulation.

10. The user terminal device as claimed in claim 9, wherein the controller is further configured to determine a content which is displayed on the first screen according to a type of the second application.

11. A controlling method of a user terminal device, comprising:
displaying a first screen including an icon;
detecting a user drawing input which is input on the icon or in an area surrounding the icon;
executing, in response to the user drawing input being detected, an application corresponding to the icon, process the user drawing input as an input of the application;
performing a function corresponding to the user drawing input from among functions provided by the application; and
displaying a second screen where the function is performed on the display,
wherein the displaying the second screen comprises:

in response to the user drawing input being detected while a predetermined condition is satisfied, performing the function corresponding to the user drawing input from among the functions provided by the application; and
in response to the user drawing input being detected while the predetermined condition is not satisfied, performing a function provided by the first screen according to the user drawing input,
wherein the function provided by the first screen is different from the function corresponding to the user drawing input from among the functions provided by the application.

12. The controlling method as claimed in claim 11, wherein the displaying the second screen further comprises, in response to the user drawing input comprising text, displaying a screen where the text is processed as an input of the application.

13. The controlling method as claimed in claim 12, wherein the displaying the second screen further comprises, in response to the icon being a search widget, performing a search regarding the text and displaying a result of the search.

14. The controlling method as claimed in claim 11, wherein the displaying the second screen further comprises, in response to the user drawing input comprising a symbol, displaying a screen where the symbol is processed as an input of the application.

15. The controlling method as claimed in claim 12, wherein the displaying the second screen further comprises, in response to the icon being an icon matched with a mail application, displaying a mail writing screen to transmit mail to a mail address corresponding to the text.

16. The controlling method as claimed in claim 12, wherein the displaying the second screen further comprises, in response to the icon being an icon matched with a messenger application, displaying messenger contents which are exchanged with another user corresponding to the text.

17. A controlling method of a user terminal device, comprising:
displaying a screen including a plurality of icons;
detecting a user manipulation on the screen; and
in response to a connection line between a first icon and a second icon from among the plurality of icons being drawn according to the user manipulation, executing a first application corresponding to the first icon and a second application corresponding to the second icon in association with each other,
wherein the executing the first application and the second application comprises performing a predetermined first function provided by the first application according to the association and performing a predetermined second function provided by the second application based on a performance result of the predetermined first function.

18. The controlling method as claimed in claim 17, wherein the executing the first application and the second application further comprises:
displaying a first screen by executing the first application corresponding to the first icon; and
executing, in response to a separate user manipulation being performed on the first screen, the second application corresponding to the second icon and displaying a second screen which reflects a result according to the separate user manipulation of the first screen.

19. The controlling method as claimed in claim 18, wherein the executing the first application and the second application further comprises:

determining a content which is displayed on the first screen according to a type of the second application.

20. A user terminal device, comprising:

a display configured to display a screen including an icon;

a touch sensor configured to detect a user drawing input which is input on the icon or in an area surrounding the icon; and a controller configured to, in response to a first area of the icon being selected according to the user drawing input, perform a first function related to the icon, and in response to a second area of the icon being selected, perform a second function related to the icon, wherein the first function and the second function are different functions provided by a same application corresponding to the icon.

\* \* \* \* \*